(12) United States Patent
Yasui

(10) Patent No.: US 11,181,724 B2
(45) Date of Patent: Nov. 23, 2021

(54) PROJECTION OPTICAL SYSTEM AND PROJECTOR

(71) Applicant: SONY CORPORATION, Tokyo (JP)

(72) Inventor: Toshifumi Yasui, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 12 days.

(21) Appl. No.: 16/631,131

(22) PCT Filed: Jun. 19, 2018

(86) PCT No.: PCT/JP2018/023248
§ 371 (c)(1),
(2) Date: Jan. 14, 2020

(87) PCT Pub. No.: WO2019/026447
PCT Pub. Date: Feb. 7, 2019

(65) Prior Publication Data
US 2021/0181487 A1    Jun. 17, 2021

(30) Foreign Application Priority Data

Aug. 2, 2017 (JP) .............................. JP2017-149986

(51) Int. Cl.
*G02B 13/16* (2006.01)
*G03B 21/14* (2006.01)
(Continued)

(52) U.S. Cl.
CPC ......... *G02B 13/16* (2013.01); *G02B 17/0896* (2013.01); *G03B 21/142* (2013.01); *G03B 21/28* (2013.01)

(58) Field of Classification Search
CPC .... G02B 13/16; G02B 13/18; G02B 17/0896; G02B 17/08; G03B 21/142; G03B 21/28
See application file for complete search history.

(56) References Cited

U.S. PATENT DOCUMENTS

2014/0146295 A1    5/2014 Tatsuno
2014/0340658 A1    11/2014 Takano et al.
(Continued)

FOREIGN PATENT DOCUMENTS

JP      2011-150355      8/2011
JP      2012-203139      10/2012
(Continued)

OTHER PUBLICATIONS

Extended European Search Report for European Patent Application No. 18840596.3, dated Jun. 15, 2020, 9 pages.
(Continued)

*Primary Examiner* — Ryan D Howard
(74) *Attorney, Agent, or Firm* — Sheridan Ross P.C.

(57) ABSTRACT

A projection optical system according to the present disclosure includes an intermediate image forming lens group and a concave mirror. The intermediate image forming lens group forms an intermediate image of an image of a projection target. The concave mirror is disposed on an optical path after the intermediate image is formed. The concave mirror forming a projection image on a projection surface. The intermediate image forming lens group and the concave mirror are disposed in order from side of the image of the projection target toward side of the projection surface. The intermediate image forming lens group includes a movable group that travels on an optical axis to perform focus adjustment. The movable group includes a concave lens having an aspherical surface.

20 Claims, 47 Drawing Sheets

(51) Int. Cl.
G02B 17/08 (2006.01)
G03B 21/28 (2006.01)

(56) References Cited

U.S. PATENT DOCUMENTS

| | | |
|---|---|---|
| 2016/0091700 A1 | 3/2016 | Takano |
| 2016/0238822 A1 | 8/2016 | Minefuji |
| 2016/0238825 A1 | 8/2016 | Minefuji |
| 2016/0299415 A1 | 10/2016 | Minefuji |
| 2016/0306288 A1 | 10/2016 | Minefuji |
| 2016/0363746 A1 | 12/2016 | Minefuji |
| 2017/0059836 A1 | 3/2017 | Takano |
| 2017/0059971 A1 | 3/2017 | Takano et al. |
| 2018/0074302 A1 | 3/2018 | Takano et al. |

FOREIGN PATENT DOCUMENTS

| | | |
|---|---|---|
| JP | 2016-151686 | 8/2016 |
| JP | 2016-151688 | 8/2016 |
| JP | 2017-003846 | 1/2017 |
| JP | 2017-044914 | 3/2017 |
| WO | WO 2006/043666 | 4/2006 |

OTHER PUBLICATIONS

International Search Report prepared by the Japan Patent Office dated Sep. 5, 2018, for International Application No. PCT/JP2018/023248.

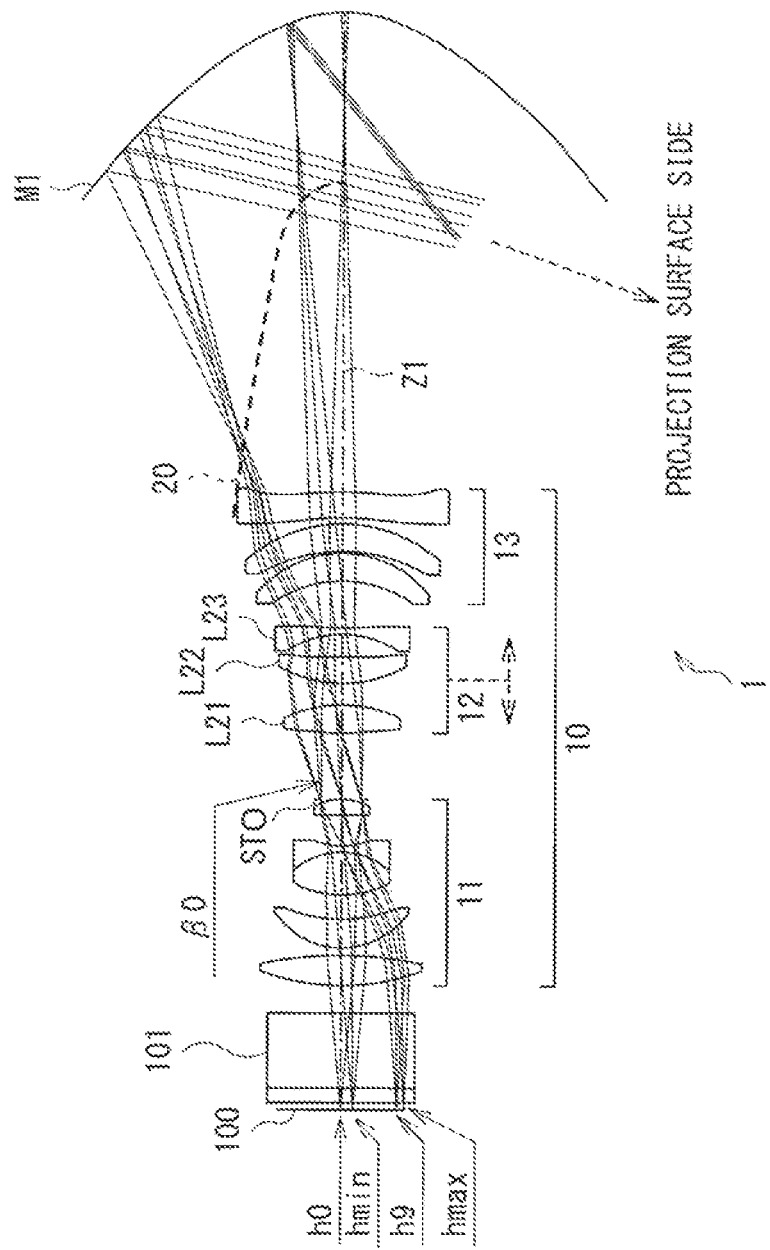

[FIG. 2]
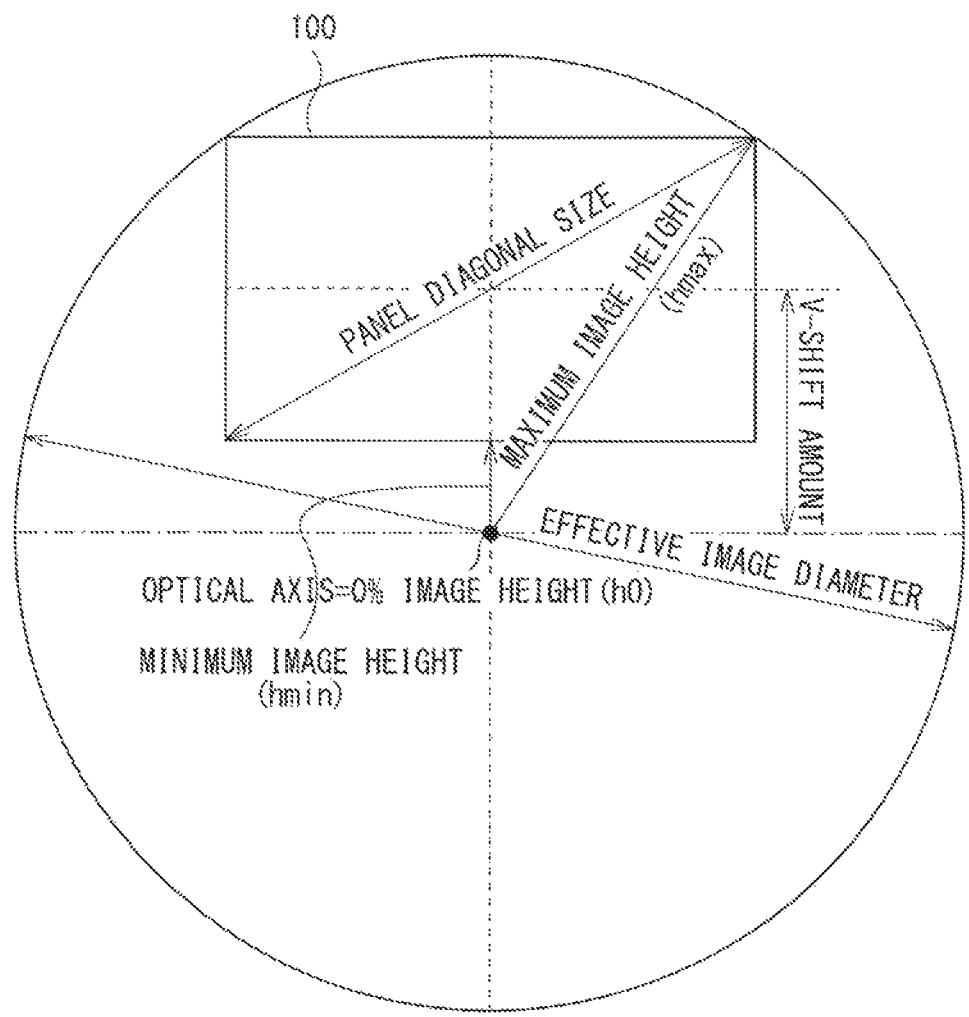

[FIG. 3]
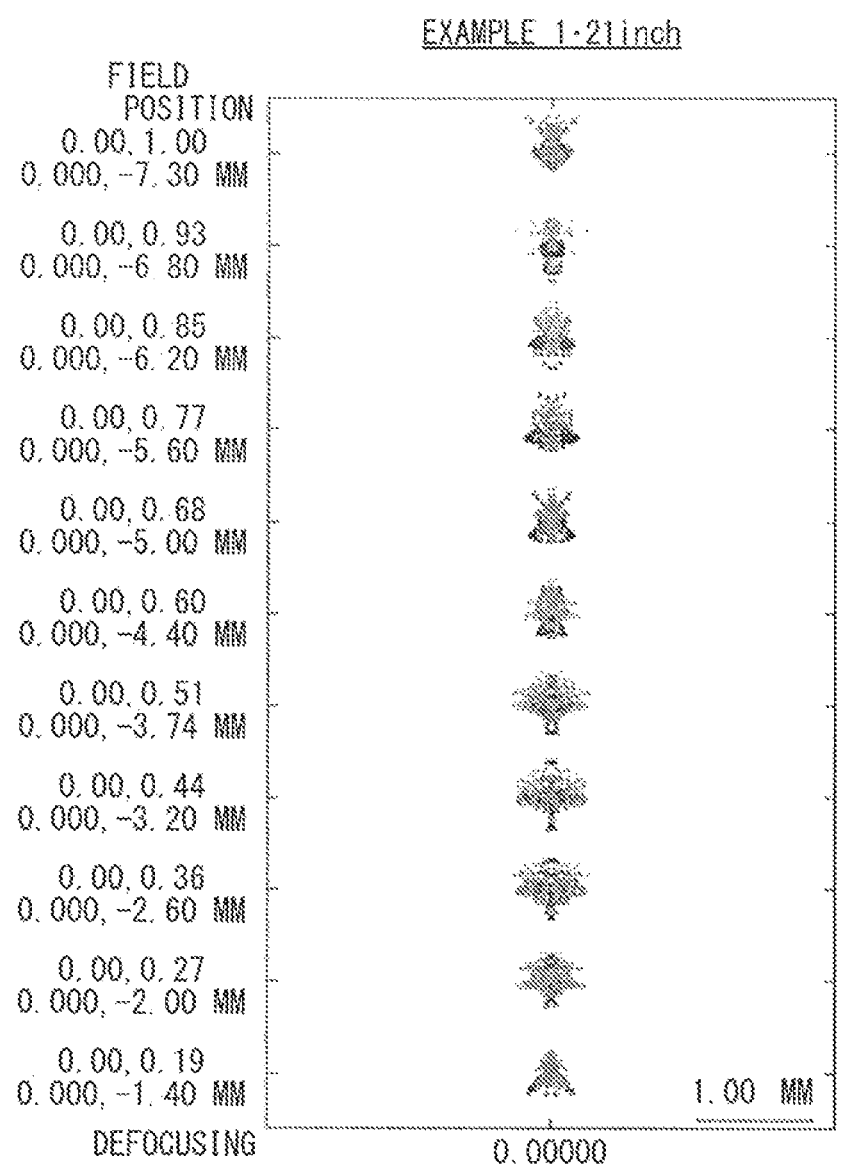

[ FIG. 4 ]
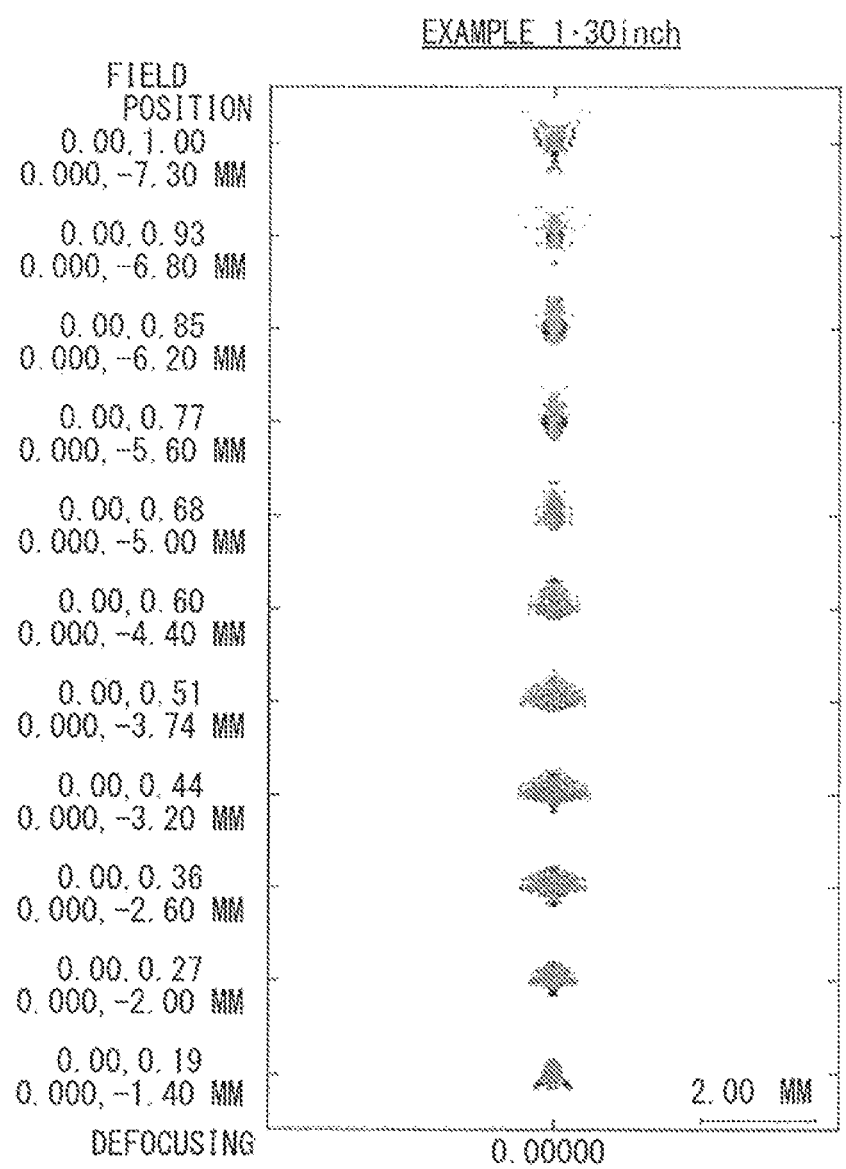

[FIG. 5]
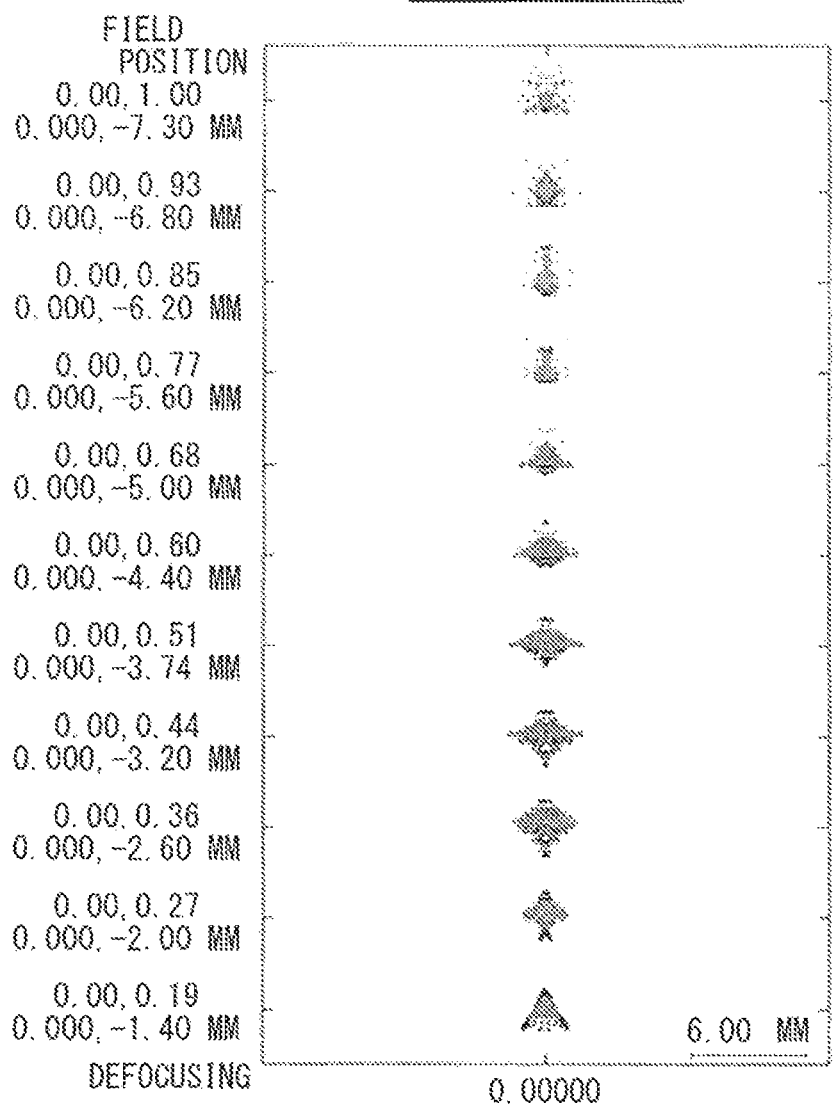

[FIG. 6]
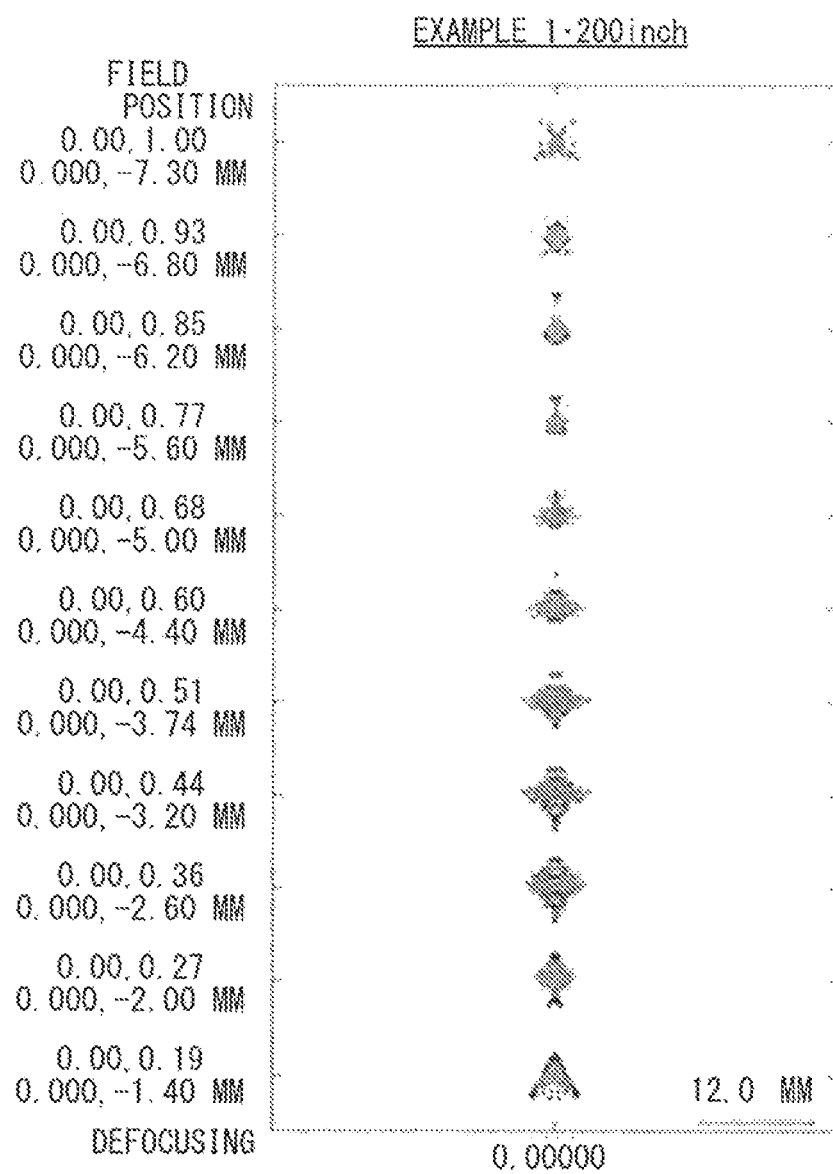

[ FIG. 7 ]
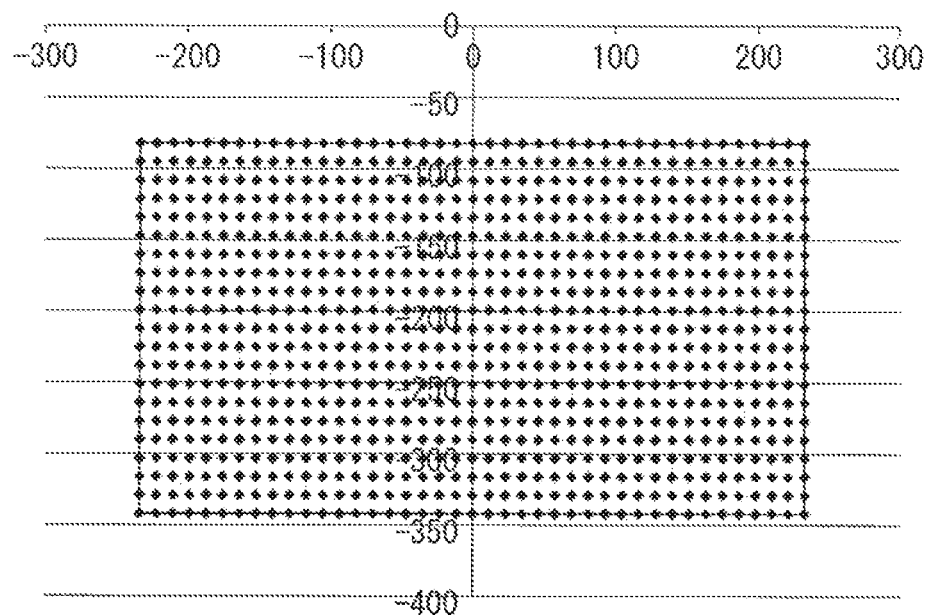
[ FIG. 8 ]
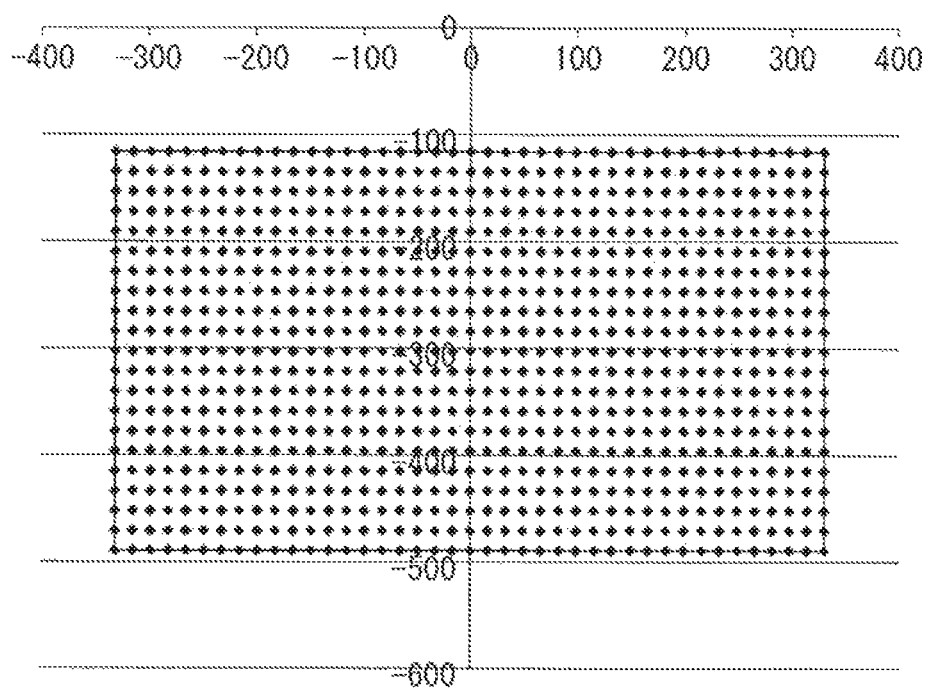

[ FIG. 9 ]
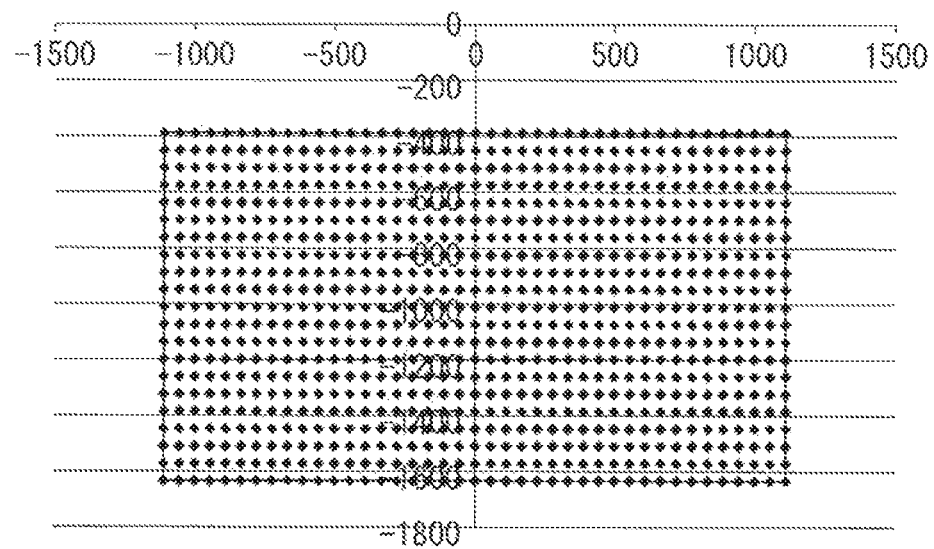
[ FIG. 10 ]
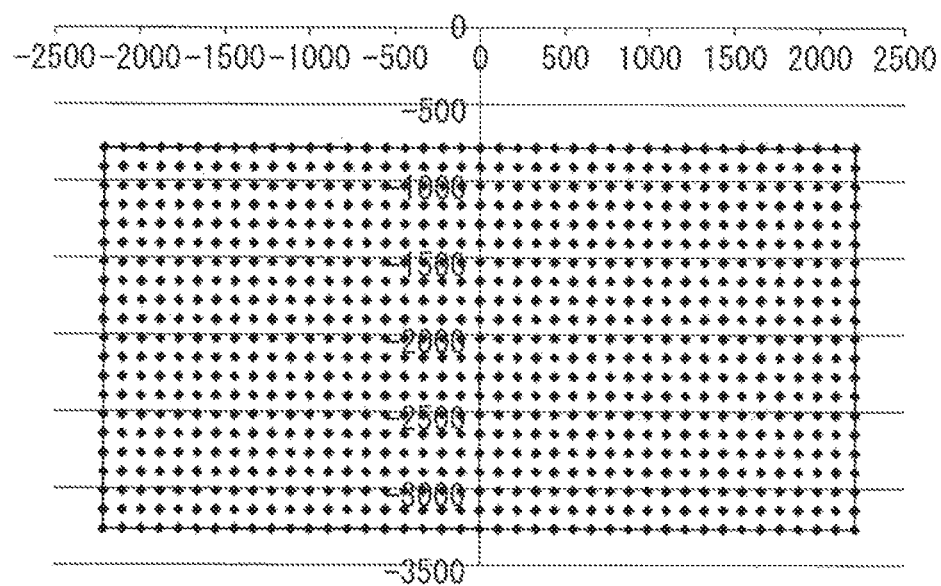

[FIG. 11]
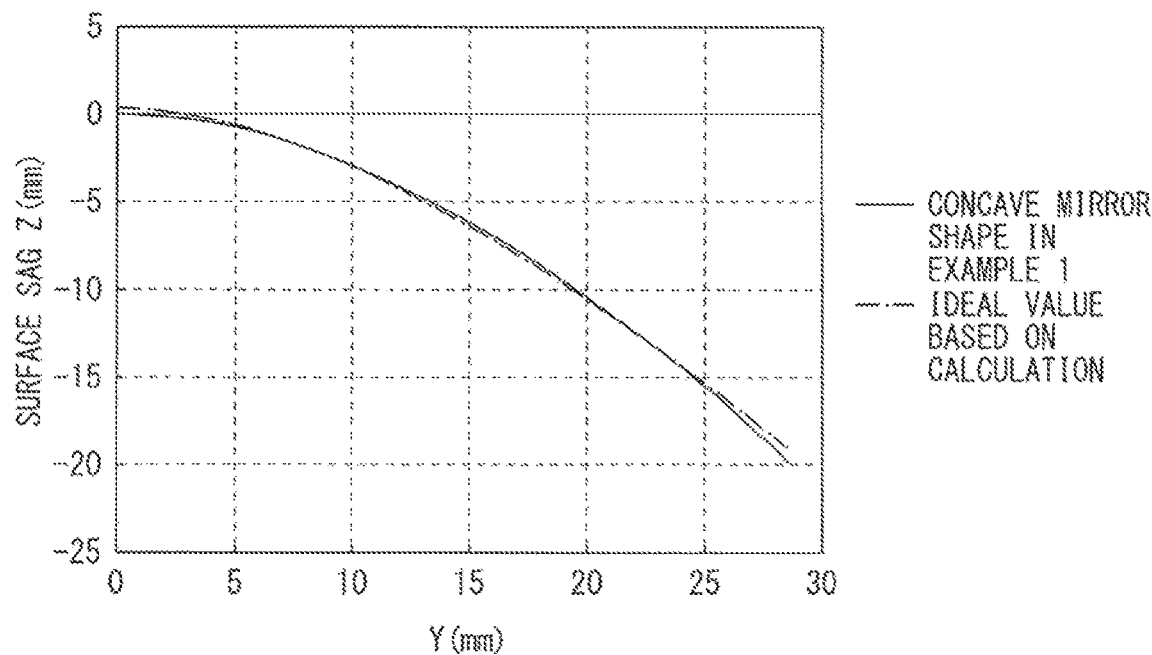
[FIG. 12]
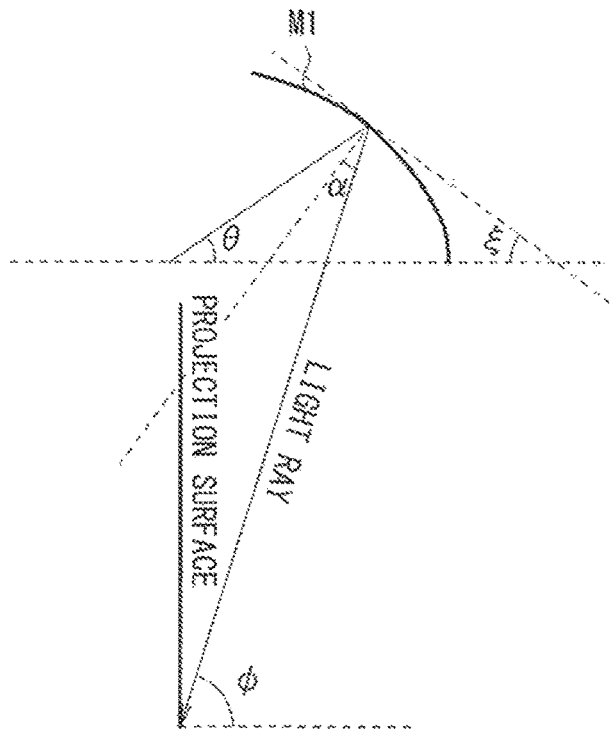
$\alpha = \{90 + \phi - (90 + \theta)\}/2 = (\phi - \theta)/2$
$\xi = 180 - \theta - (\alpha + 90)$
$= 90 - \theta - \alpha$
$= 90 - \phi/2 - \theta/2$

[ FIG. 13 ]
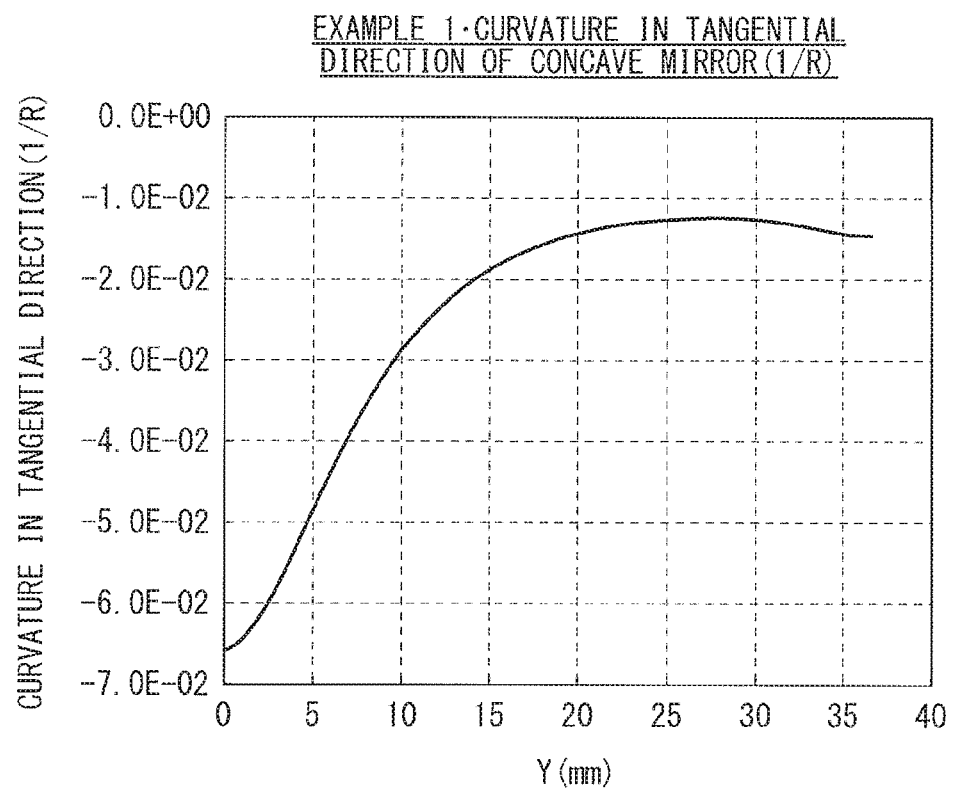

[ FIG. 14 ]
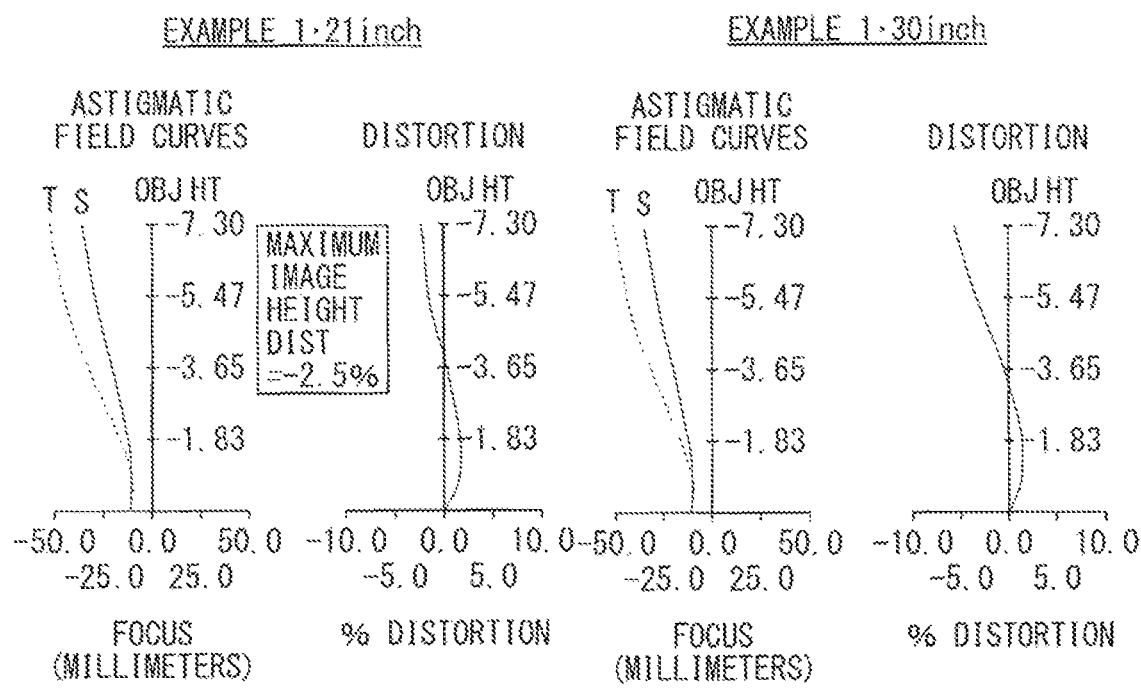
[ FIG. 15 ]
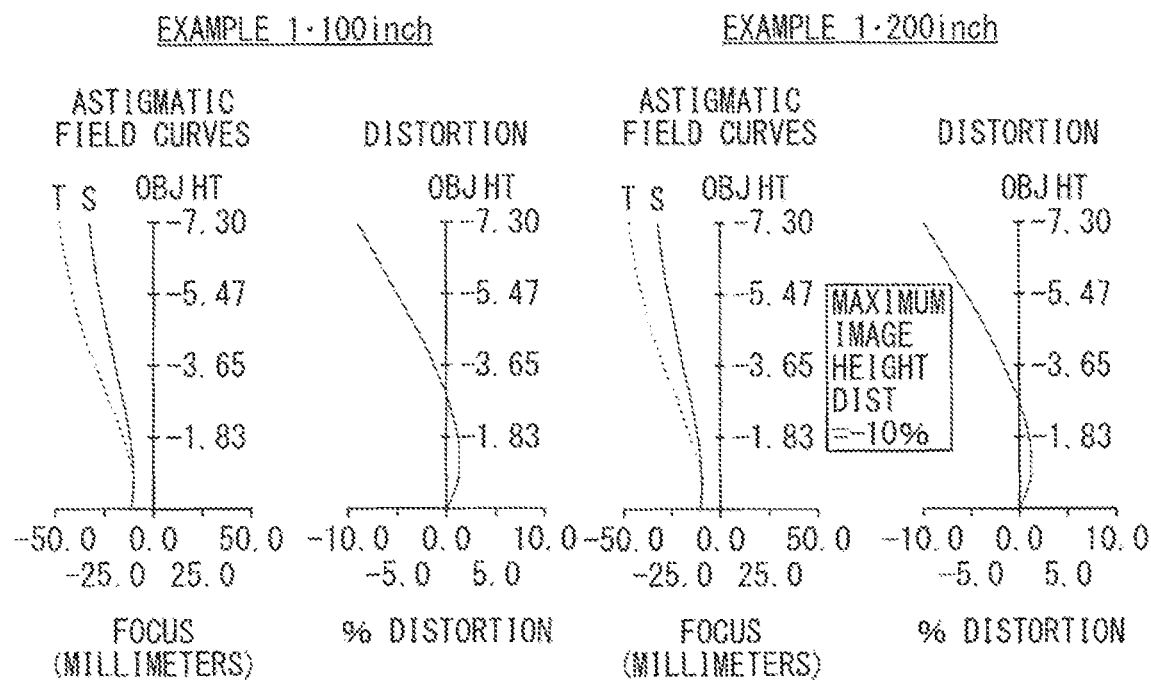

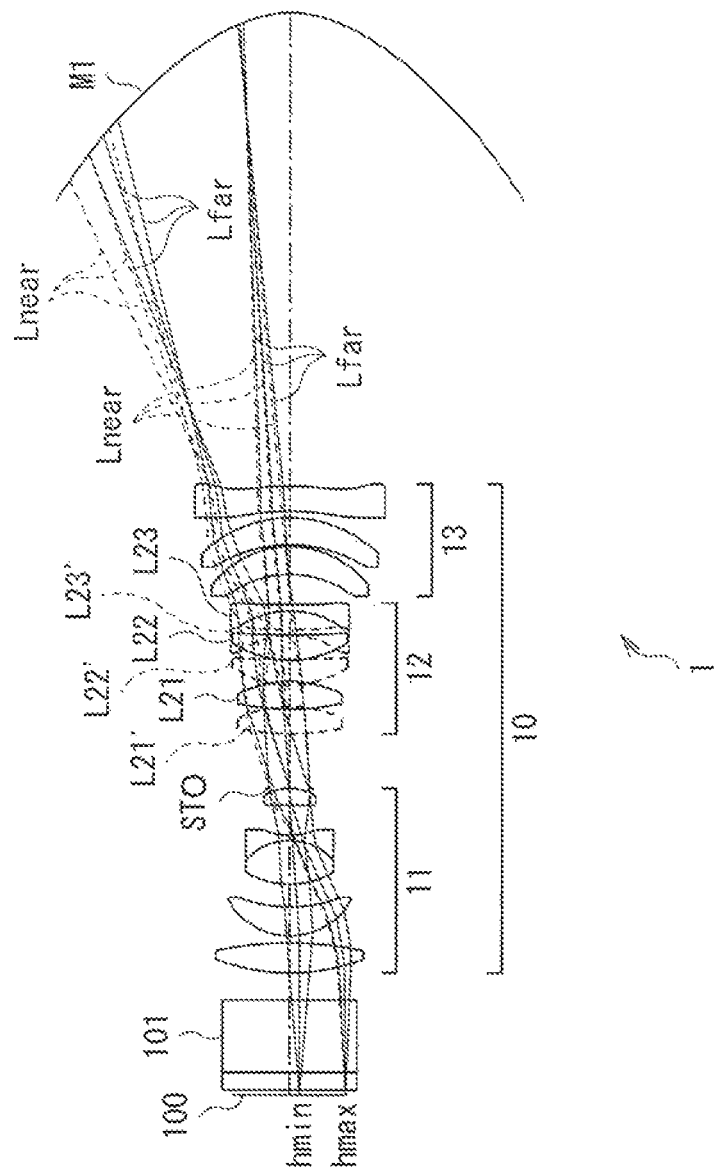

[ FIG. 17 ]
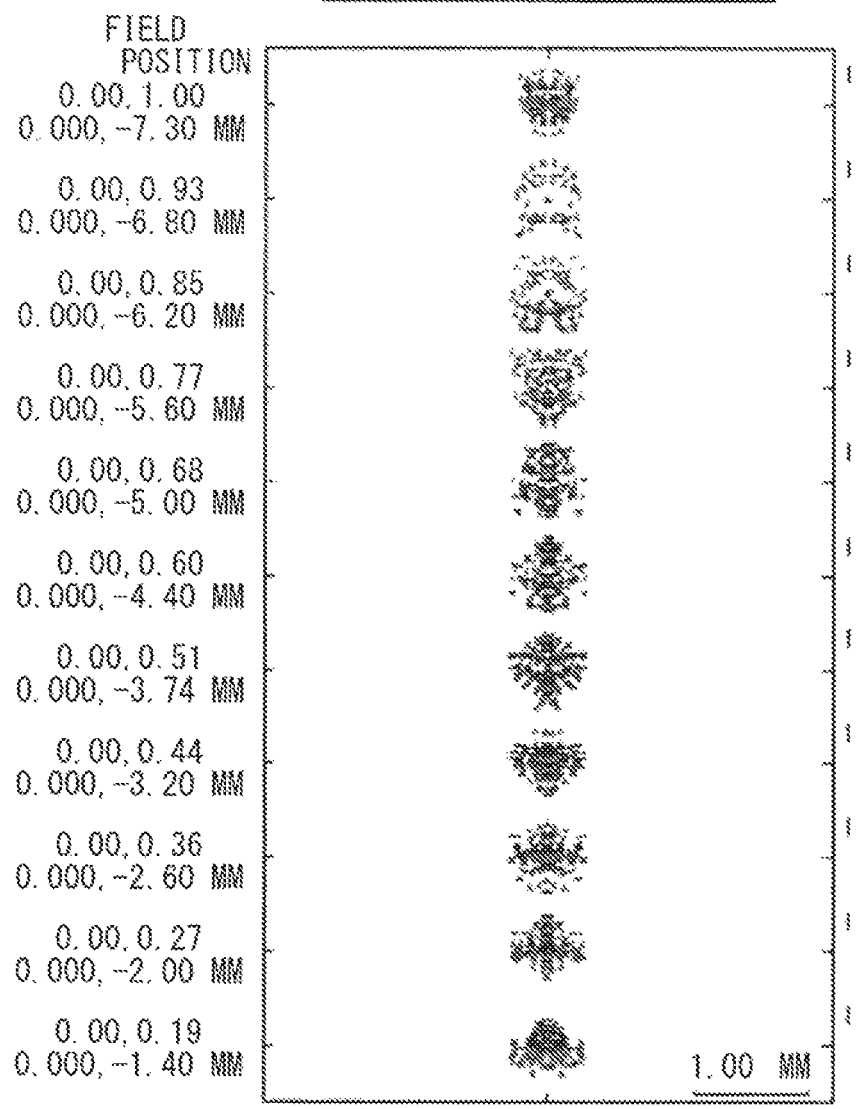

[ FIG. 18 ]
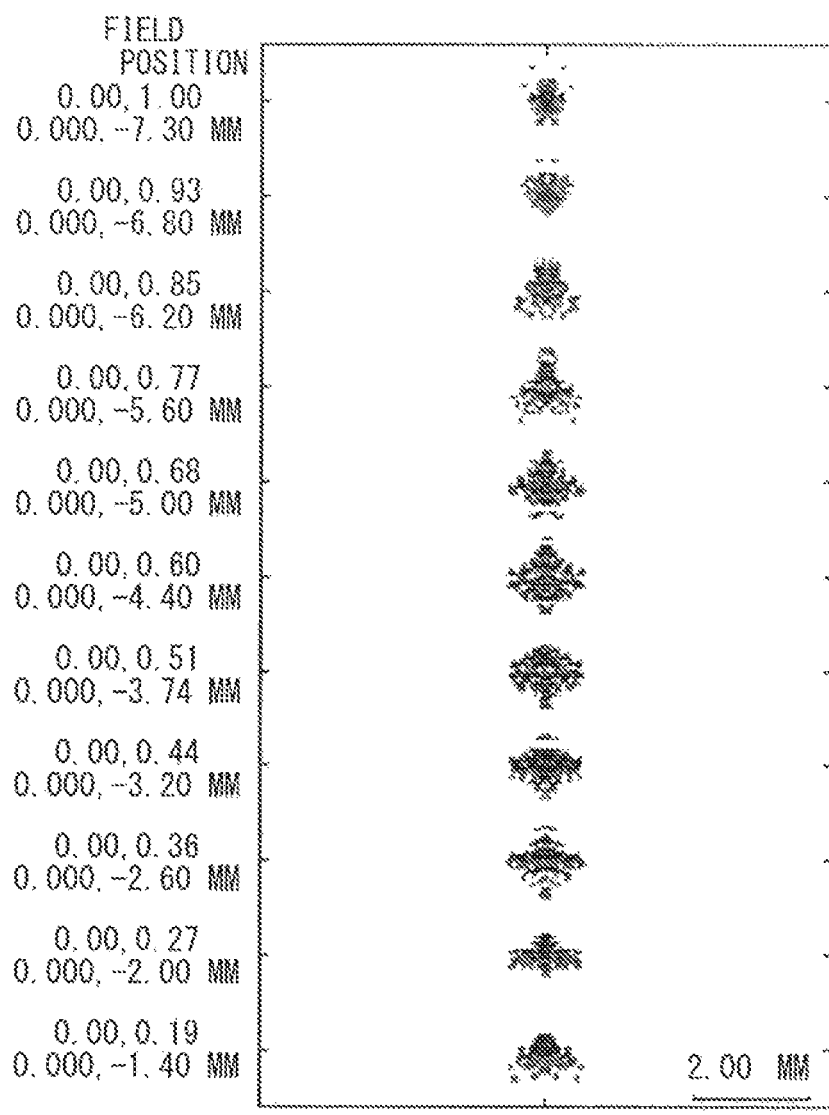

[FIG. 19]
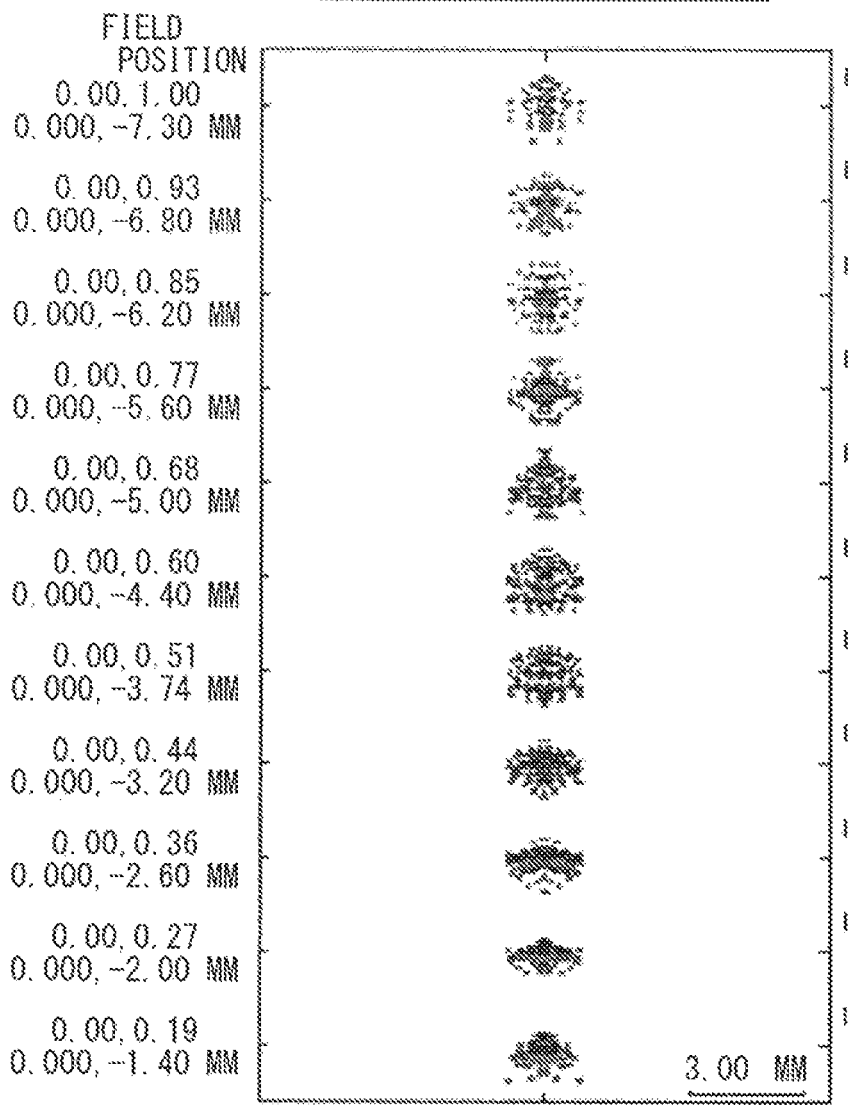

[ FIG. 20 ]
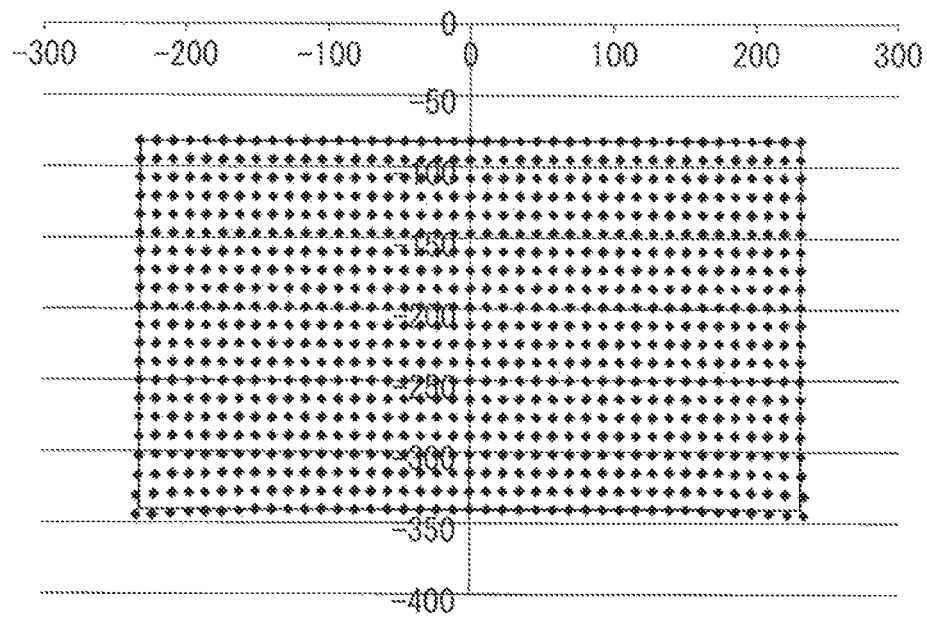
[ FIG. 21 ]
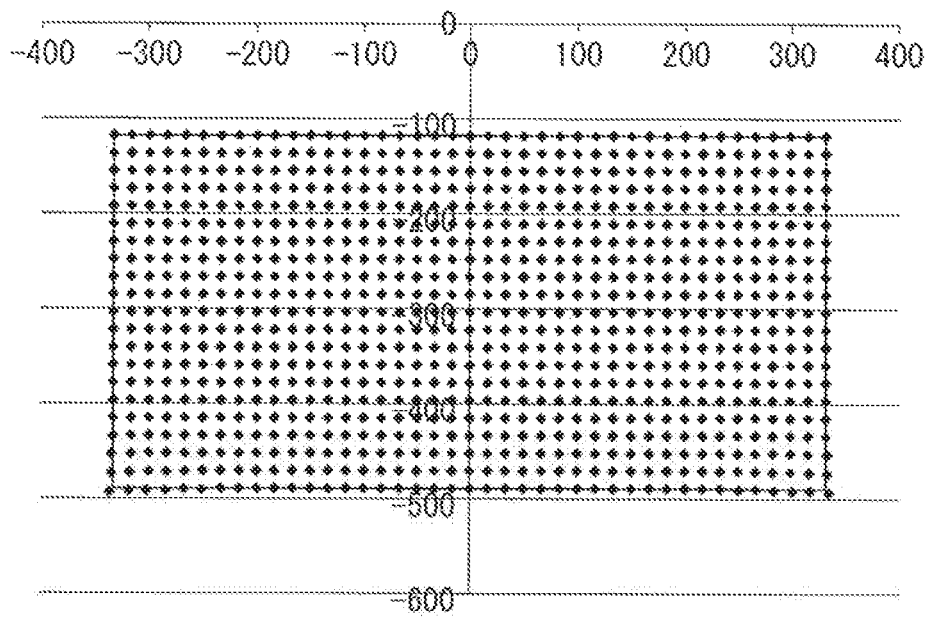

[ FIG. 22 ]
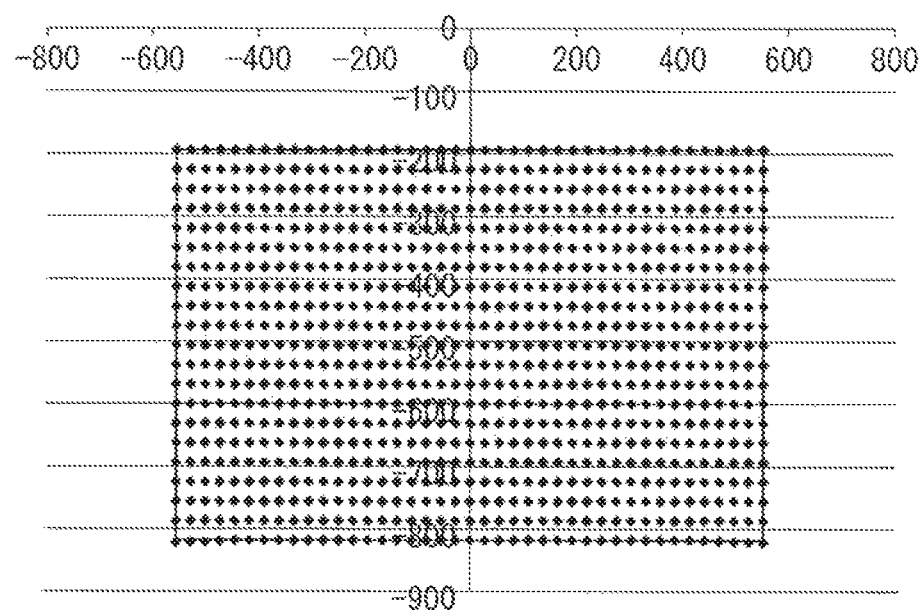

[ FIG. 23 ]
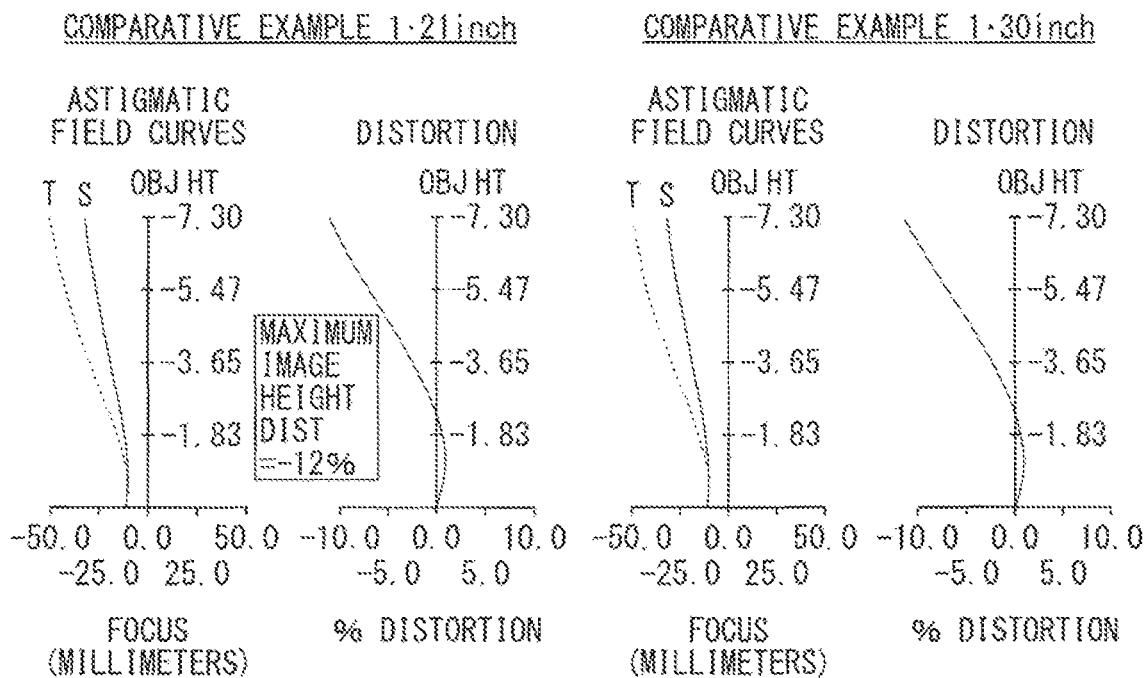
[ FIG. 24 ]
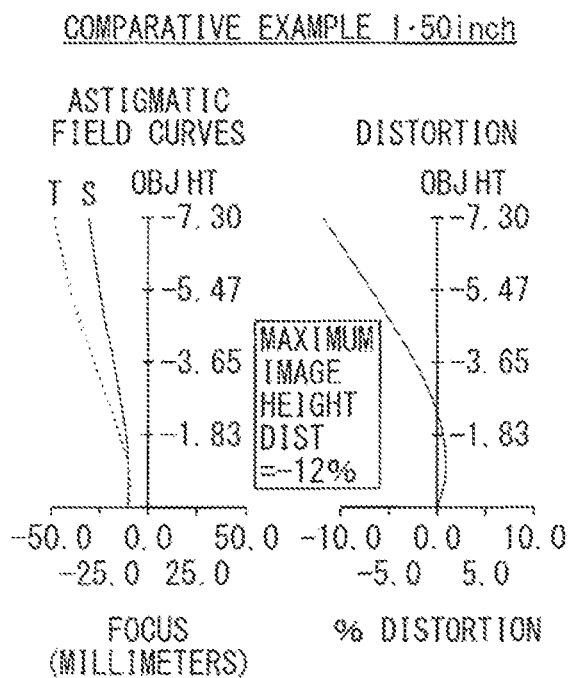

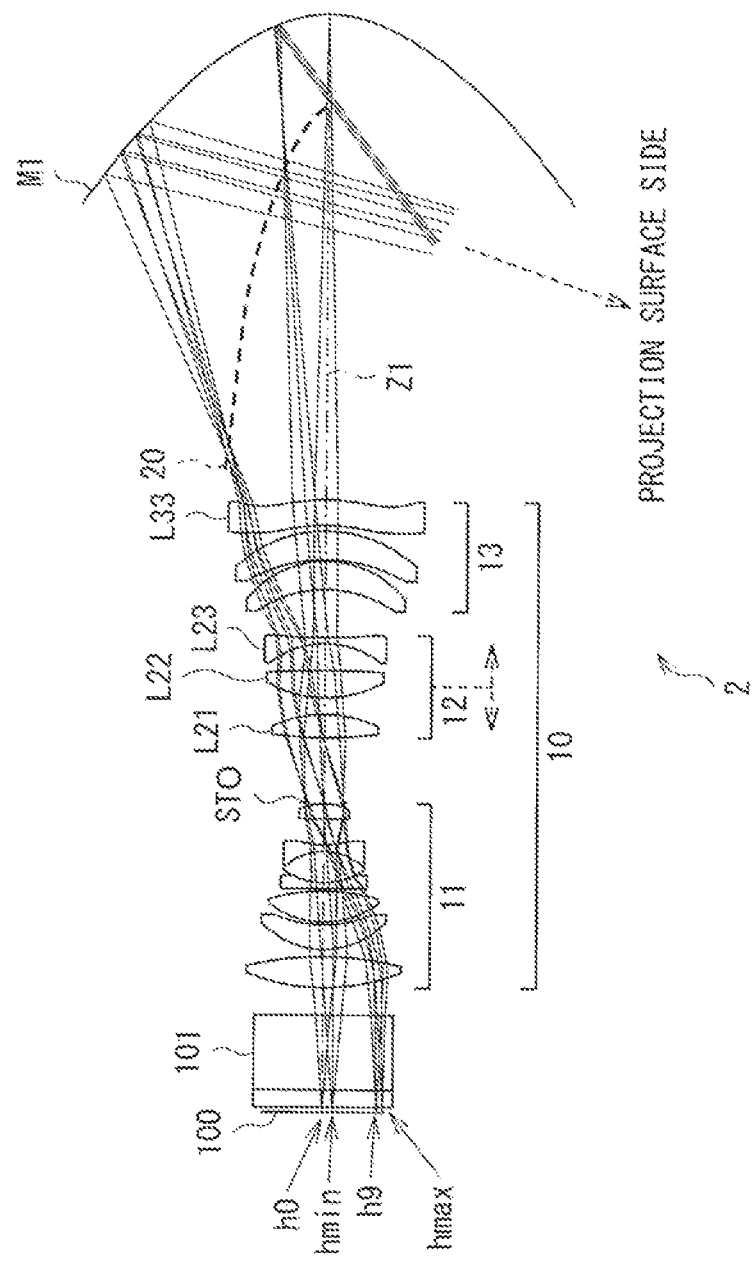

[FIG. 26]
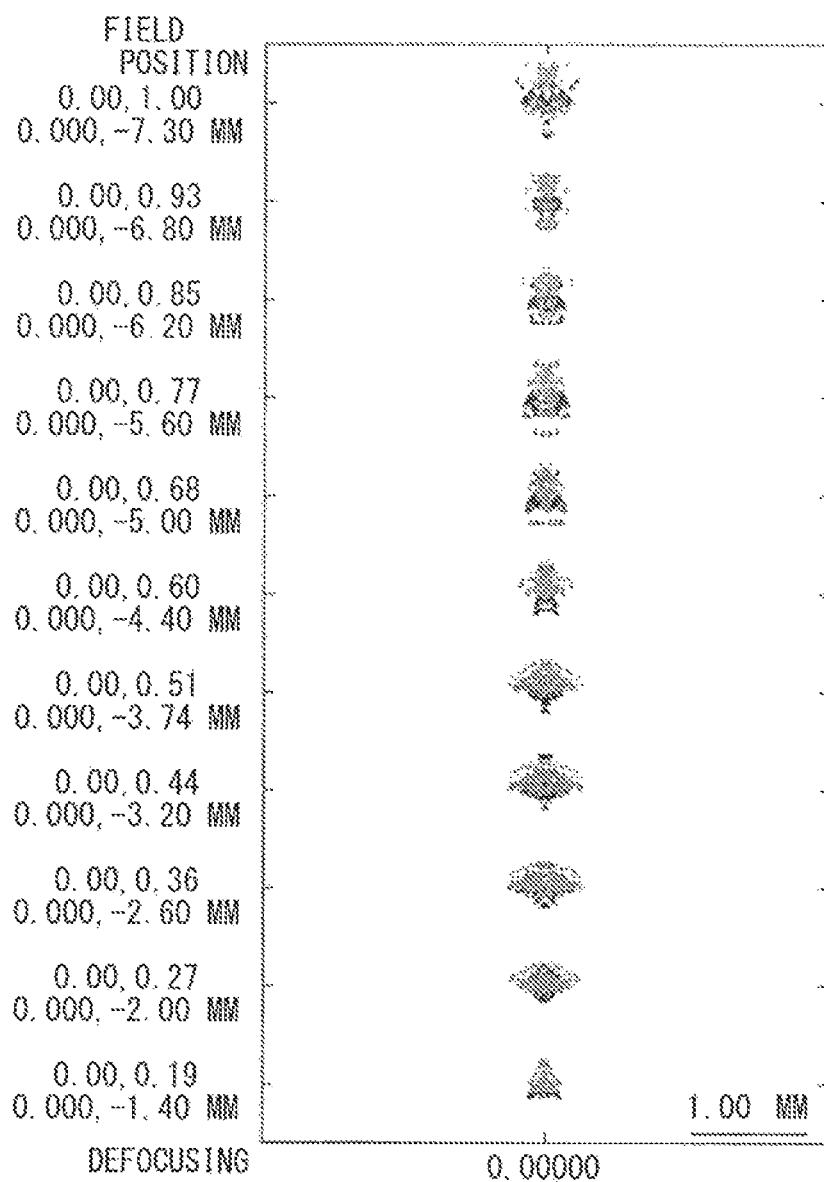

[FIG. 27]
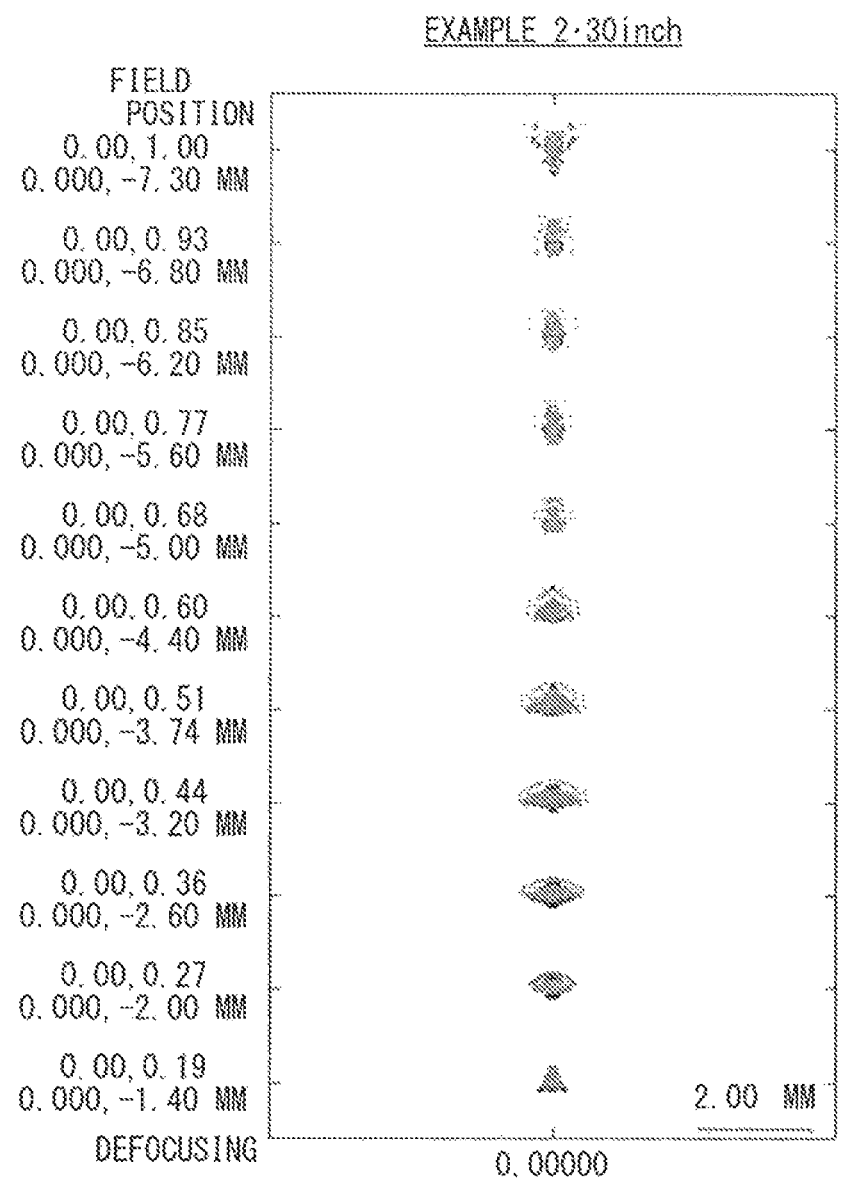

[ FIG. 28 ]
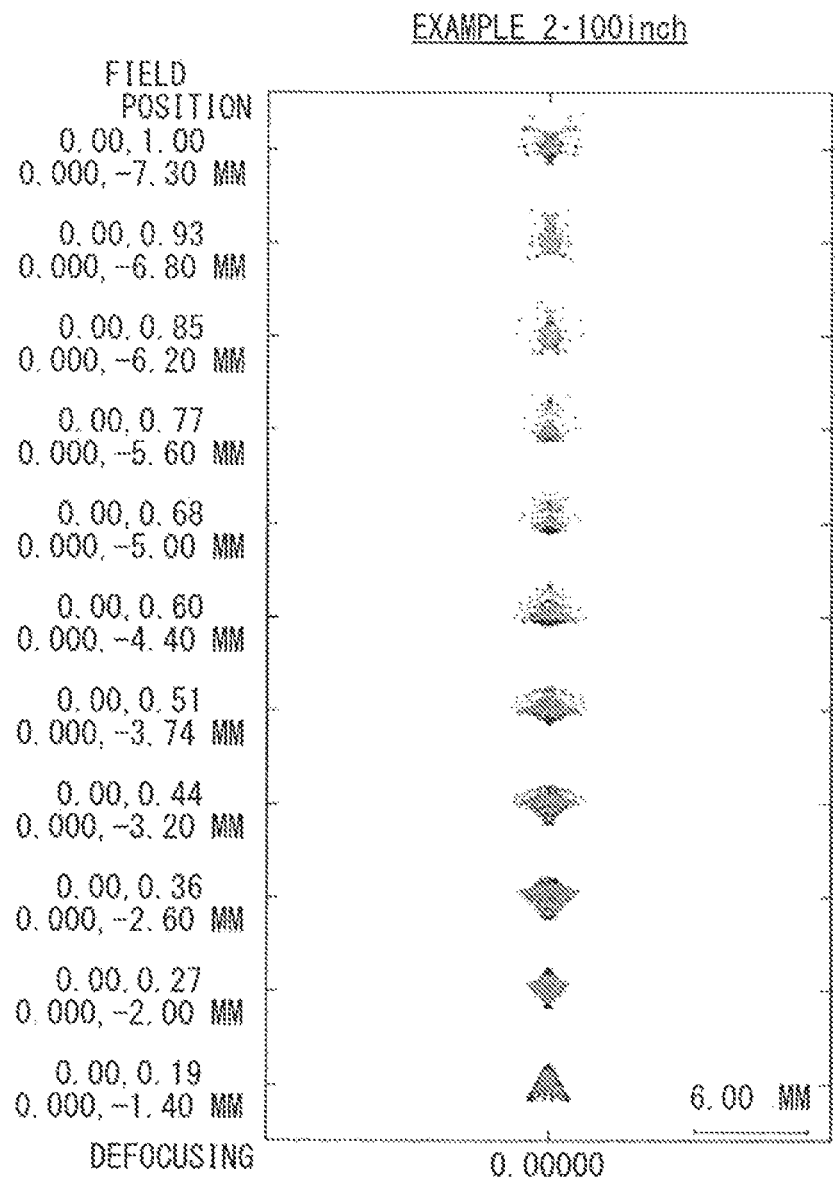

[FIG. 29]
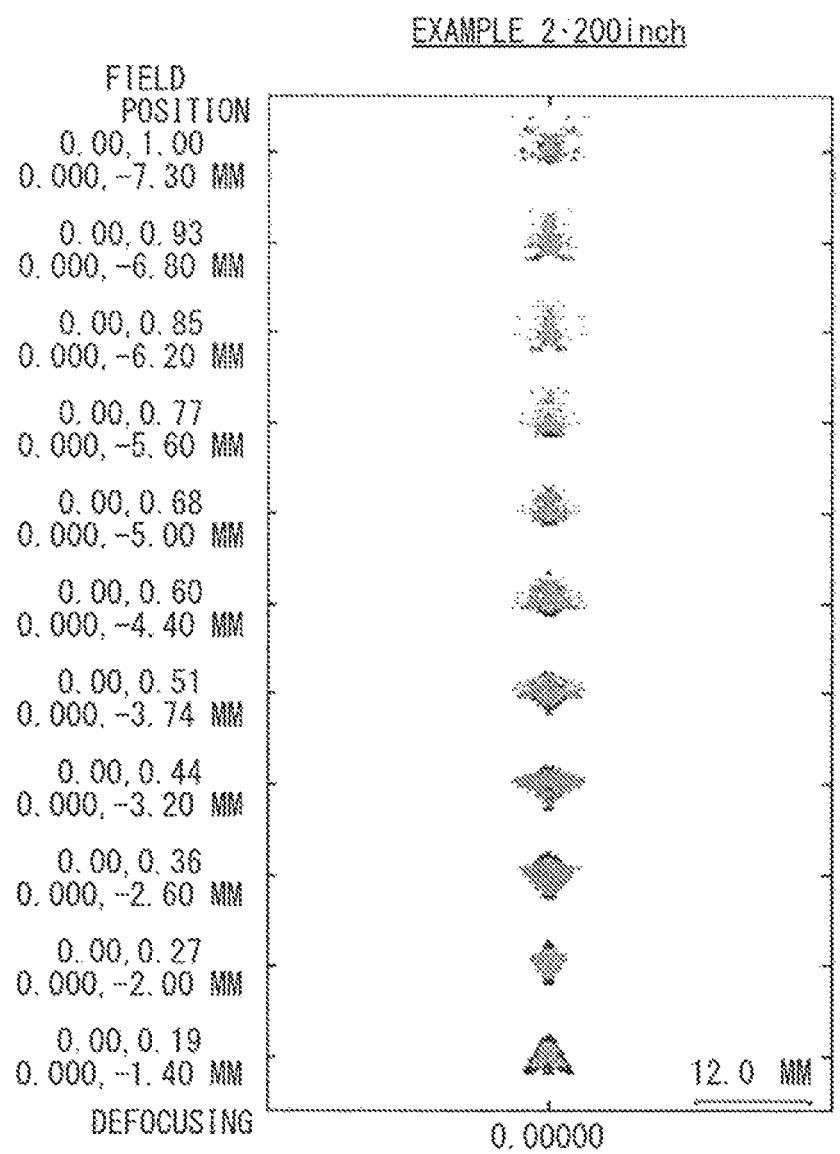

[ FIG. 30 ]
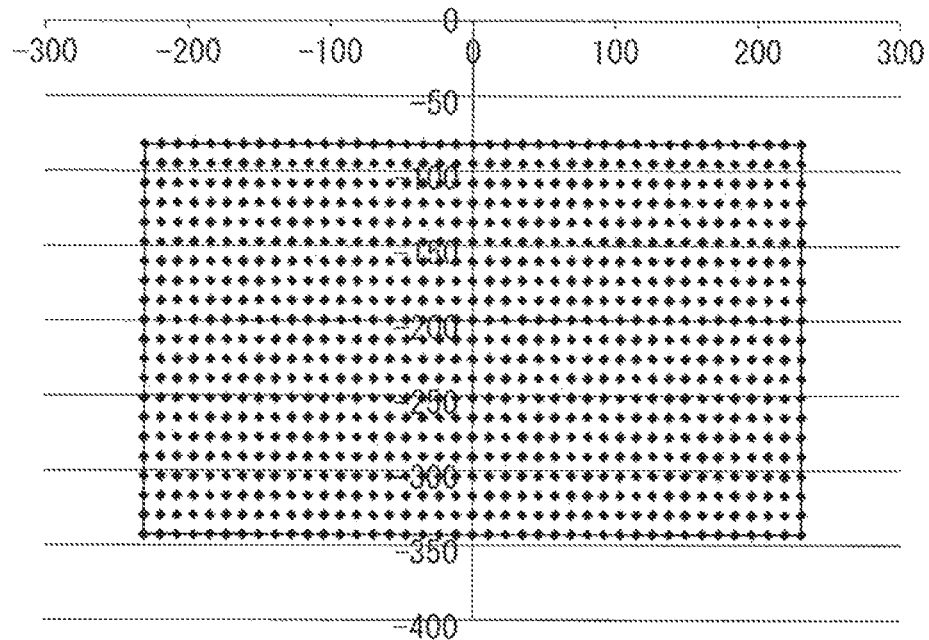
[ FIG. 31 ]
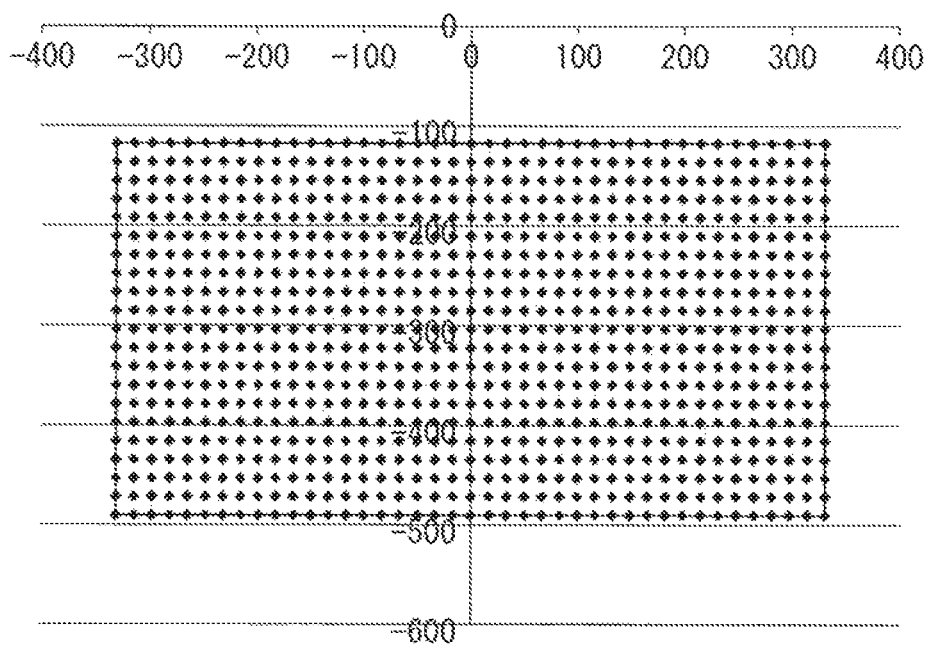

[ FIG. 32 ]
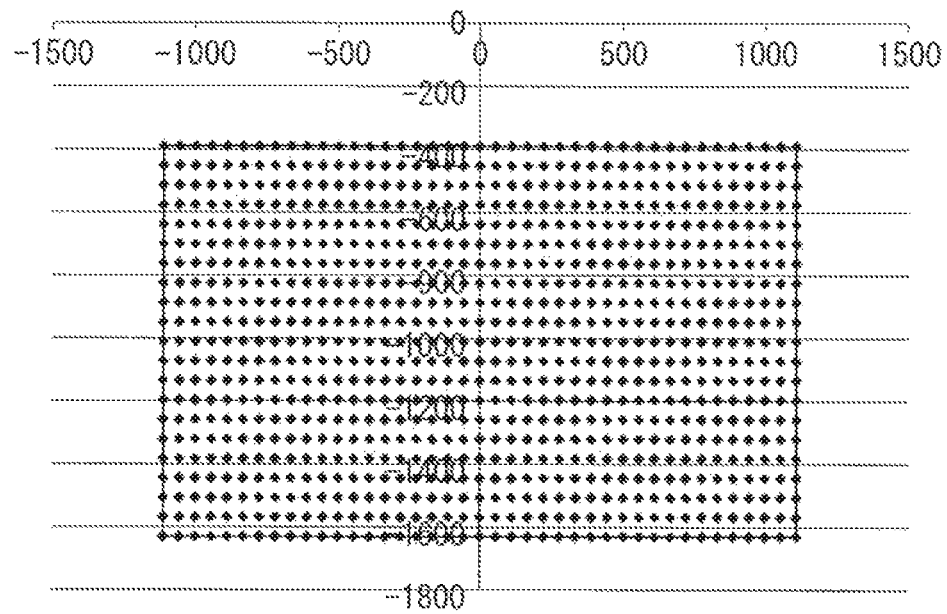
[ FIG. 33 ]
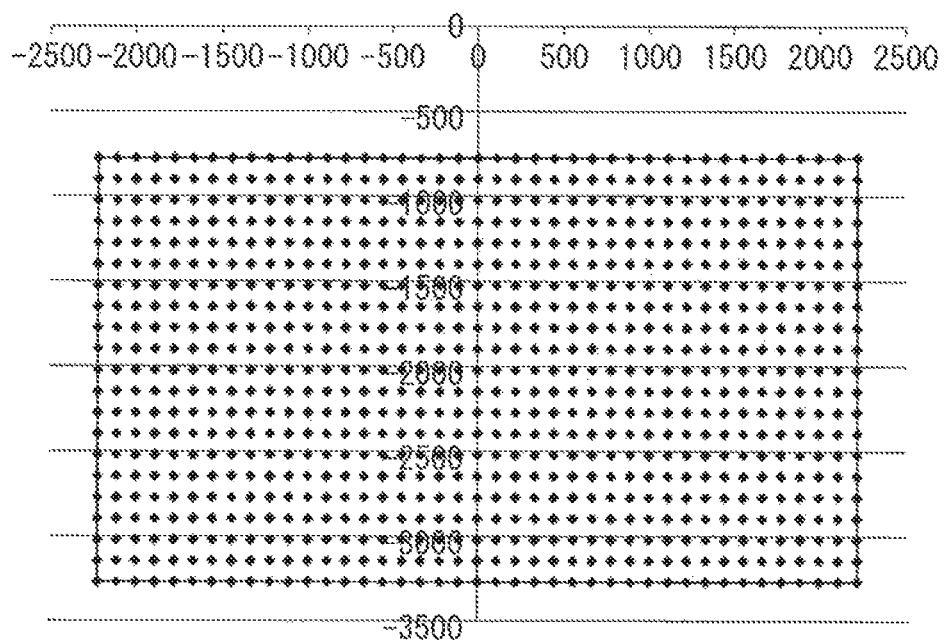

[FIG. 34]
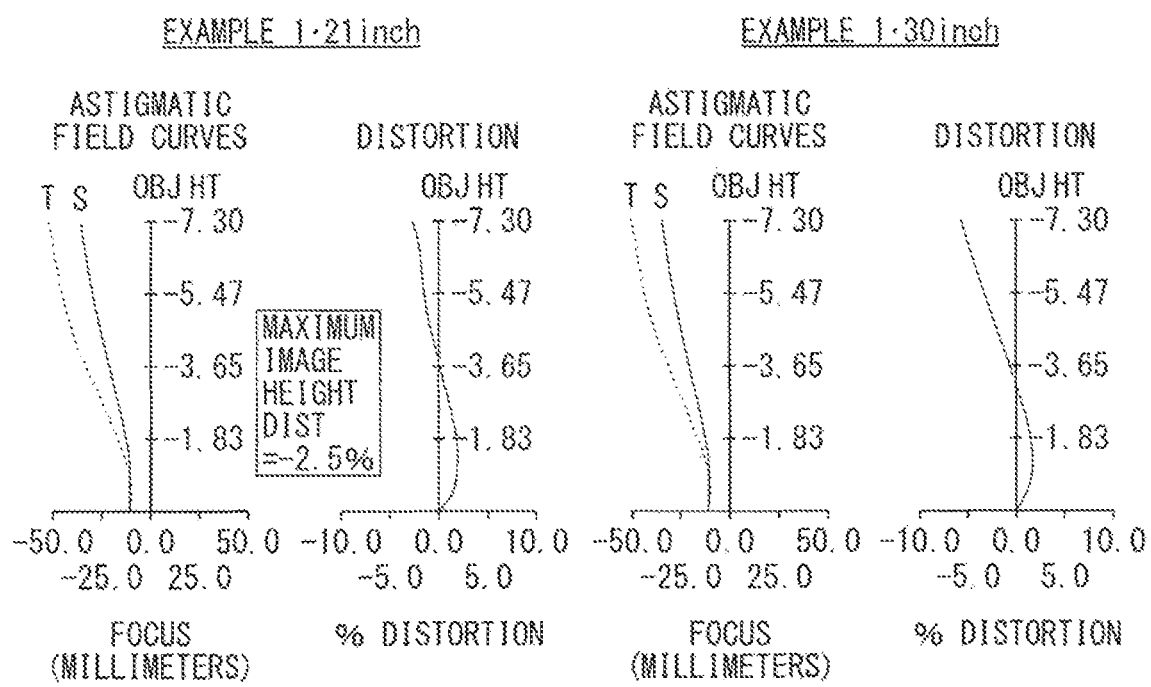
[FIG. 35]
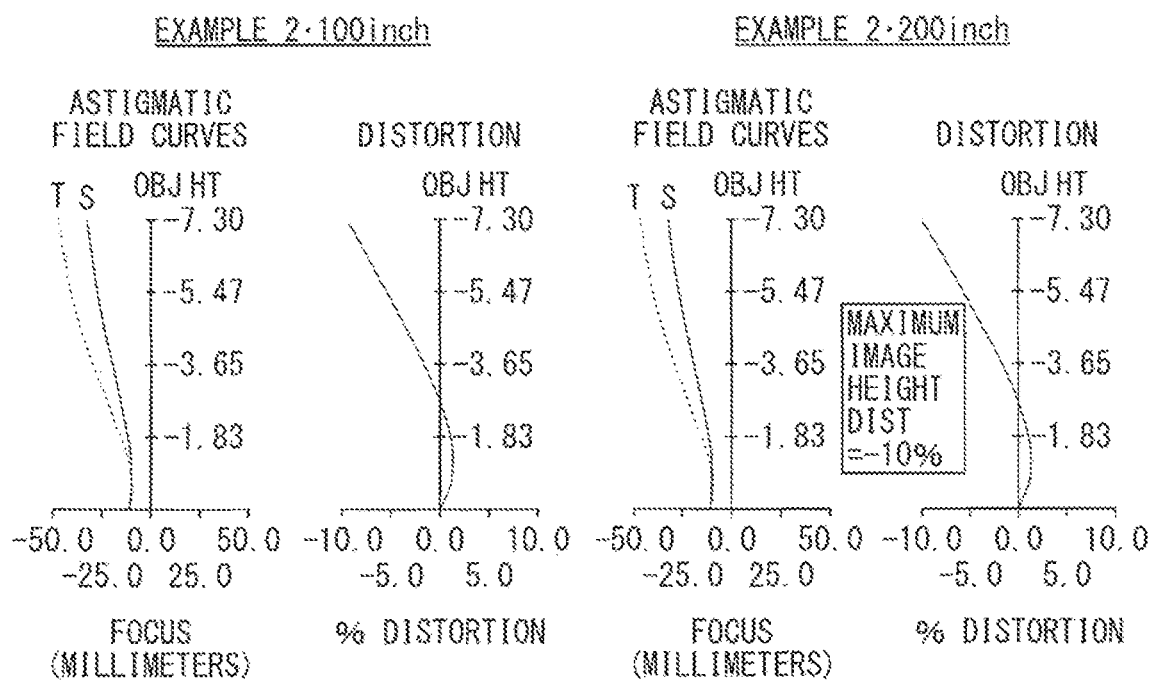

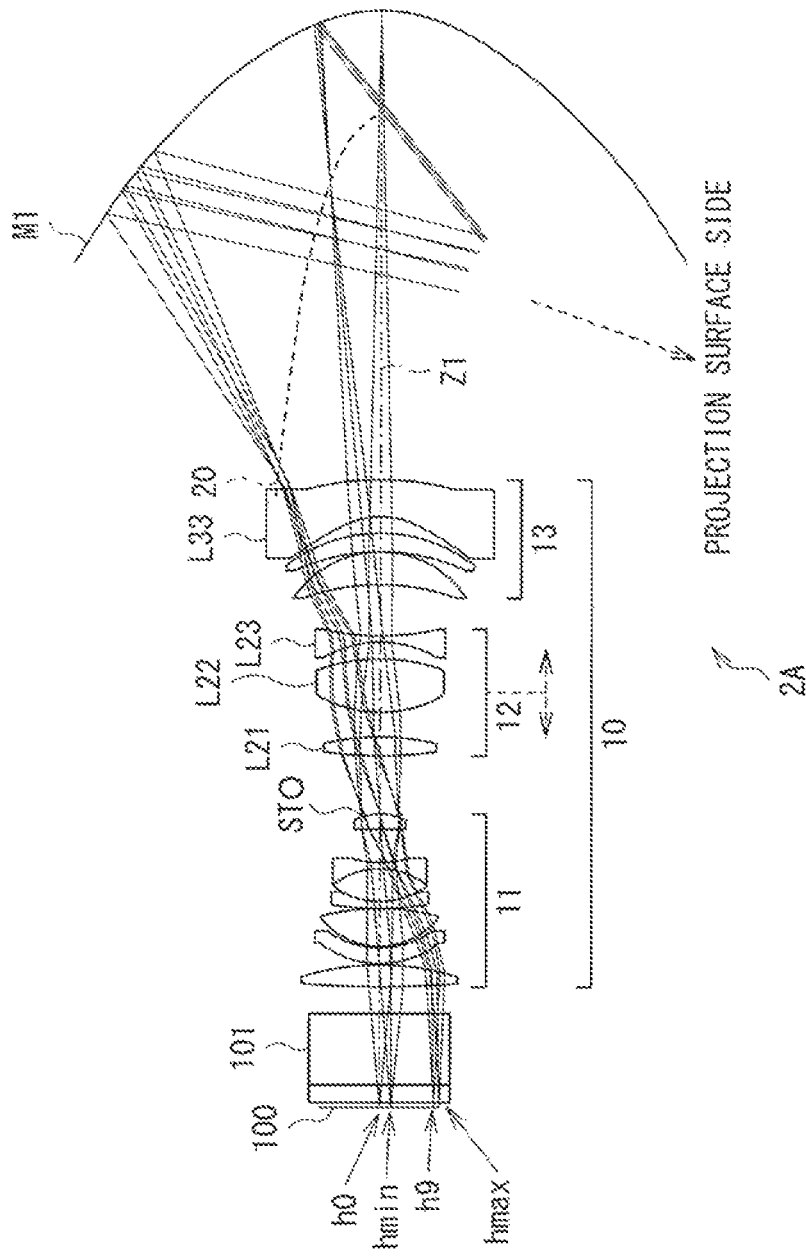

[FIG. 37]
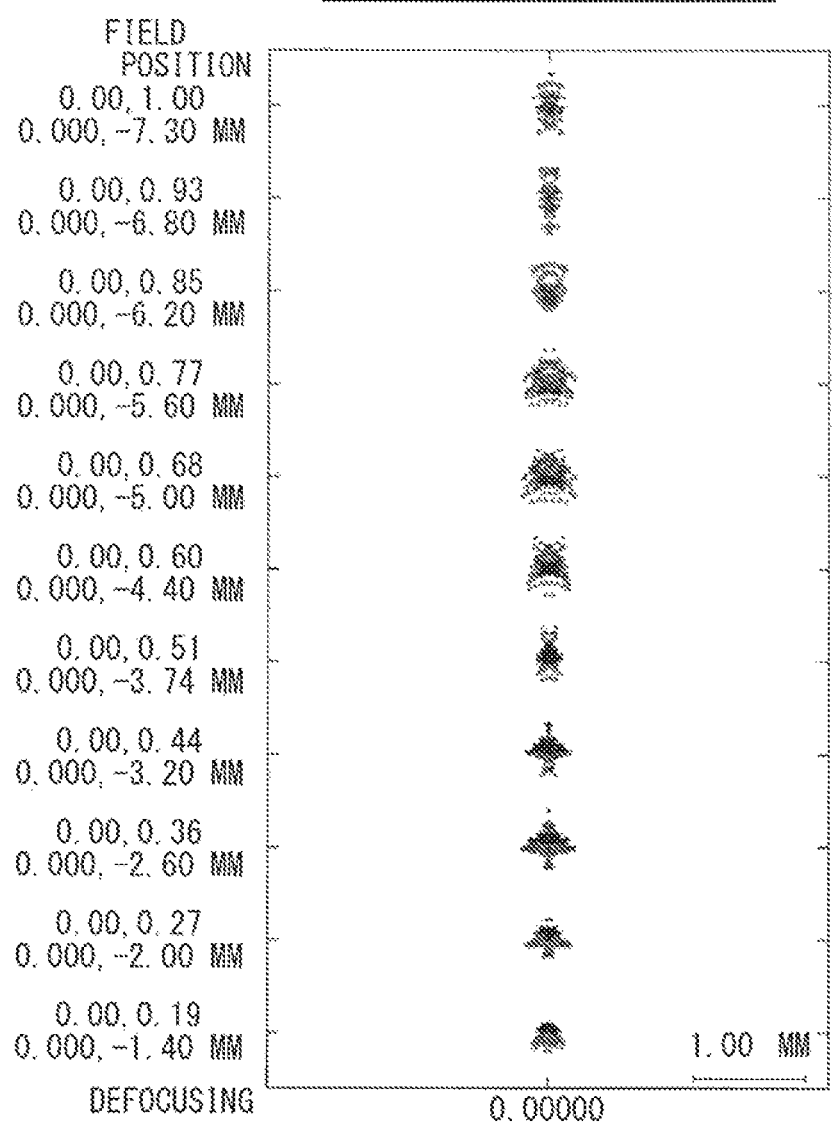

[ FIG. 38 ]
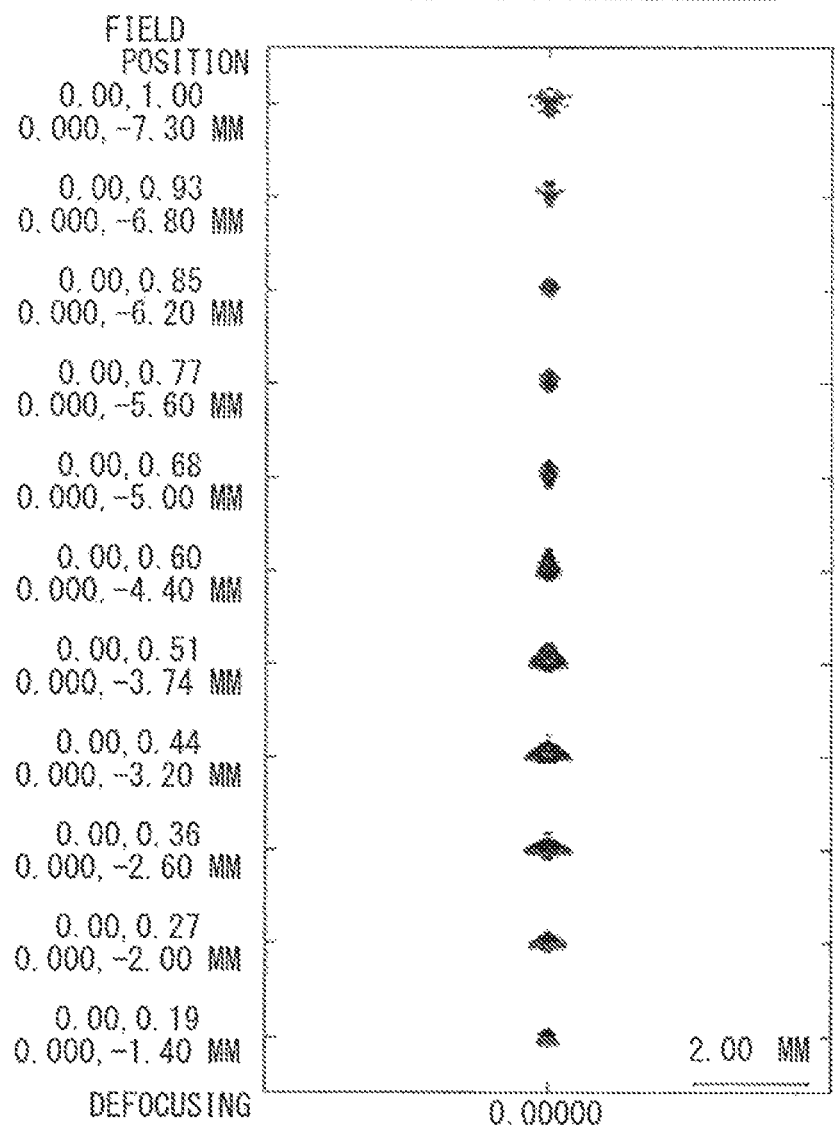

[FIG. 39]
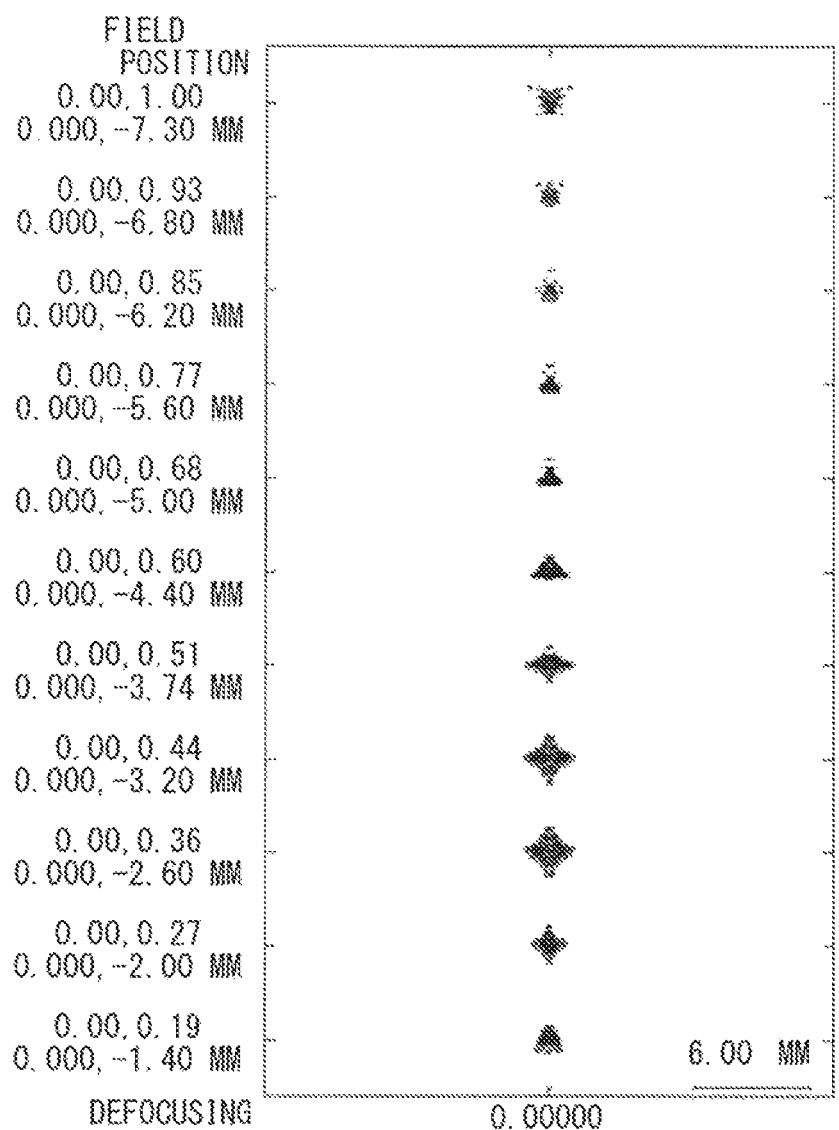

[FIG. 40]
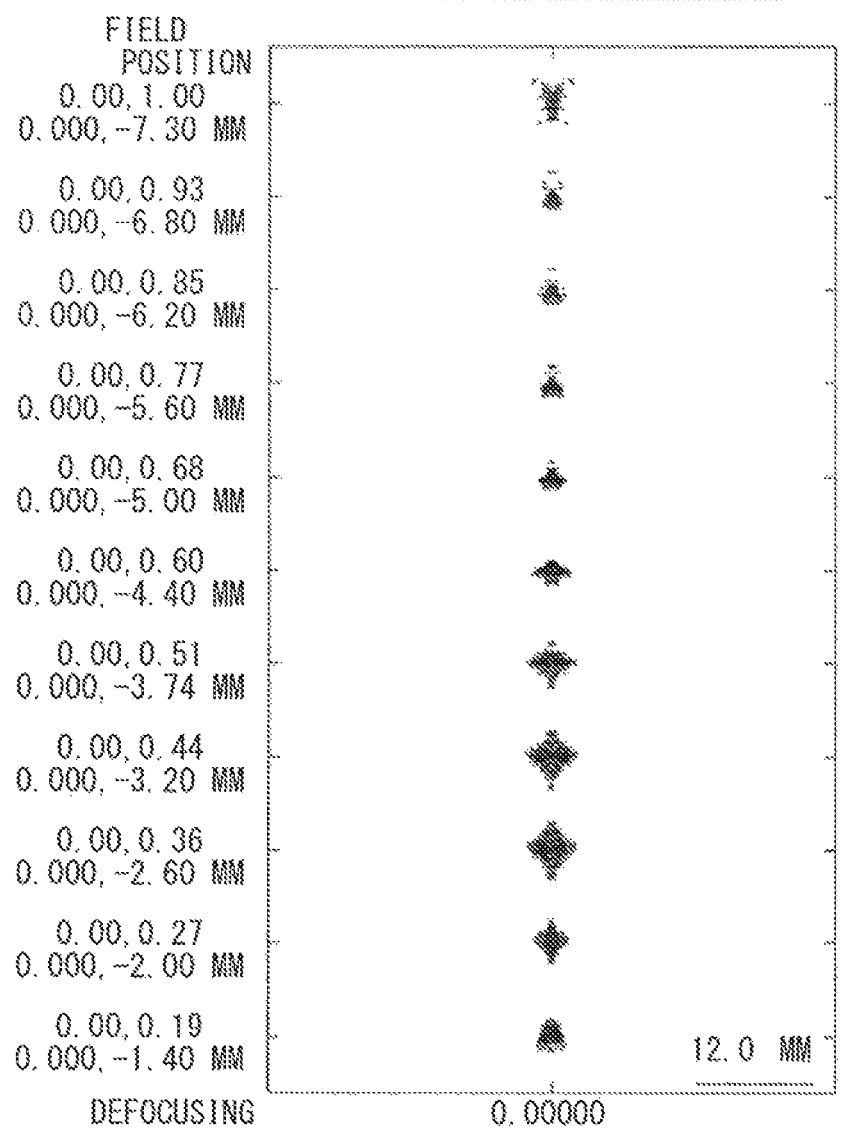

[ FIG. 41 ]
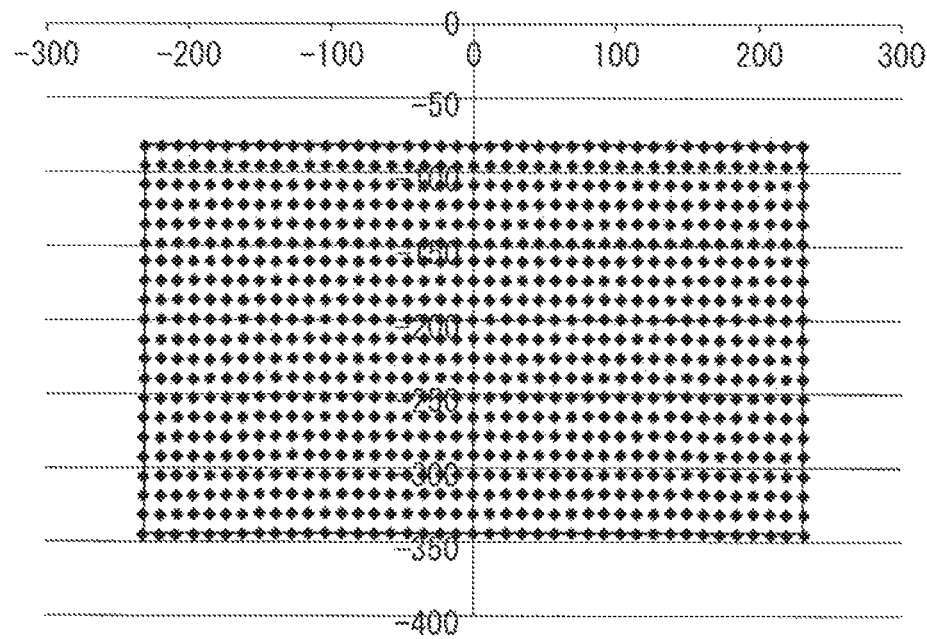
COMPARATIVE EXAMPLE 2·21inch
[ FIG. 42 ]
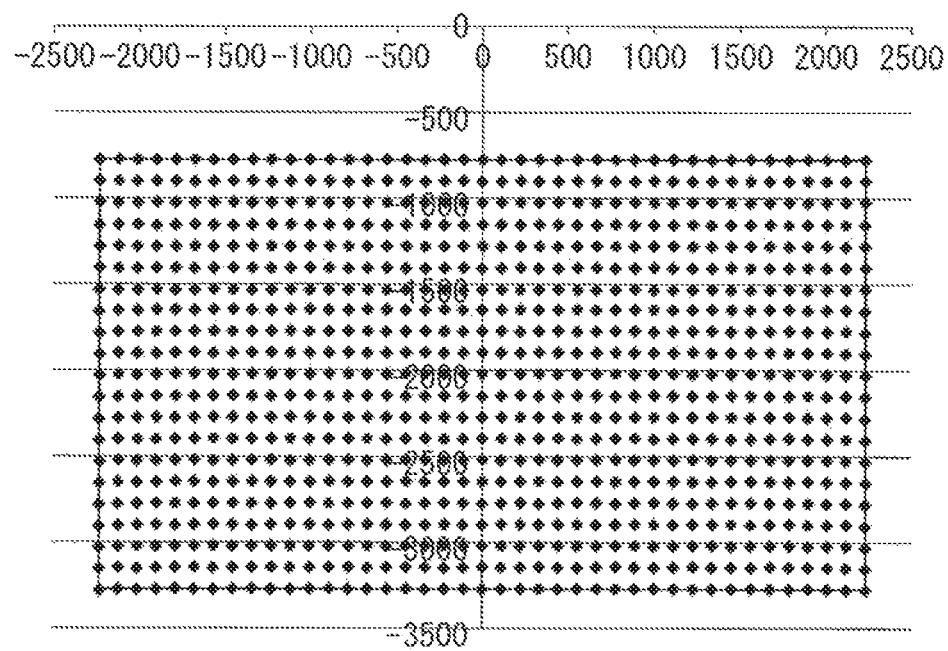
COMPARATIVE EXAMPLE 2·200inch

[FIG. 43]
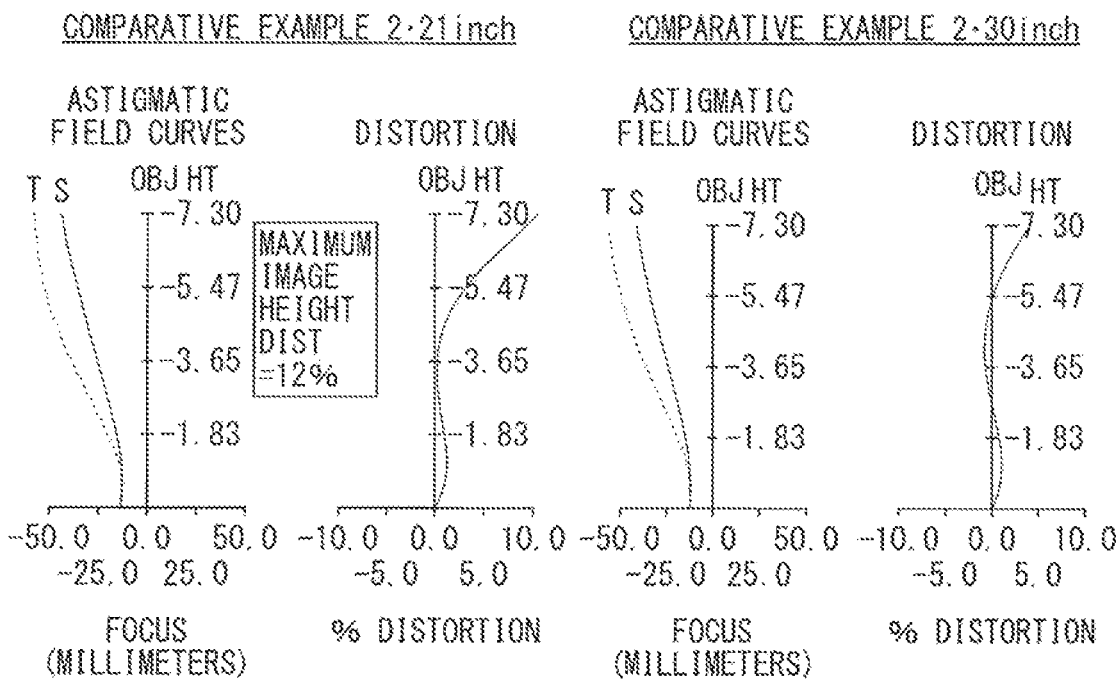
[FIG. 44]
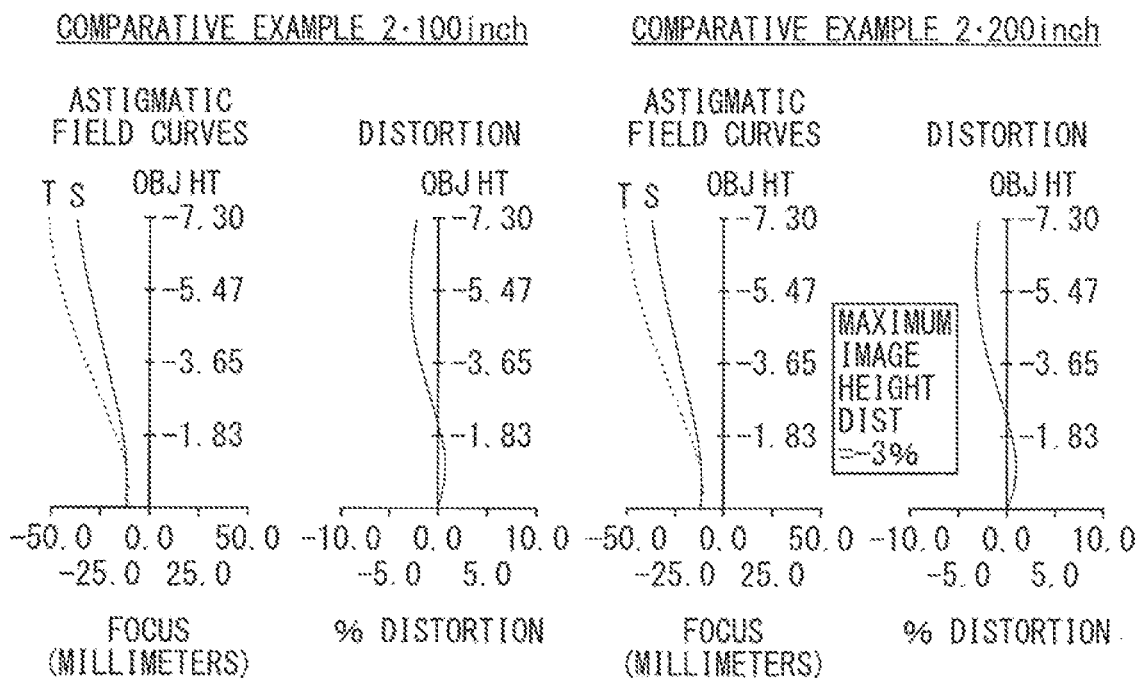

[FIG. 45]
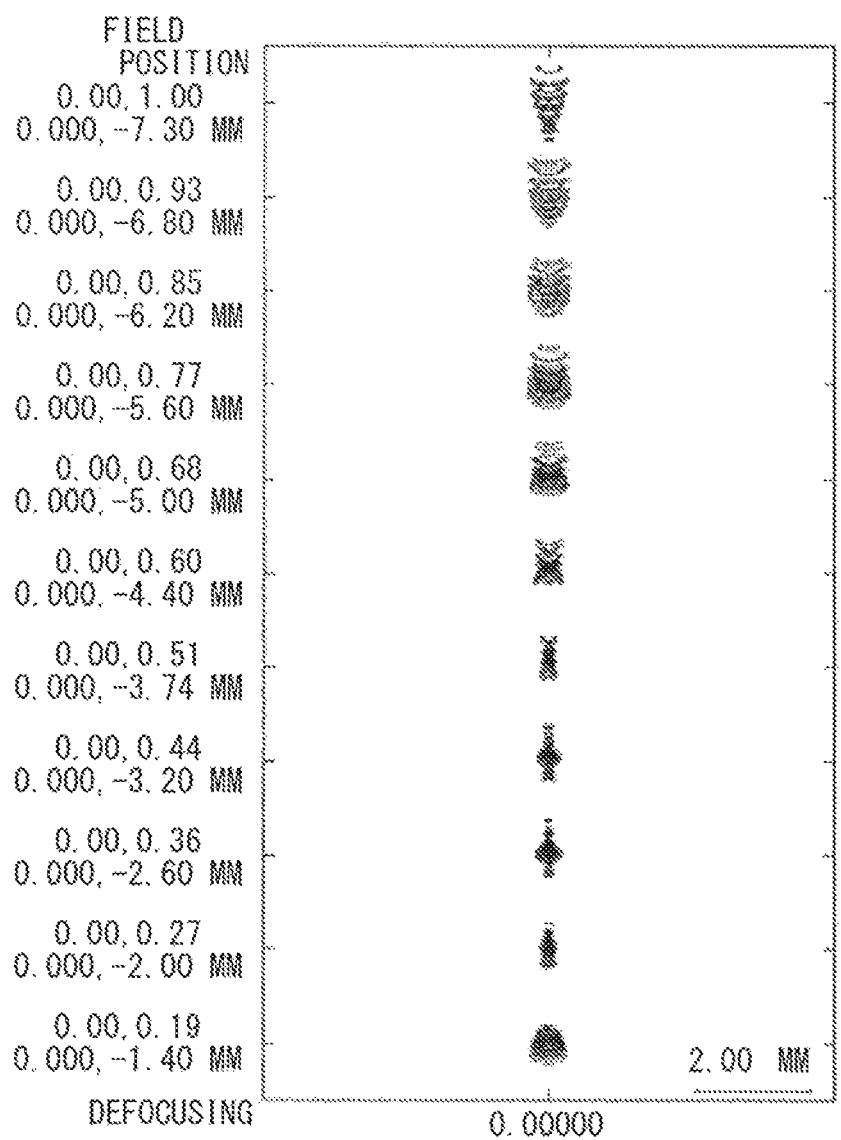

[FIG. 46]
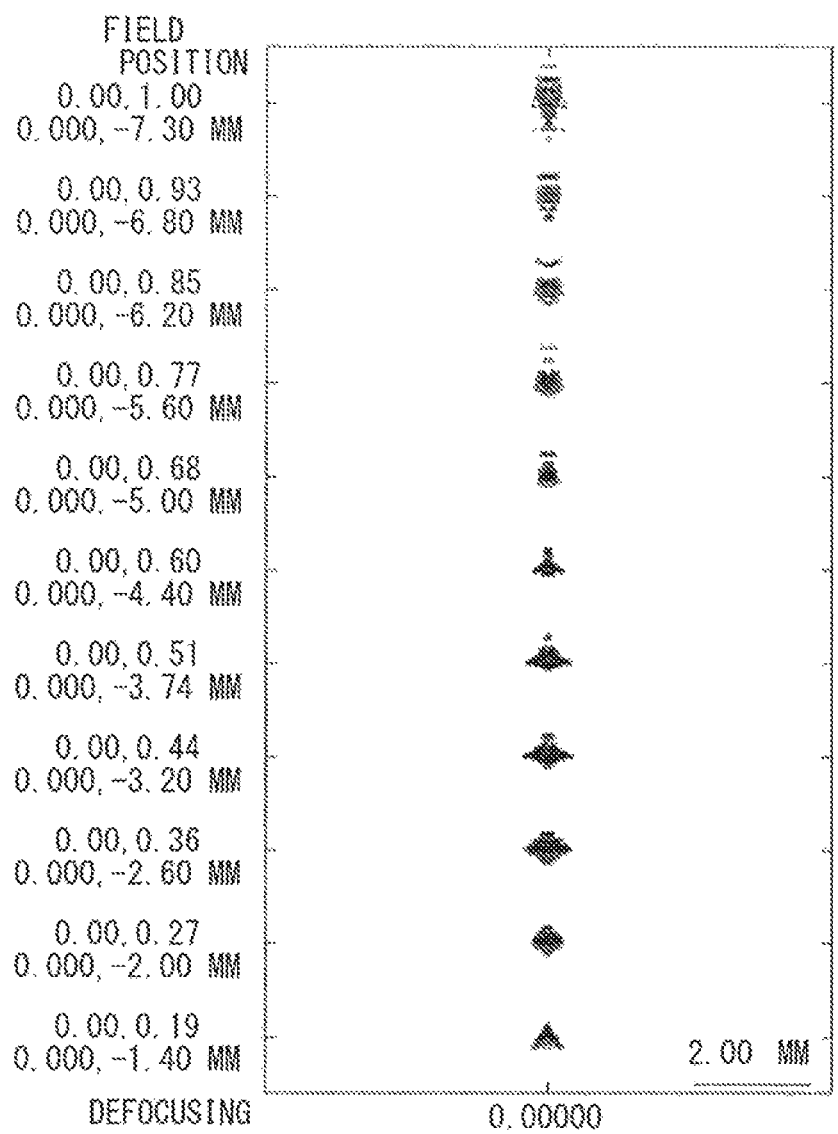

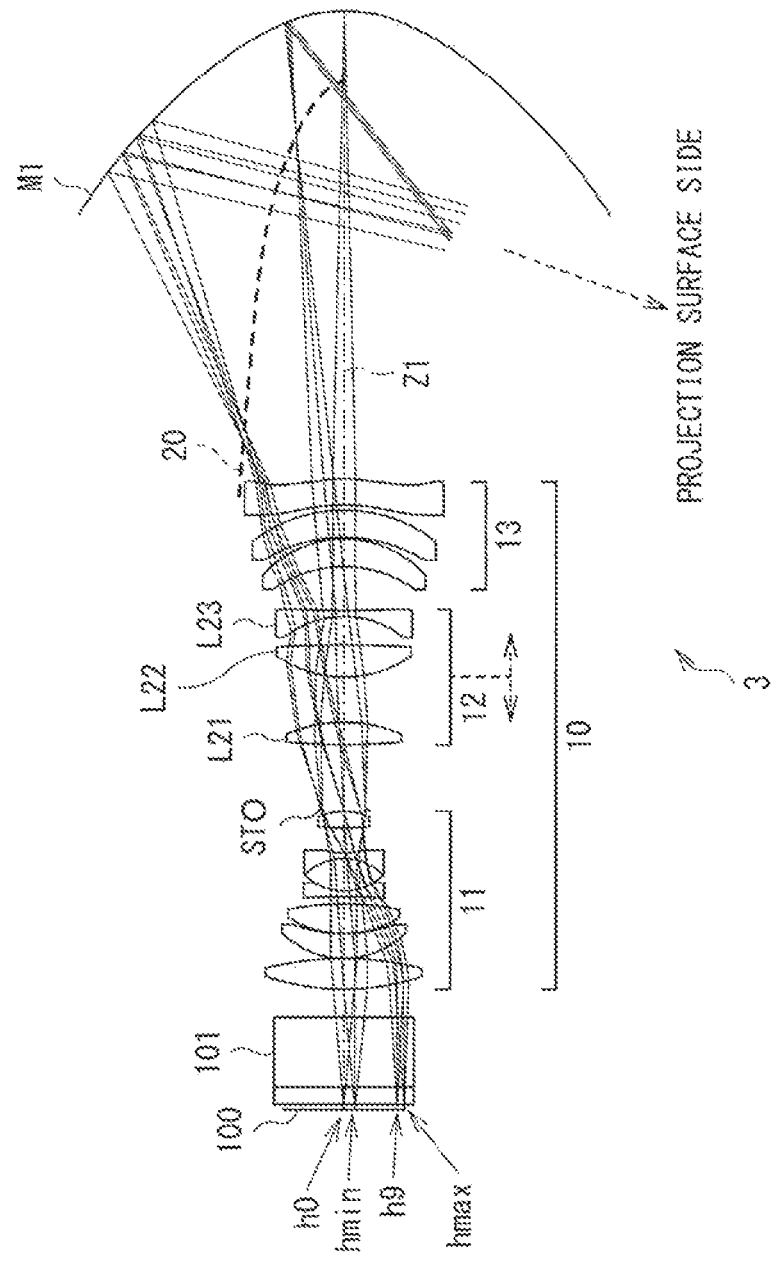
[FIG. 47]
EXAMPLE 3

[ FIG. 48 ]
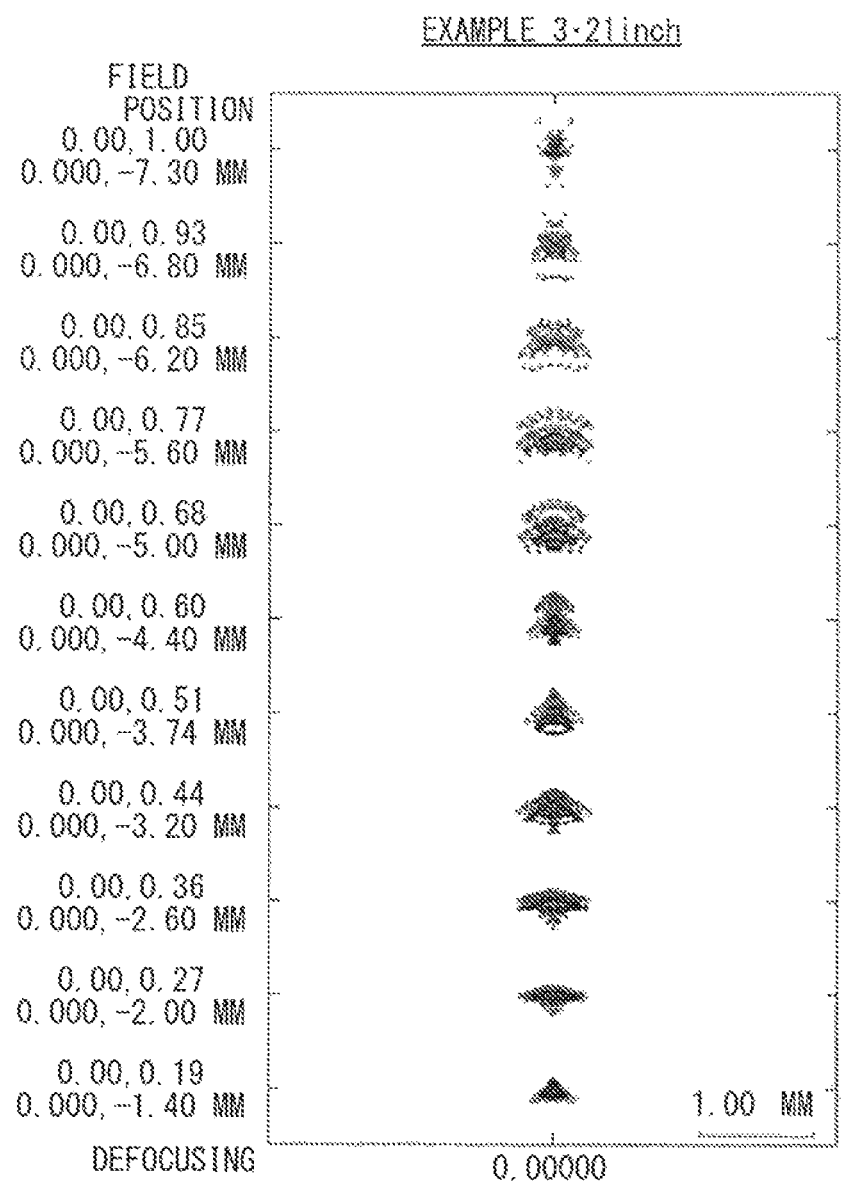

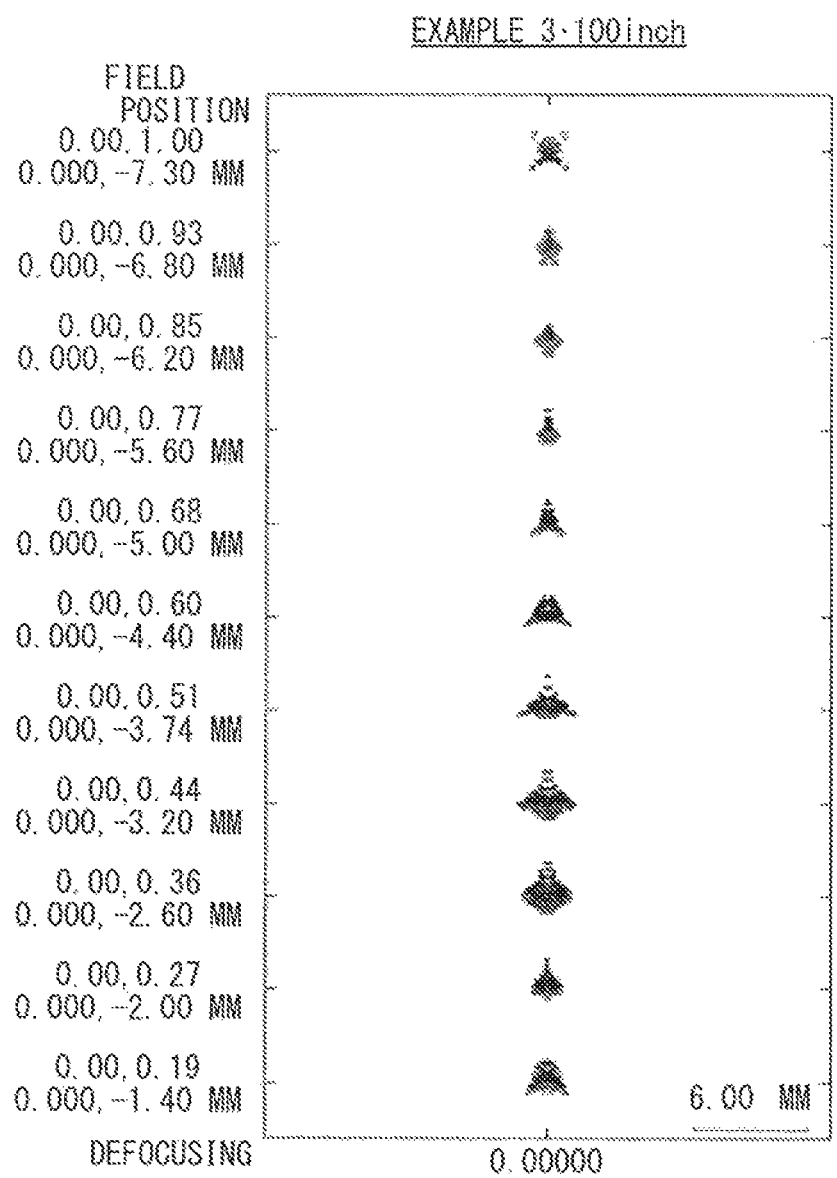
[ FIG. 49 ]

[ FIG. 50 ]
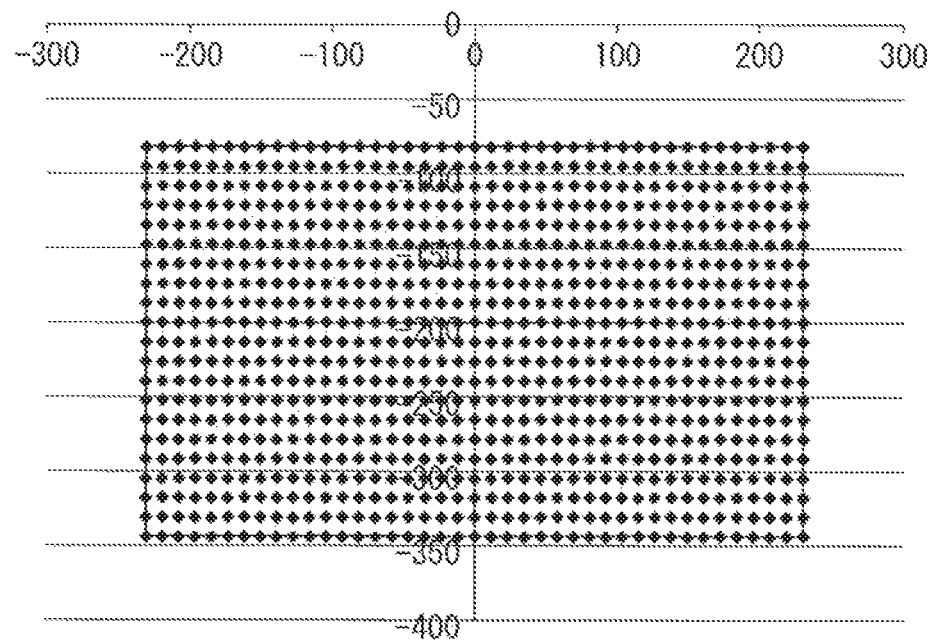
[ FIG. 51 ]
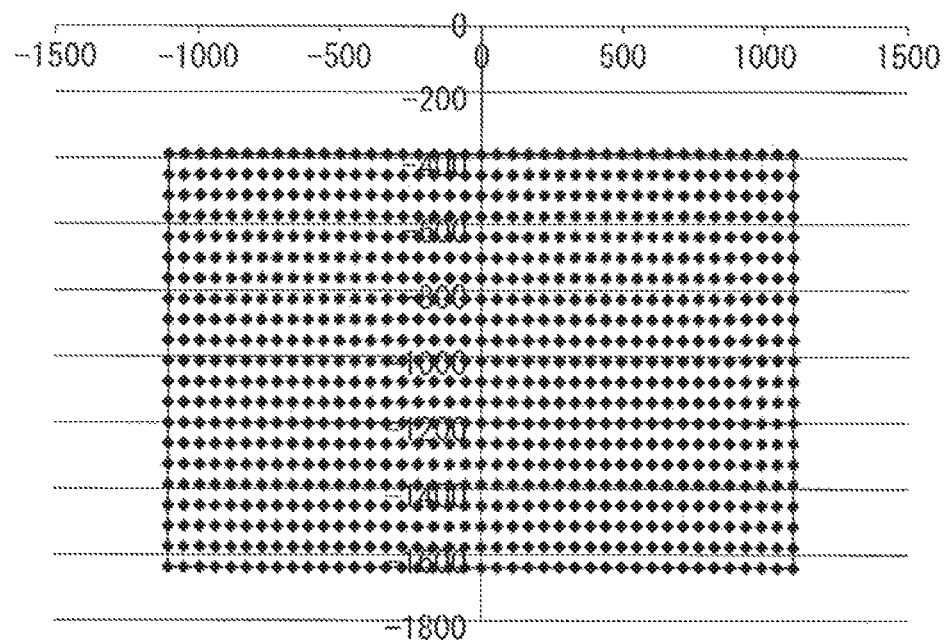

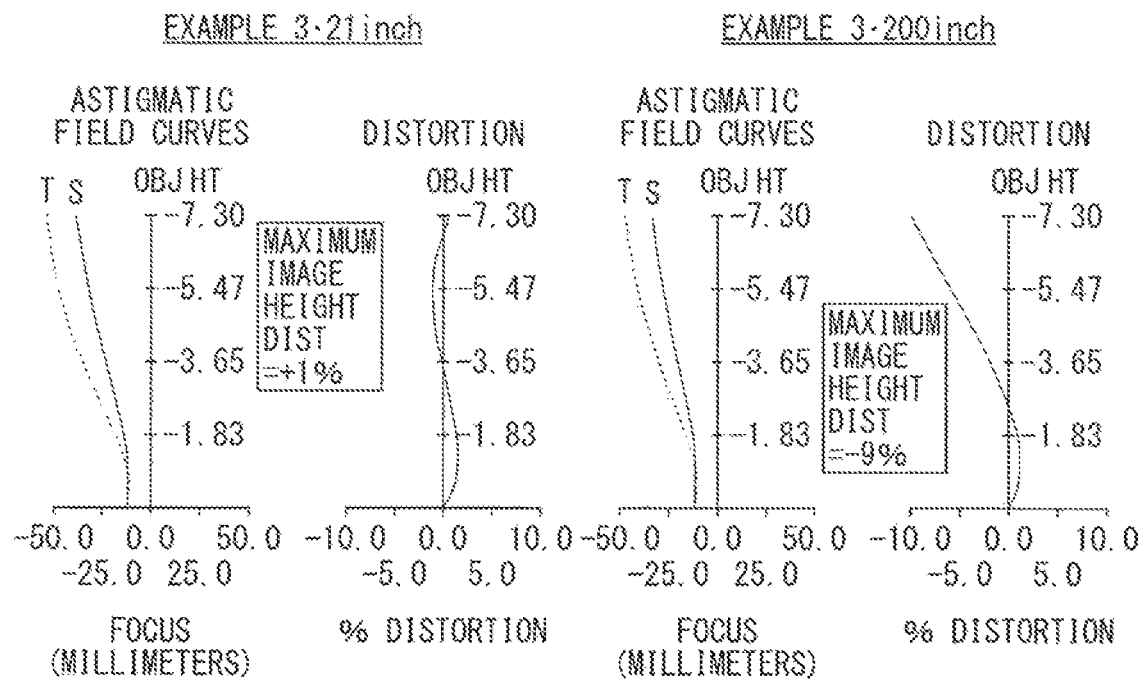
[FIG. 52]

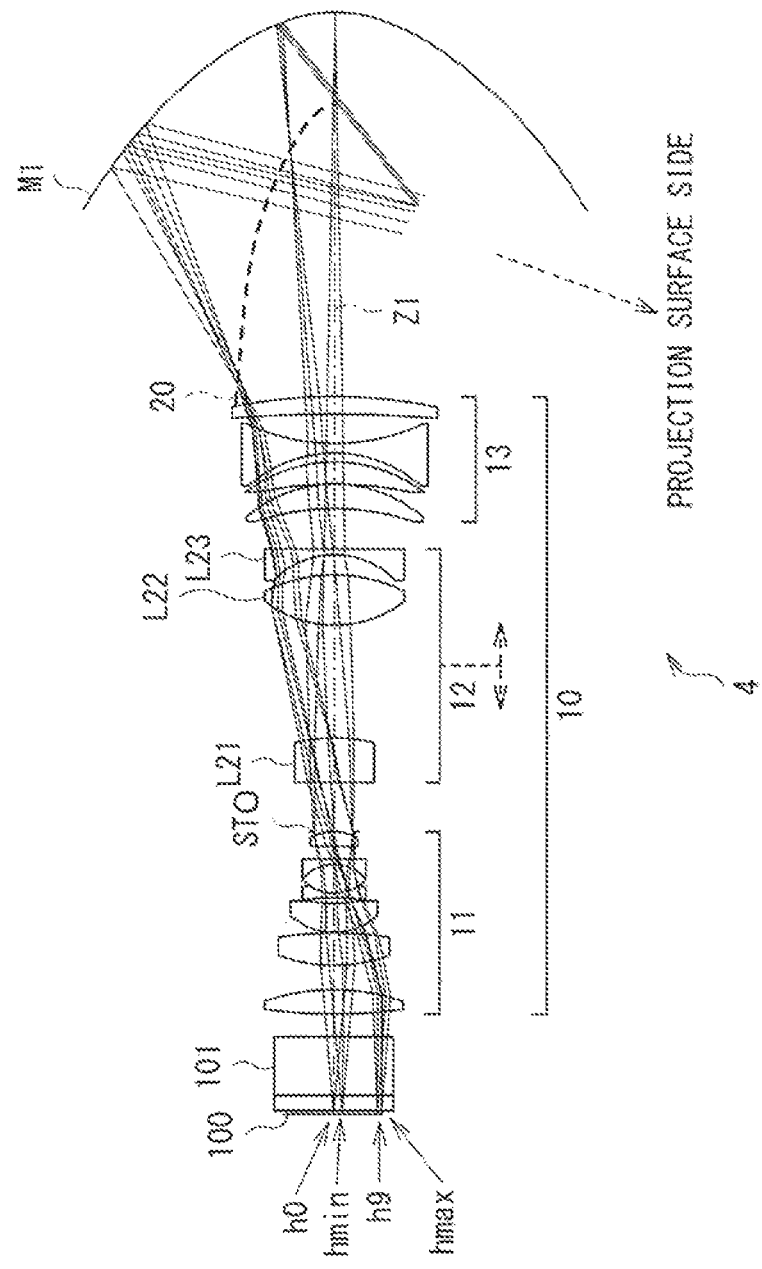
[FIG. 53]
EXAMPLE 4

[FIG. 54]
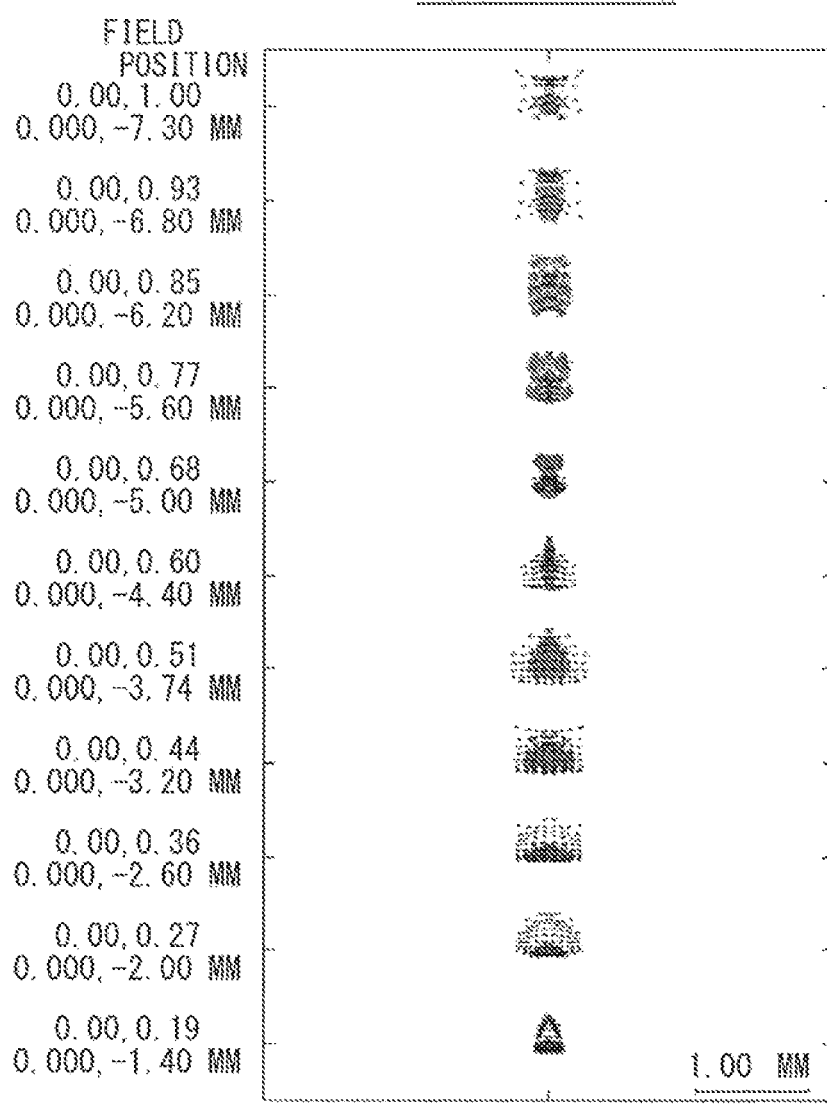

[FIG. 55]
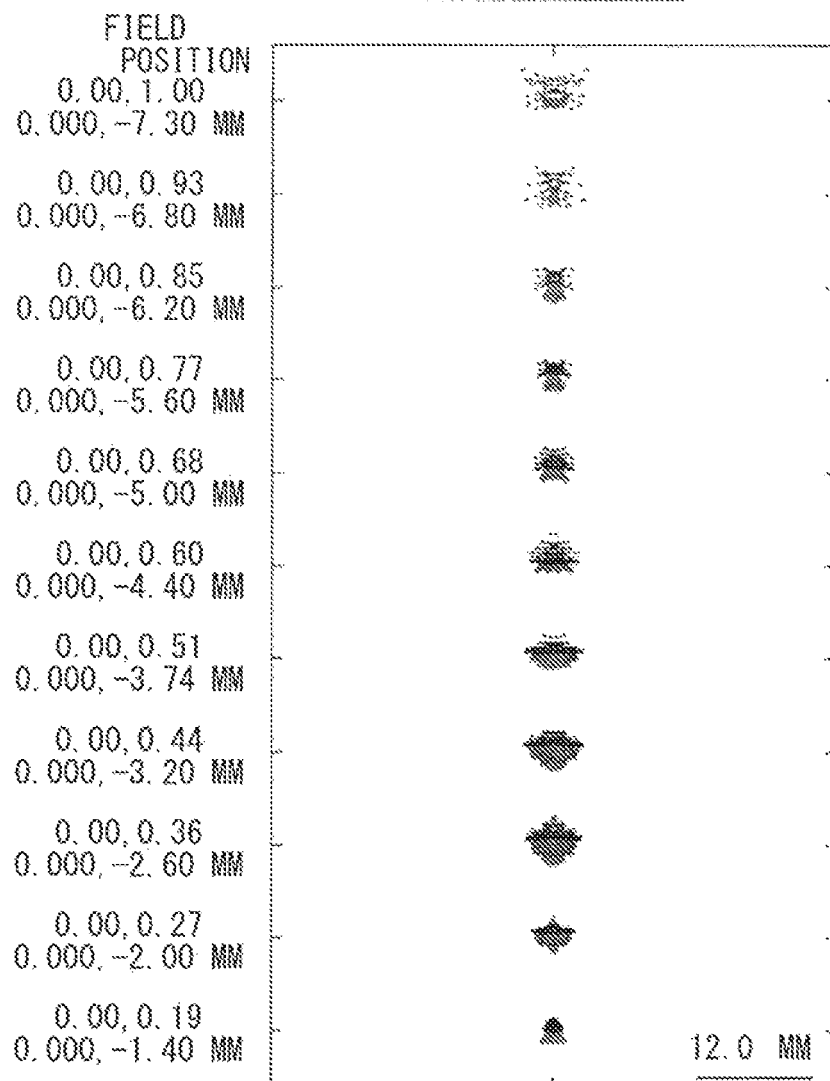

[FIG. 56]
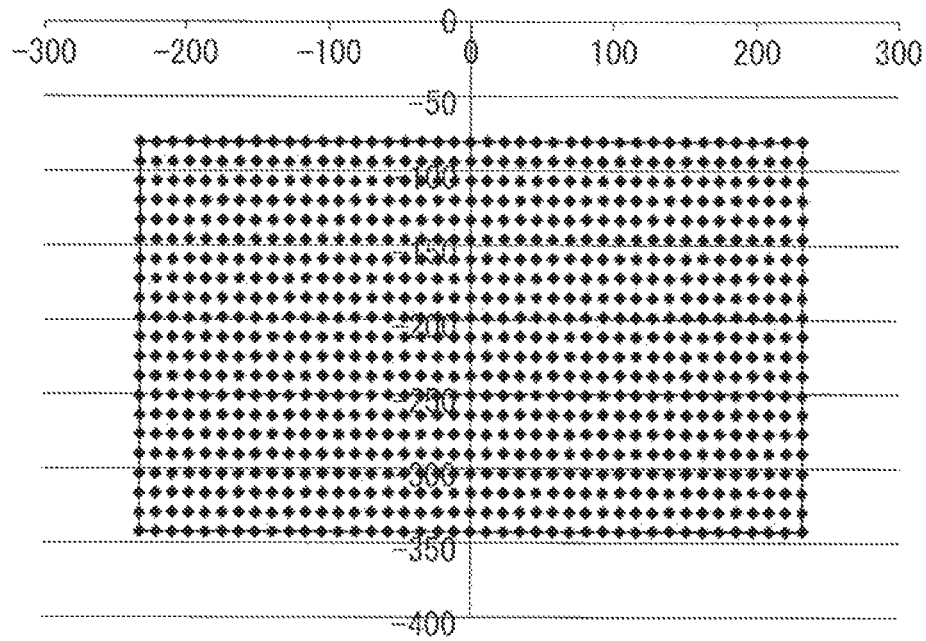
[FIG. 57]
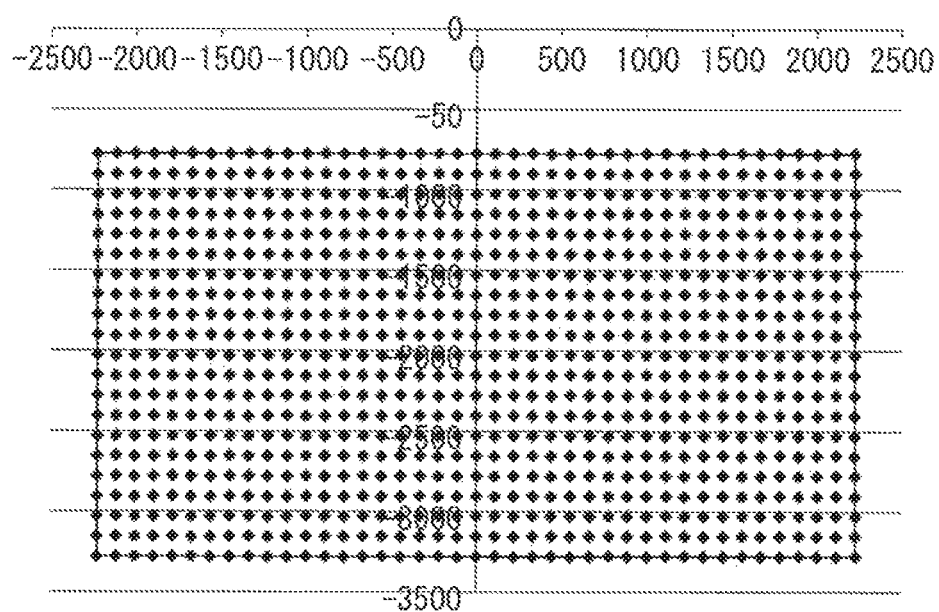

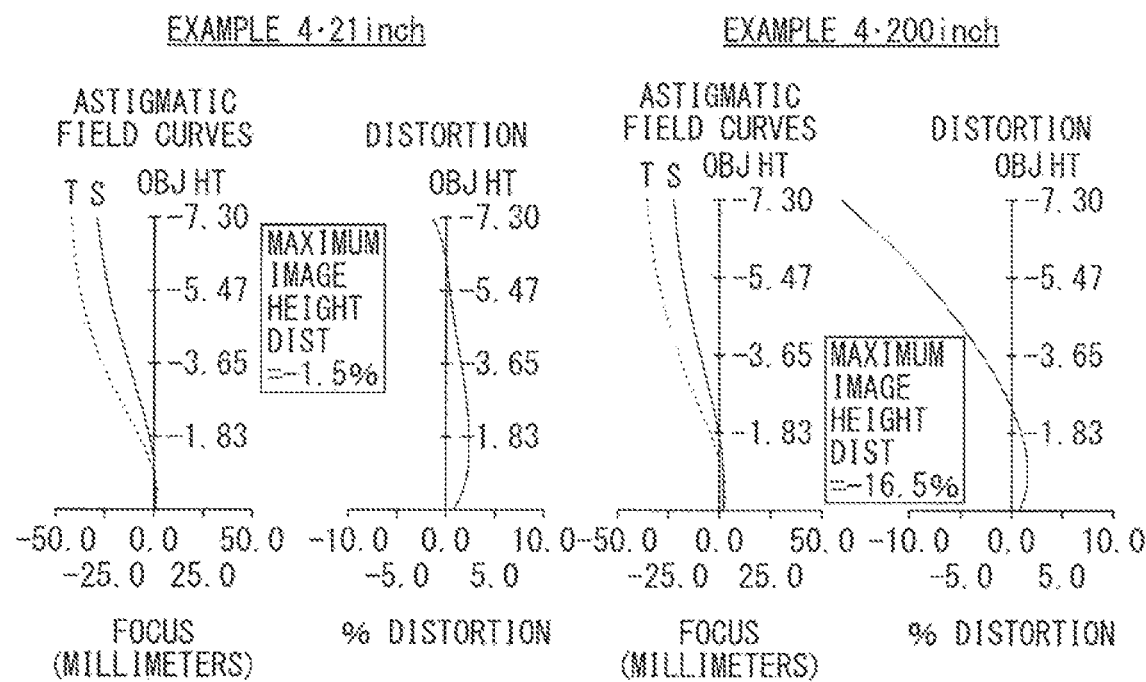
[FIG. 58]

[FIG. 59]
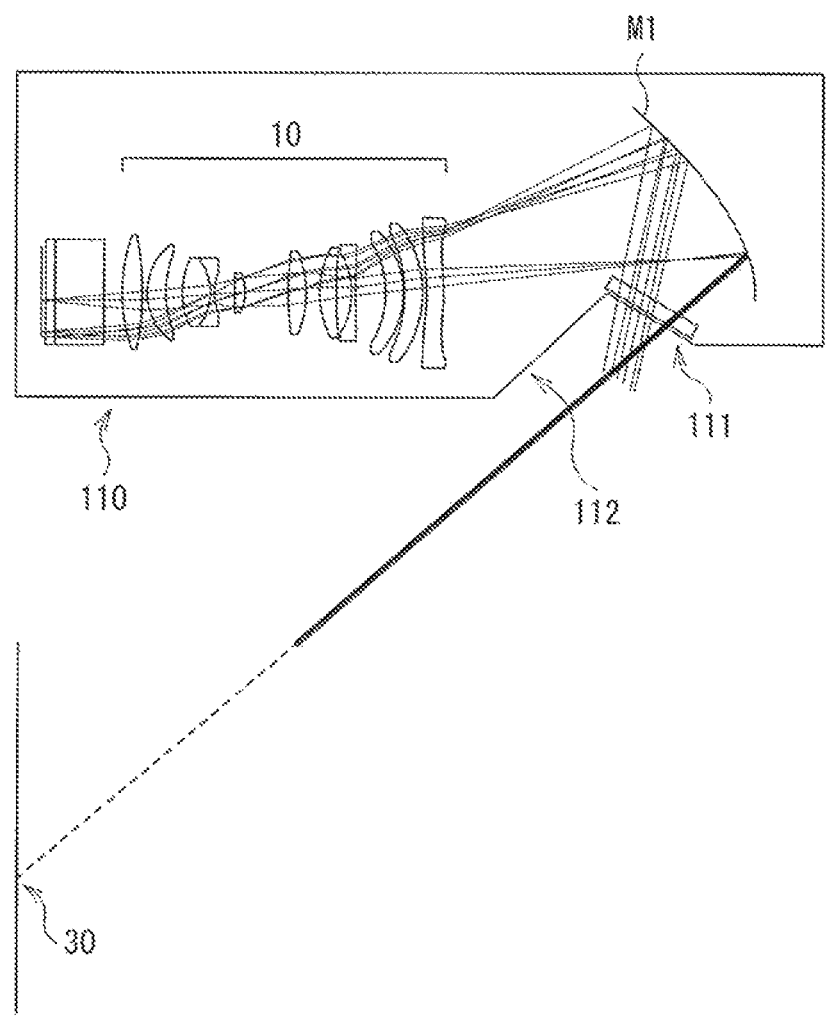

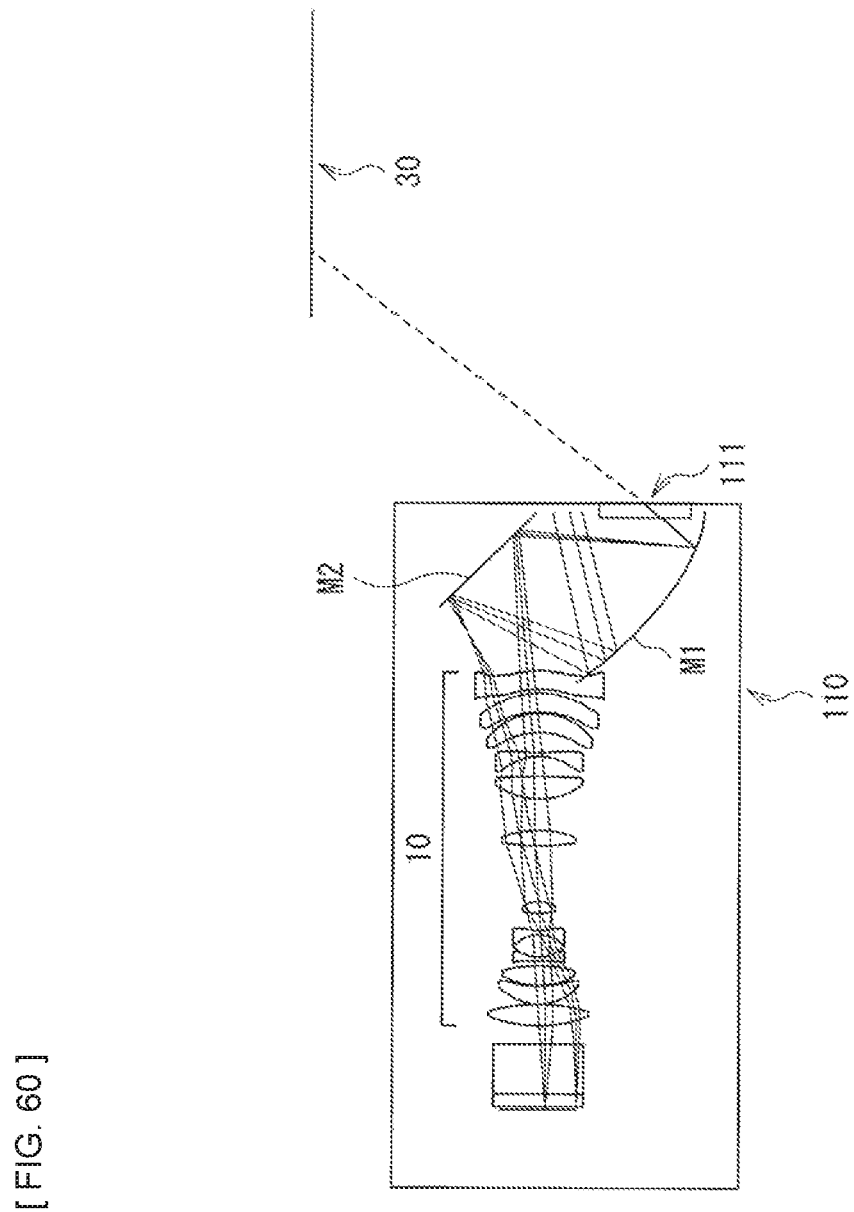
[FIG. 60]

PROJECTION OPTICAL SYSTEM AND PROJECTOR

CROSS REFERENCE TO RELATED APPLICATIONS

This application is a national stage application under 35 U.S.C. 371 and claims the benefit of PCT Application No. PCT/JP2018/023248 having an international filing date of 19 Jun. 2018, which designated the United States, which PCT application claimed the benefit of Japanese Patent Application No. 2017-149986 filed 2 Aug. 2017, the entire disclosures of each of which are incorporated herein by reference.

TECHNICAL FIELD

The present disclosure relates to a projection optical system that projects an image, and a projector.

BACKGROUND ART

There is a projection device (projector) that enlarges and projects, by a projection optical system, an image of a projection target formed on a display device onto a projection surface. The display device is, for example, a liquid crystal panel, a digital mirror device, or the like. The projection surface is, for example, a screen. In recent years, an ultra-short focus projector has been developed which is reduced in size by adopting, as a projection optical system, an ultra-short focus lens capable of projecting an image to an extremely-close position.

CITATION LIST

Patent Literature

PTL 1: International Publication No. 2006/043666
PTL 2: Japanese Unexamined Patent Application Publication No. 2011-150355

SUMMARY OF THE INVENTION

In an ultra-short focus projector, it is desired to widen a focusable range of a projection optical system so that the projector allows for a projection size of an image from a small size to a large size.

It is desirable to provide a projection optical system that is small in size and is capable of focusing in a wide focusable range, and a projector equipped with such a projection optical system.

A projection optical system according to one embodiment of the present disclosure includes an intermediate image forming lens group and a concave mirror. The intermediate image forming lens group forms an intermediate image of an image of a projection target. The concave mirror is disposed on an optical path after the intermediate image is formed. The concave mirror forms a projection image on a projection surface. The intermediate image forming lens group and the concave mirror are disposed in order from side of the image of the projection target toward side of the projection surface. The intermediate image forming lens group includes a movable group that travels on an optical axis to perform focus adjustment. The movable group includes a concave lens having an aspherical surface.

A projector according to one embodiment of the present disclosure includes a display device that displays an image of a projection target and a projection optical system that projects the image of the projection target onto a projection surface. The projection optical system includes the projection optical system according to one embodiment of the present disclosure described above.

In a projection optical system or a projector according to an embodiment of the present disclosure, after an intermediate image is formed by an intermediate image forming lens group, a projection image is formed on a projection surface by a concave mirror. Focus adjustment is performed by a movable group in the intermediate image forming lens group.

According to a projection optical system or a projector according to an embodiment of the present disclosure, an intermediate image forming lens group and a concave mirror are included. A movable group that performs focus adjustment is disposed in the intermediate image forming lens group. A configuration of the movable group is mainly optimized thereby. It is therefore possible to achieve reduction in size and focusing in a wide focusable range.

It is to be noted that the effects described above are not necessarily limiting, and any of effects described in the present disclosure may be provided.

BRIEF DESCRIPTION OF DRAWING

FIG. 1 is a cross-sectional view illustrating a configuration of a projection optical system according to Example 1.

FIG. 2 is an explanatory diagram illustrating an example of a relationship between a position of an image display surface of a display device and an image height of an image entering the projection optical system.

FIG. 3 is a diagram illustrating a spot diagram in a case where a projection size of the projection optical system according to Example 1 is 21 inches.

FIG. 4 is a diagram illustrating a spot diagram in a case where the projection size of the projection optical system according to Example 1 is 30 inches.

FIG. 5 is a diagram illustrating a spot diagram in a case where the projection size of the projection optical system according to Example 1 is 100 inches.

FIG. 6 is a diagram illustrating a spot diagram in a case where the projection size of the projection optical system according to Example 1 is 200 inches.

FIG. 7 is a diagram illustrating image distortion in the case where the projection size of the projection optical system according to Example 1 is 21 inches.

FIG. 8 is a diagram illustrating image distortion in the case where the projection size of the projection optical system according to Example 1 is 30 inches.

FIG. 9 is a diagram illustrating image distortion in the case where the projection size of the projection optical system according to Example 1 is 100 inches.

FIG. 10 is a diagram illustrating image distortion in the case where the projection size of the projection optical system according to Example 1 is 200 inches.

FIG. 11 is a diagram illustrating a shape of a concave mirror in the projection optical system according to Example 1.

FIG. 12 is an explanatory diagram illustrating a tangential angle of the concave mirror in the projection optical system according to Example 1.

FIG. 13 is a diagram illustrating a curvature of the concave mirror in the projection optical system according to Example 1.

FIG. 14 is an aberration diagram illustrating astigmatic field curves and distortion in cases where the projection sizes at an intermediate image forming position of the projection optical system according to Example 1 are 21 inches and 30 inches.

FIG. 15 is an aberration diagram illustrating astigmatic field curves and distortion in cases where the projection sizes at the intermediate image forming position of the projection optical system according to Example 1 are 100 inches and 200 inches.

FIG. 16 is an explanatory diagram illustrating variation in light rays in a case where a movable group is caused to travel in the projection optical system according to Example 1.

FIG. 17 is a diagram illustrating a spot diagram in a case where a projection size of a projection optical system according to Comparative example 1 is 21 inches.

FIG. 18 is a diagram illustrating a spot diagram in a case where the projection size of the projection optical system according to Comparative example 1 is 30 inches.

FIG. 19 is a diagram illustrating a spot diagram in a case where the projection size of the projection optical system according to Comparative example 1 is 50 inches.

FIG. 20 is a diagram illustrating image distortion in the case where the projection size of the projection optical system according to Comparative example 1 is 21 inches.

FIG. 21 is a diagram illustrating image distortion in the case where the projection size of the projection optical system according to Comparative example 1 is 30 inches.

FIG. 22 is a diagram illustrating image distortion in the case where the projection size of the projection optical system according to Comparative example 1 is 50 inches.

FIG. 23 is an aberration diagram illustrating astigmatic field curves and distortion in cases where the projection sizes at an intermediate image forming position of the projection optical system according to Comparative example 1 are 21 inches and 30 inches.

FIG. 24 is an aberration diagram illustrating astigmatic field curves and distortion in the cases where the projection size at the intermediate image forming position of the projection optical system according to Comparative example 1 is 50 inches.

FIG. 25 is a cross-sectional view illustrating a configuration of a projection optical system according to Example 2.

FIG. 26 is a diagram illustrating a spot diagram in a case where a projection size of the projection optical system according to Example 2 is 21 inches.

FIG. 27 is a diagram illustrating a spot diagram in a case where the projection size of the projection optical system according to Example 2 is 30 inches.

FIG. 28 is a diagram illustrating a spot diagram in a case where the projection size of the projection optical system according to Example 2 is 100 inches.

FIG. 29 is a diagram illustrating a spot diagram in a case where the projection size of the projection optical system according to Example 2 is 200 inches.

FIG. 30 is a diagram illustrating image distortion in the case where the projection size of the projection optical system according to Example 2 is 21 inches.

FIG. 31 is a diagram illustrating image distortion in the case where the projection size of the projection optical system according to Example 2 is 30 inches.

FIG. 32 is a diagram illustrating image distortion in the case where the projection size of the projection optical system according to Example 2 is 100 inches.

FIG. 33 is a diagram illustrating image distortion in the case where the projection size of the projection optical system according to Example 2 is 200 inches.

FIG. 34 is an aberration diagram illustrating astigmatic field curves and distortion in cases where the projection sizes at an intermediate image forming position of the projection optical system according to Example 2 are 21 inches and 30 inches.

FIG. 35 is an aberration diagram illustrating astigmatic field curves and distortion in cases where the projection sizes at the intermediate image forming position of the projection optical system according to Example 2 are 100 inches and 200 inches.

FIG. 36 is a cross-sectional view illustrating a configuration of a projection optical system according to Comparative example 2.

FIG. 37 is a diagram illustrating a spot diagram in a case where a projection size of the projection optical system according to Comparative example 2 is 21 inches.

FIG. 38 is a diagram illustrating a spot diagram in a case where the projection size of the projection optical system according to Comparative example 2 is 30 inches.

FIG. 39 is a diagram illustrating a spot diagram in a case where the projection size of the projection optical system according to Comparative example 2 is 100 inches.

FIG. 40 is a diagram illustrating a spot diagram in a case where the projection size of the projection optical system according to Comparative example 2 is 200 inches.

FIG. 41 is a diagram illustrating image distortion in the case where the projection size of the projection optical system according to Comparative example 2 is 21 inches.

FIG. 42 is a diagram illustrating image distortion in the case where the projection size of the projection optical system according to Comparative example 2 is 200 inches.

FIG. 43 is an aberration diagram illustrating astigmatic field curves and distortion in cases where the projection sizes at an intermediate image forming position of the projection optical system according to Comparative example 2 are 21 inches and 30 inches.

FIG. 44 is an aberration diagram illustrating astigmatic field curves and distortion in cases where the projection sizes at the intermediate image forming position of the projection optical system according to Comparative example 2 are 100 inches and 200 inches.

FIG. 45 is a diagram illustrating a spot diagram of a projection optical system according to Comparative example 2 in which temperature variation is taken into consideration.

FIG. 46 is a diagram illustrating a spot diagram of a projection optical system according to Comparative example 2 in which temperature variation is taken into consideration.

FIG. 47 is a cross-sectional view illustrating a configuration of a projection optical system according to Example 3.

FIG. 48 is a diagram illustrating a spot diagram in a case where a projection size of the projection optical system according to Example 3 is 21 inches.

FIG. 49 is a diagram illustrating a spot diagram in a case where the projection size of the projection optical system according to Example 3 is 100 inches.

FIG. 50 is a diagram illustrating image distortion in the case where the projection size of the projection optical system according to Example 3 is 21 inches.

FIG. 51 is a diagram illustrating image distortion in the case where the projection size of the projection optical system according to Example 3 is 100 inches.

FIG. 52 is an aberration diagram illustrating astigmatic field curves and distortion in cases where the projection sizes at an intermediate image forming position of the projection optical system according to Example 3 are 21 inches and 200 inches.

FIG. 53 is a cross-sectional view illustrating a configuration of a projection optical system according to Example 4.

FIG. 54 is a diagram illustrating a spot diagram in a case where a projection size of the projection optical system according to Example 4 is 21 inches.

FIG. 55 is a diagram illustrating a spot diagram in a case where the projection size of the projection optical system according to Example 4 is 200 inches.

FIG. 56 is a diagram illustrating image distortion in the case where the projection size of the projection optical system according to Example 4 is 21 inches.

FIG. 57 is a diagram illustrating image distortion in the case where the projection size of the projection optical system according to Example 4 is 200 inches.

FIG. 58 is an aberration diagram illustrating astigmatic field curves and distortion in cases where the projection sizes at the intermediate image forming position of the projection optical system according to Example 4 are 21 inches and 200 inches.

FIG. 59 is a cross-sectional view illustrating a first configuration example of a housing that contains a projection optical system.

FIG. 60 is a cross-sectional view illustrating a second configuration example of the housing that contains the projection optical system.

MODES FOR CARRYING OUT THE INVENTION

Some example embodiments of the present disclosure are described below in detail with reference to the drawings. It is to be noted that the description is given in the following order.
0. Overview
0.1 Problem
0.2 Overview of Projection Optical System According to Embodiment
1. Configuration Example, Workings, and Effects of Projection Optical System According to Embodiment
  1.1 Example 1
  1.2 Comparative Example 1
  1.3 Example 2
  1.4 Comparative Example 2
  1.5 Example 3
  1.6 Example 4
  1.7 Modification Examples
  1.8 Effects
2. Other Embodiments 0. Overview 0.1 Problem As a projection optical system that projects an image to an extremely-near position, there has been a technique that uses an ultra-short focal length lens. For example, techniques disclosed in PTL 1 (International Publication No. 2006/043666) and PTL 2 (Japanese Unexamined Patent Application Publication No. 2011-150355) can be cited. In the techniques described in these documents, while an image can be formed at a fairly near position by using a concave mirror, a focasable range is extremely narrow.

In particular, in a small-sized portable ultra-short focus projector, which has recently been growing in demand, a projection optical system needs to so perform focusing as to allow for, for example, a small projection size on a desk surface or the like to an extremely-large projection size on a wall surface or the like. In addition, in order to incorporate a small-sized electric floating focus mechanism in the projector, the focusing mechanism in the projection optical system needs to be simplified.

Many ultra-short focus projectors use a catadioptric system with a mirror to cover an extremely-large angle of view. Among such ultra-short focus projectors, a projection optical system using an intermediate imaging system and a concave mirror is widely used since it is easier to achieve reduction in size and to correct an astigmatic field curve compared with a projection optical system using a convex mirror. Generally, in the projection optical system using the intermediate imaging system and the concave mirror, focus can be varied to a certain degree by using floating focus that uses a portion of the optical system. A focusing range thereof is, however, usually small, and (maximum projection size)/(minimum projection size) is usually only about twice as large. In particular, it is difficult to enlarge the focusable range in a case where the system as a whole is small (for example, a panel size of a display panel displaying an image of a projection target is 0.5 inches or smaller) and resolution is high (for example, full HD or higher.)

0.2 Overview of Projection Optical System According to Embodiment

Therefore, it is desired to develop a technique that achieves a small-sized projection optical system capable of focusing in a wide focusable range, and a projector equipped with such a projection optical system. To achieve the above, a projection optical system according to an embodiment of the present disclosure has the following configuration.

The projection optical system according to the embodiment of the present disclosure includes an intermediate image forming lens group and a concave mirror. The intermediate image forming lens group forms an intermediate image of an image of a projection target. The concave mirror is disposed on an optical path after the intermediate image is formed. The concave mirror forms a projection image on a projection surface. The intermediate image forming lens group and the concave mirror are disposed in order from side of the image of the projection target toward side of the projection surface. The intermediate image forming lens group includes a movable group that travels on an optical axis to perform focus adjustment. The movable group includes a concave lens having an aspherical surface.

Here, the side of the image of the projection target refers to, for example, side of a display device, such as a liquid crystal panel or a digital mirror device, that displays the image of the projection target.

It is desirable that the intermediate image forming lens group include a first group, a second group serving as the movable group, and a third group in order from the side of the image of the projection target toward the side of the projection surface.

It is desirable that, in the movable group, an angular magnification decrease as an image height increases with respect to a paraxial axis.

It is desirable, in the projection optical system according to the embodiment of the present disclosure, that Rate≤0.9 is satisfied in the movable group, where Rate=(a principal light ray angular magnification at an image height of 90% with respect to a maximum image height)/(a paraxial angular magnification).

The concave lens in the movable group may include an entrance surface of light and an exit surface of light. It is desirable that an absolute value of a sag amount of the entrance surface of the concave lens in the movable group be greater than an absolute value of a sag amount of the exit surface.

The movable group may include a plurality of lenses. It is desirable that the concave lens in the movable group include a lens, in the plurality of lenses, disposed on most light exit side in the movable group, and at least the entrance surface be aspherical.

It is desirable that the intermediate image forming lens group be configured such that distortion of the intermediate image at a maximum image height increases by +5 percent or more in a case where the movable group is caused to travel and a projection distance is thereby varied from farthest field side to nearest field side.

Here, the projection size is largest on the farthest field side of the projection distance. The projection size is smallest on the nearest field side of the projection distance.

It is desirable, in the projection optical system according to the embodiment of the present disclosure, that 20≤|fmov/fall| be satisfied where "fmov" is a focal length of the movable group and "fall" is a total focal length of the projection optical system.

It is desirable, in the projection optical system according to the embodiment of the present disclosure, that an angle β0, with respect to an optical axis, of an upper light ray from an image height of 0 percent toward the movable group satisfy |β0|≤1.5 deg.

In the projection optical system according to the embodiment of the present disclosure, it is desirable that a paraxial angular magnification of the movable group be 1.5 times or more. Further, it is also desirable that the movable group include a single group.

1. Configuration Examples, Workings, and Effects of Projection Optical System According to Embodiment Configuration examples, workings, and effects of the projection optical system according to the embodiment of the present disclosure are described with reference to specific numerical examples.

It is to be noted that meanings and the like of the following symbols described in tables of the examples and the comparative examples are as follows. "Surface No." indicates the number of the i-th surface, which is numbered first in a display surface of an image of a projection target, and is sequentially increased toward projection surface side. "Ri" indicates a paraxial radius of curvature (mm) of the i-th surface. "Surface spacing" indicates a distance (mm), on an optical axis, from the i-th surface to an (i+1)-th surface. "ndi" indicates a value of a refractive index at a d-line (wavelength of 587.6 nm) of a material (medium) of an optical element having the i-th surface. "vdi" indicates a value of an Abbe's number at the d-line of the material of the optical element having the i-th surface. A surface having a curvature radius of "infinity" indicates a planar surface, an imaginary plane, or a stop plane (aperture stop STO).

A projection optical system of each of Examples and the comparative examples includes an aspherical surface. An aspherical surface shape is defined by the following expression of aspherical surface. It is to be noted that, in the following tables describing aspherical coefficients, "E-n" represents an exponential expression with a base of 10, that is, "minus n-th power of 10." For example, "0.12345E-05" represents "0.12345×(minus fifth power of 10.)"

$$Z = \frac{cr^2}{1 + \sqrt{1-(1+\kappa)c^2r^2}} + A2r^2 + A3r^3 + A4r^4 + \ldots \quad \text{[Math. 1]}$$

In the above expression of aspherical surface, "Z" represents a depth (surface sag amount) of the aspherical surface. "r" represents a distance (height from an optical axis) from a center axis at a position where a sag amount is to be obtained. "c" represents a paraxial radius of curvature of the surface. "k" represents a conic coefficient. "Ai" represents an aspherical coefficient of i-th order ("i" is an integer of 2 or greater.)

1.1 Example 1

FIG. 1 illustrates configuration of a projection optical system 1 according to Example 1. Table 1 describes basic lens data of the projection optical system 1 according to Example 1. Further, Table 2 describes data of a spherical surfaces of the projection optical system according to Example 1.

TABLE 1

Example 1 • Lens data

| Surface No. | Surface type | Ri | Surface spacing | ndi | vdi | |
|---|---|---|---|---|---|---|
| 1 | Spherical | Infinity | 0.5 | | | Image display surface |
| 2 | Spherical | Infinity | 2.1 | 1.4584 | 67.82 | |
| 3 | Spherical | Infinity | 8.6 | 1.8052 | 25.46 | |
| 4 | Spherical | Infinity | 0 | | | |
| 5 | Spherical | Infinity | 3.3 | | | |
| 6 | Spherical | 27.39 | 3.6 | 1.5182 | 58.96 | First group |
| 7 | Spherical | −45.63 | 0.8 | | | |
| 8 | Aspherical | 9.85 | 3.5 | 1.4971 | 81.56 | |
| 9 | Aspherical | 33.24 | 2.79 | | | |
| 10 | Spherical | 12.83 | 5.1 | 1.497 | 81.61 | |
| 11 | Spherical | −7.55 | 0.7 | 1.9108 | 35.25 | |
| 12 | Spherical | 10.74 | 3.59 | | | |
| 13 | Spherical | −1086.63 | 1.85 | 1.5814 | 40.89 | |
| 14 | Spherical | −7.81 | 0 | | | |
| 15 | Spherical | Infinity | 4 | | | |
| 16 | Spherical | Infinity | 3.85 | | | |
| 17 | Spherical | 46.02 | 3.2 | 1.4875 | 70.44 | Movable group (Second group) |
| 18 | Spherical | −18.69 | 2.49 | | | |
| 19 | Spherical | 14.50 | 3.09 | 1.4875 | 70.44 | |
| 20 | Spherical | 101.31 | 2.80 | | | |
| 21 | Aspherical | −10.39 | 0.7 | 1.882 | 37.22 | |
| 22 | Aspherical | 77.52 | 5.39 | | | |
| 23 | Spherical | −14.84 | 3.3 | 1.5174 | 52.15 | Third group |
| 24 | Spherical | −13.01 | 0.15 | | | |
| 25 | Spherical | −20.75 | 3.3 | 1.9108 | 35.25 | |
| 26 | Spherical | −17.13 | 0.7 | | | |
| 27 | Aspherical | −17.30 | 3 | 1.5094 | 56.42 | |
| 28 | Aspherical | −19.18 | 56.4 | | | |
| 29 | Aspherical | −24.89 | −50 | | | Refractive surface |
| 30 | Spherical | Infinity | −107.07 | | | |
| 31 | Spherical | Infinity | 0 | | | Projection surface |

TABLE 2

Example 1 • Aspherical surface data

| Surface No. | 8 | 9 | 21 | 22 | 27 | 28 | 29 |
|---|---|---|---|---|---|---|---|
| Conic constant k | 0.024 | 8.355 | −3.966 | −9.1405 | 0.166 | 1.227 | −5.537 |
| A2 | | | | | 1.129E−02 | 1.336E−02 | −1.291E−02 |
| A3 | | | | | 3.908E−04 | 9.060E−04 | 1.042E−04 |
| A4 | 6.052E−05 | 2.179E−04 | −2.504E−04 | −1.228E−04 | 2.023E−05 | −4.599E−05 | −6.171E−06 |
| A5 | | | | | 8.883E−06 | 1.235E−05 | |
| A6 | −1.031E−06 | −2.210E−06 | 1.589E−06 | 6.756E−07 | 6.092E−07 | 7.964E−07 | 6.415E−09 |
| A7 | | | | | −1.550E−09 | −2.372E−09 | |
| A8 | 8.765E−09 | −1.361E−08 | 3.090E−09 | 1.381E−09 | −5.858E−09 | −4.882E−09 | −8.684E−12 |
| A9 | | | | | 5.739E−12 | −3.031E−11 | |
| A10 | −1.520E−10 | 6.669E−10 | −1.270E−10 | −4.540E−11 | −4.161E−11 | −2.766E−11 | 6.421E−15 |
| A11 | | | | | | | |
| A12 | 1.799E−12 | 2.834E−11 | | | 2.137E−13 | 1.759E−13 | −2.562E−18 |
| A13 | | | | | | | |
| A14 | 1.079E−13 | −3.600E−13 | | | 3.551E−15 | 1.847E−15 | 3.296E−22 |
| A15 | | | | | | | |
| A16 | 1.251E−15 | | | | −2.105E−17 | −7.701E−18 | |
| A17 | | | | | | | |
| A18 | −1.167E−17 | | | | 8.497E−21 | 3.340E−21 | |
| A19 | | | | | | | |
| A20 | | | | | −1.392E−22 | −1.428E−22 | |

As illustrated in FIG. 1, the projection optical system 1 according to Example 1 includes an intermediate image forming lens group 10 and a concave mirror M1 in order from side of an image of a projection target toward side of a projection surface. The intermediate image forming lens group 10 forms an intermediate image 20 of the image of the projection target. The concave mirror M1 is disposed on an optical path after the intermediate image 20 is formed, and forms a projection image on the projection surface.

As described in Table 1 and Table 2, the concave mirror M1 has a reflecting surface that is aspherical.

Here, the side of the image of the projection target is, for example, side on which a display device (display panel) 100, such as a liquid crystal panel or a digital mirror device, that displays the image of the projection target is provided. Between the display device 100 and the projection optical system 1, a polarization splitting device 101 such as a polarization beam splitter is disposed. The polarization splitting device 101 applies illumination light from an unillustrated illumination optical system toward the display device 100. The display device 100 displays the image of the projection target on an image display surface by modulating the illumination light on the basis of an image signal. Light of the image displayed on the image display surface of the display device 100 is outputted toward the projection optical system 1 via the polarization splitting device 101. The projection optical system 1 projects the image displayed on the display device 100 onto an unillustrated projection surface such as a screen.

The intermediate image forming lens group 10 has a movable group that performs focus adjustment by traveling on an optical axis Z1. The movable group includes a concave lens having an aspherical surface. The movable group includes a plurality of lenses L21, L22, and L23. In the projection optical system 1 according to Example 1, the concave lens having the aspherical surface includes the lens L23 disposed closest to light exit side in the movable group among the plurality of lenses L21, L22, and L23. Both surfaces of the concave lens are aspherical.

Further, the intermediate image forming lens group 10 is roughly divided to have a configuration of three groups: a group (first group 11) on front side of the movable group, the movable group (second group 12), and a group (third group 13) on rear side of the movable group. A role of each group is as follows. An aperture stop STO is provided between the first group 11 and the second group 12.

The first group 11 serves to collectively output different image height bands as approximately-collimated light emission. The first group 11 includes a plurality of lenses. In the projection optical system 1 according to Example 1, as described in Table 1 and Table 2, both surfaces of the second lens from the front side in the first group 11 are aspherical.

The second group 12 has a long focal length and is close to a beam expander. By providing a constant angular magnification, an intermediate image forming position of a high image height band is swung back and forth in accordance with the movement, while optical power variation and aberration variation are suppressed for a low image height band in the vicinity of the optical axis. In order to widen the focus adjustment range according to the movement, it is desirable that a paraxial angular magnification of the second group 12 is 1.5 times or more.

The third group 13 forms an image of a bundle of light rays generated by the movable group to form the intermediate image 20. The third group 13 also serves to adjust an aberration. The third group 13 includes a plurality of lenses. In the projection optical system 1 according to Example 1, as described in Table 1 and Table 2, both surfaces of the lens disposed at the rearmost in the third group 13 are aspherical.

A focusing range of the movable group in the projection optical system 1 according to Example 1 is from 21 inches to 200 inches in projection size.

In FIG. 1, a maximum image height from the optical axis Z1 of the image of the projection target on the display device 100 is represented by "hmax." An image height (90% image height) of 90% with respect to the maximum image height from the optical axis Z1 is represented by "h9." A minimum image height from the optical axis Z1 of the image entering the projection optical system 1 is represented by "hmin." "h0" is an image height (0% image height) of 0% with respect to the maximum image height, and corresponds to the optical axis Z1 of projection optical system 1.

FIG. 2 illustrates a relationship between a position of the image display surface of the display device 100 and an image height of the image entering the projection optical system 1. In Example 1, the display device 100 has a pixel pitch of 4.3 μm. The projection optical system 1 according to Example 1 has a designed image diameter of φ14.6, a V-shift amount of 3.74 mm, a diagonal size (a panel diagonal size) of the image display surface of the display device 100 of 0.37 inches, and an aspect ratio of the image display surface of 16:9. The F-number of the projection optical system 1 is 4. Design wavelengths of 445 nm, 520 nm, and 640 nm are used.

FIGS. 3 to 6 illustrate spot diagrams of the projection optical system 1 according to Example 1. FIG. 3 illustrates a spot diagram in a case where the projection size is 21 inches. FIG. 4 illustrates a spot diagram in a case where the projection size is 30 inches. FIG. 5 illustrates a spot diagram in a case where the projection size is 100 inches. FIG. 6 illustrates a spot diagram in a case where the projection size is 200 inches.

FIGS. 7 to 10 illustrate image distortion of the projection optical system 1 according to Example 1. FIG. 7 illustrates image distortion in the case where the projection size is 21 inches. FIG. 8 illustrates image distortion in the case where the projection size is 30 inches. FIG. 9 illustrates image distortion in the case where the projection size is 100 inches. FIG. 10 illustrates image distortion in the case where the projection size is 200 inches.

As illustrated in FIGS. 3 to 10, it can be seen that, in the projection optical system 1 according to Example 1, aberrations and image distortion are sufficiently reduced in a projection range from 21 inches to 200 inches.

The projection optical system 1 according to Example 1 has the following three technical features.

1. The movable group includes a single group and has a light weight. This allows for driving by a stepping motor, dramatically increasing a traveling speed of the movable group compared with a case of using a DC motor and allowing for swift focusing. This is clear from Table 1 and FIG. 1.

2. A bundle of light rays entering the movable group is made close to collimated light in the vicinity of the optical axis. Further, an absolute value of a focal length of the movable group is made sufficiently great. As a result, the aberration variation in the vicinity of the optical axis is reduced while a total composite focal length of the system is kept substantially unchanged during the movement.

Here, Table 3 describes a focal length fmov of the movable group in the projection optical system 1 according to Example 1, a total focal length fall of the system, an entrance angle of a light ray entering the movable group at the minimum image height, an exit angle of a light ray exiting the movable group at the minimum image height, an entrance radius of the light ray entering the movable group at the minimum image height, and an exit radius of the light ray exiting the movable group at the minimum image height.

TABLE 3

Example 1 • Data at time of focus

|  | 21 inches | 30 inches | 100 inches | 200 inches |
|---|---|---|---|---|
| Focal length of movable group fmov | 145.8 | | | |
| Total focal length of system fall | 1.81 | 1.83 | 1.86 | 1.86 |
| Entrance radius of movable group @ minimum image height | 3.02 | 3.11 | 3.22 | 3.24 |
| Exit radius of movable group @ minimum image height | 2.44 | 2.50 | 2.56 | 2.59 |
| Entrance angle of movable group @ minimum image height | 4.13 | | | |
| Exit angle of movable group @ minimum image height | 7.25 | 7.24 | 7.23 | 7.18 |

In the projection optical system 1 according to Example 1, since light exiting the movable group is close to collimated light, a size and an angle of a bundle of light rays in the minimum image height band are hardly varied by focusing. Therefore, aberration is kept constant and low by focusing. As a result, a spot size in the minimum image height band is also reduced, as illustrated in FIGS. 3 to 6.

3. In the high image height band of the light exiting the movable group, the curvature of the concave mirror M1 having the aspherical surface is balanced by reducing the exit angle with respect to an ideal paraxial exit angle.

FIG. 11 illustrates the shape (aspherical shape) of the concave mirror M1 in the projection optical system 1 according to Example 1. In the projection optical system 1 according to Example 1, the shape of the concave mirror M1 is close to the ideal aspherical mirror shape calculated under assumption that an intermediate image height is in a paraxial region.

In FIG. 11, Y=5 mm or less is offset from fitting since a light ray does not pass therethrough. In addition, the maximum image height portion gradually shifts, which indicates that the aspherical shape of the concave mirror M1 deviates from the ideal shape as a result of adopting a condition (ii) which will be described later.

FIG. 12 illustrates a tangential angle 4 of the concave mirror M1. As illustrated in FIG. 12, the exit angle of the intermediate image 20 is represented by "θ" and the projection angle is represented by "φ" At this time, a relationship among the tangential angle ξ [deg], the exit angle θ [deg], and the projection angle φ [deg] of the concave mirror M1 is as follows.

$$\xi = 90 - \theta/2 - \varphi/2 \qquad (1)$$

Since the exit angle θ of the intermediate image 20 is a low angle, it can be assumed to be paraxial, and the following expression holds.

Panel image height $y = fmid \cdot \tan\theta \approx fmid \cdot \theta \approx fmid \cdot \sin\theta$ The projection angle φ is so determined as to achieve center projection with distortion of 0, and the following expression holds.

Panel image height $y = fall \cdot \tan\varphi$

For this reason, the following relationship holds between θ and φ.

$fmid \cdot \tan\theta = fall \cdot \tan\varphi$

Accordingly, it can be said that the paraxial shape of the concave mirror M1 is largely determined by the projection angle φ and a ratio (fmid/fall) between the focal length fmid to the intermediate image 20 and the total focal length fall of the system.

That is, in a case where projection is performed at a wide angle with the intermediate image 20+the concave mirror M1, although there are freedom in fmid/fall, the surface shape is naturally determined. It is to be noted that the maximum projection angle φ is usually 70 deg or greater.

FIG. 11 illustrates, as the ideal aspherical mirror shape, the shape based on Expression (1) scaled with respect to a center portion of the mirror. It can be seen that the shape is close to the aspherical shape of the concave mirror M1 in the projection optical system 1.

FIG. 13 illustrates a curvature in a tangential direction of the concave mirror M1 in the projection optical system according to Example 1. As illustrated in FIG. 13, the curvature of the concave mirror M1 has a shape in which a curvature increment rapidly decreases in a peripheral region. Now, when considering a light ray entering the concave mirror M1, since the curvature increment resulting from the concave mirror M1 in the peripheral region is sharply decreased, it is more desirable that optical power of light entering the concave mirror M1 be also sharply decreased in the peripheral region in accordance therewith. This is necessary for the balance of aberrations at a specific focus.

Furthermore, it is desirable that a function of rapidly decreasing the optical power of the light ray entering the concave mirror M1 in the peripheral region be provided by the movable group of the intermediate image forming lens group 10. This is required to achieve the same power balance (image height vs curvature) between the optical power of the concave mirror M1 and the entering light ray, also in a case where focusing is performed by the movable group. If this is not achieved, even if focusing can be performed by the specific portion, aberration increases with focusing. This narrows the focus range in which aberration can be reduced. Further, if the aberration is reduced after the focus as described referring to Comparative example 2 later, a plastic lens is generally used. The shape of the plastic lens is, however, not constant in thickness, which leads to a problem that a temperature characteristic is deteriorated.

It is to be noted that, in the above description, the expression y=fmid·tan θ is assumed for the intermediate image 20. Even if a deviation of about 30% with respect to the exit angle θ is assumed, however, a condition to be satisfied by the projection optical system 1 described below results in the same conclusion.

The projection optical system 1 according to Example 1 satisfies the following conditions (i), (ii), (iii), and (iv).

(i) The intermediate image forming lens group 10 and the concave mirror M1 are provided. The intermediate image forming lens group 10 forms the intermediate image 20. The concave mirror M1 is disposed on the optical path after the intermediate image 20 is formed, and forms the projection image on the projection surface. The intermediate image forming lens group 10 includes the movable group that performs focus adjustment. The movable group includes a single group.

(ii) Rate≤0.9 is satisfied in the movable group, where Rate=(a principal light ray angular magnification at an image height of 90% with respect to a maximum image height)/(a paraxial angular magnification).

(iii) 20≤|fmov/fall| is satisfied where "fmov" is a focal length of the movable group and "fall" is a total focal length of the projection optical system.

(iv) An angle $0, with respect to an optical axis, of an upper light ray from an image height of 0 percent toward the movable group satisfies |β0|≤1.5 deg.

Table 4 describes data related to the above-described conditions (ii), (iii), and (iv) of the projection optical system 1 according to Example 1. Each projection optical system 1 according to Example 1 satisfies the above-described condition (ii), (iii), and (iv).

TABLE 4

Example 1 • Data related to conditional expressions

| | | 21 inches | 30 inches | 100 inches | 200 inches |
|---|---|---|---|---|---|
| Paraxial angular magnification | | | 1.60 | | |
| Movable group @ Principal light ray at 90% image height | Entrance angle γ90 [deg] | | 17.7 | | |
| | Exit angle [deg] | 25.3 | 24.7 | 24.0 | 23.7 |
| | Angular magnification | 1.43 | 1.40 | 1.36 | 1.34 |
| (ii) Principal light ray angular magnification at 90% image height/Paraxial angular magnification | | 0.89 | 0.87 | 0.85 | 0.84 |
| (iii) |fmov/fall| | | 80.4 | 79.6 | 78.6 | 78.4 |
| (iv) β0 | | | | 0.2 | |
| Focal length of intermediate image forming lens group fmid | | 21.4 | 21.1 | 20.7 | 20.6 |
| fmid/fall | | 11.8 | 11.5 | 11.1 | 11.1 |

If the above-described condition (ii) is not satisfied, the aberration cannot be suppressed, or a temperature characteristic ability and mass productivity are deteriorated. One reason for this is that the relationship between the concave mirror M1 having the aspherical surface and the optical power of the light ray entering the concave mirror M1 as originally assumed is not satisfied. This will be examined referring to Comparative example 1 described later.

The above-described condition (iii) is a condition required to suppress variation in aberration at a time when the movable group is caused to travel. Even if the condition (iii) is not satisfied, aberration correction is actually possible to some extent. However, if the above-described condition (iii) is not satisfied, aberration correction ability at the maximum projection size or the minimum projection size is deteriorated.

If the above-described condition (iv) is not satisfied, aberration cannot be suppressed when the movable group is caused to travel, or a length of the movable group increases, resulting in a longer total length.

It is to be noted that, in a case where achievement of numerical value conditions of the above-described conditions (ii), (iii), and (iv) is intended, it is preferable to introduce an aspherical surface in the movable group. In particular, it is most effective to provide an aspherical surface to a rearmost concave lens in the movable group.

The fmid/fall also contributes to determine the aspherical shape of the concave mirror M1 described above, and it is preferable to set fmid/fall to approximately from 7 to 16; however, 8.5 to 12 is more balanced in terms of total length and aberration correction.

The projection optical system 1 according to Example 1 further satisfies the following condition (v).
(v) The rearmost lens in the movable group is an aspherical lens, and an absolute value of a sag amount of an entrance surface of the aspherical lens is greater than an absolute value of a sag amount of an exit surface.

FIGS. 14 and 15 illustrate astigmatic field curves and distortion at the intermediate image formation position of the projection optical system 1 according to Example 1. FIG. 14 illustrates astigmatic field curves and distortion in cases where the projection sizes are 21 inches and 30 inches. FIG. 15 illustrates astigmatic field curves and distortion in cases where the projection sizes are 100 inches and 200 inches. In FIGS. 14 and 15, "S" represents an astigmatic field curve in a sagittal image plane, and "T" represents an astigmatic field curve in a tangential image plane.

It can be seen that the curves of the astigmatic field curves become more moderate toward the high image height band in the tangential direction particularly, and the curves of the astigmatic field curves correspond to the curvature of the aspherical mirror illustrated in FIG. 13. As focusing is performed from the farthest field (200 inches) side to the nearest field (21 inches) side, the high image height band falls slightly in a negative direction. The astigmatic field curves of the intermediate image plane serve to move the position of final image formation by the concave mirror M1 to the near side and allow for focusing on the nearer field side.

Further, the distortion of the intermediate image varies greatly in accordance with the focusing. Focusing from the farthest field (200 inches) side to the nearest field (21 inches) side causes a light ray to enter the concave mirror M1 further away from the optical axis Z.

FIG. 16 illustrates variation in light rays in a case where the movable group is caused to travel in the projection optical system 1 according to Example 1. In FIG. 16, "Lnear" represents a light ray at a time when focusing on the near field side is performed, and Lfar represents a light ray at a time when focusing on the far field side is performed. Further, in FIG. 16, the lenses L21, L22, and L23 of the movable group at the time when the focusing on the far field side is performed are indicated by solid lines, and the lenses L21, L22, and L23 of the movable group at the time when the focusing on the near field side is performed are indicated by broken lines (L21', L22', and L23').

As illustrated in FIG. 16, on the near field side, a light ray enters the concave mirror M1 on side farther from the optical axis Z1. Therefore, the distortion of intermediate image needs to be varied in a positive direction on the near field side with respect to the far field side in accordance with curvature illustrated in FIG. 13.

In order to sufficiently correct the distortion in the final projection surface, it is desirable to satisfy the following condition (vi). It is to be noted that the maximum image height refers to the maximum of the image heights of the images projected onto the projection surface. In the projection optical system 1 according to Example 1, as illustrated in FIGS. 14 and 15, the distortion so varies as to satisfy the condition (vi), resulting in favorable image distortion as illustrated in FIGS. 7 to 10.
(vi) The distortion of the intermediate image with the maximum image height increases by +5% or more in a case where the projection distance is varied from the farthest field side to the nearest field side.

1.2 Comparative Example 1

A projection optical system according to Comparative example 1 is an example having a configuration different from that of the projection optical system 1 according to Example 1 in that the movable group includes only spherical surfaces and the above-described condition (ii) is not satisfied.

Table 5 describes basic lens data of the projection optical system according to Comparative example 1. Further, Table 6 describes data of aspherical surfaces of the projection optical system according to Comparative example 1. Further, Table 7 describes data related to the above-described conditions (ii), (iii), and (iv) of the projection optical system according to Comparative example 1.

TABLE 5

Comparative example 1 • Lens data

| Surface No. | Surface type | Ri | Surface spacing | ndi | vdi | |
|---|---|---|---|---|---|---|
| 1 | Spherical | Infinity | 0.50 | | | Image display surface |
| 2 | Spherical | Infinity | 2.10 | 1.4584 | 67.82 | |
| 3 | Spherical | Infinity | 8.60 | 1.8052 | 25.46 | |
| 4 | Spherical | Infinity | 0.00 | | | |
| 5 | Spherical | Infinity | 3.30 | | | |
| 6 | Spherical | 32.38 | 3.60 | 1.4939 | 79.88 | First group |
| 7 | Spherical | −17.81 | 0.15 | | | |
| 8 | Aspherical | 7.65 | 3.58 | 1.4971 | 81.56 | |
| 9 | Aspherical | 27.91 | 0.93 | | | |
| 10 | Spherical | −1292.91 | 5.10 | 1.497 | 81.61 | |
| 11 | Spherical | −14.35 | 0.70 | 1.9108 | 35.25 | |
| 12 | Spherical | 9.15 | 4.30 | | | |
| 13 | Spherical | 1493.61 | 1.83 | 1.605 | 49.81 | |
| 14 | Spherical | −8.48 | 0.00 | | | |
| 15 | Spherical | Infinity | 4.00 | | | |

TABLE 5-continued

Comparative example 1 • Lens data

| Surface No. | Surface type | Ri | Surface spacing | ndi | vdi | |
|---|---|---|---|---|---|---|
| 16 | Spherical | Infinity | 4.80 | | | |
| 17 | Spherical | 24.95 | 3.20 | 1.4875 | 70.44 | Movable group |
| 18 | Spherical | 49.23 | 0.15 | | | (Second group) |
| 19 | Spherical | 12.60 | 4.41 | 1.4875 | 70.44 | |
| 20 | Spherical | −28.32 | 3.54 | | | |
| 21 | Spherical | −13.53 | 0.70 | 1.882 | 37.22 | |
| 22 | Spherical | 40.57 | 4.44 | | | |
| 23 | Spherical | −18.96 | 3.30 | 1.5054 | 66.08 | Third group |
| 24 | Spherical | −15.91 | 0.15 | | | |
| 25 | Spherical | −16.45 | 3.30 | 1.5662 | 39.71 | |
| 26 | Spherical | −14.31 | 1.71 | | | |
| 27 | Aspherical | −12.43 | 3.00 | 1.5094 | 56.42 | |
| 28 | Aspherical | −14.21 | 56.40 | | | |
| 29 | Aspherical | −22.85 | −50.00 | | | Refractive surface |
| 30 | Spherical | Infinity | −204.14 | | | |
| 31 | Spherical | Infinity | 0.00 | | | Projection surface |

TABLE 6

Comparative example 1 • Aspherical surface data

| Surface No.. | 8 | 9 | 27 | 28 | 29 |
|---|---|---|---|---|---|
| Conic constant k | −0.139 | 17.077 | −0.045 | −0.158 | −5.400 |
| A2 | | | −2.047E−02 | −2.134E−02 | −1.331E−02 |
| A3 | | | −2.580E−04 | 9.154E−05 | 1.196E−04 |
| A4 | 5.991E−05 | 3.016E−04 | 7.154E−05 | −1.385E−08 | −5.891E−06 |
| A5 | | | 5.021E−06 | 2.053E−06 | |
| A6 | −2.456E−06 | −1.222E−05 | 3.904E−07 | 2.737E−07 | 6.247E−09 |
| A7 | | | 2.935E−08 | 1.926E−08 | |
| A8 | −6.057E−08 | −1.039E−07 | 1.753E−09 | 9.795E−10 | −8.823E−12 |
| A9 | | | 6.944E−11 | 3.159E−11 | |
| A10 | −9.796E−10 | −5.254E−10 | −7.978E−13 | −3.372E−13 | 7.056E−15 |
| A11 | | | | | |
| A12 | −1.529E−11 | 5.628E−12 | −8.032E−14 | −1.962E−14 | −1.498E−18 |
| A13 | | | | | |
| A14 | −3.453E−13 | −9.785E−13 | −7.479E−16 | −1.212E−16 | −1.428E−21 |
| A15 | | | | | |
| A16 | −9.373E−15 | | −3.395E−18 | −3.767E−19 | |
| A17 | | | | | |
| A18 | −2.199E−16 | | 1.056E−20 | 1.590E−21 | |
| A19 | | | | | |
| A20 | | | 4.909E−22 | 3.228E−23 | |

TABLE 7

Comparative example1 • Data related to conditional expressions

| | | 21 inches | 30 inches | 50 inches |
|---|---|---|---|---|
| Focal length of movable group fmov | | | 111.0 | |
| Total focal length of system fall | | 1.80 | 1.82 | 1.83 |
| Paraxial angular magnification | | | 1.50 | |
| Movable group @ Principal light ray at 90% image height | Entrance angle γ90 [deg] | | 17.8 | |
| | Exit angle [deg] | 26.3 | 26.0 | 25.7 |
| | Angular magnification | 1.48 | 1.46 | 1.45 |
| (ii) Principal light ray angular magnification at 90% image height/Paraxial angular magnification | | 0.99 | 0.98 | 0.97 |

TABLE 7-continued

| Comparative example1 • Data related to conditional expressions | | | |
|---|---|---|---|
| | 21 inches | 30 inches | 50 inches |
| (iii) \|fmov/fall\| | 61.7 | 61.1 | 60.7 |
| (iv) β0 | | 0.3 | |
| Focal length of intermediate image forming lens group fmid | 26.2 | 26.0 | 25.7 |
| fmid/fall | 14.6 | 14.3 | 14.1 |

FIGS. 17 to 19 illustrate spot diagrams of the projection optical system according to Comparative example 1. FIG. 17 illustrates a spot diagram in a case where the projection size is 21 inches. FIG. 18 illustrates a spot diagram in a case where the projection size is 30 inches. FIG. 19 illustrates a spot diagram in a case where the projection size is 50 inches.

FIGS. 20 to 22 illustrate image distortion of the projection optical system according to Comparative example 1. FIG. 20 illustrates image distortion in the case where the projection size is 21 inches. FIG. 21 illustrates image distortion in the case where the projection size is 30 inches. FIG. 22 illustrates image distortion in the case where the projection size is 50 inches.

FIGS. 23 and 24 illustrate astigmatic field curves and distortion at the intermediate image formation position of the projection optical system according to Comparative example 1. FIG. 23 illustrates astigmatic field curves and distortion in cases where the projection sizes are 21 inches and 30 inches. FIG. 24 illustrates astigmatic field curves and distortion in the case where the projection size is 50 inches. In FIGS. 23 and 24, "S" represents an astigmatic field curve in a sagittal image plane, and "T" represents an astigmatic field curve in a tangential image plane.

In the projection optical system according to Comparative example 1, as illustrated in FIGS. 17 to 19, the spot size is slightly larger than that of Example 1. In particular, in the case of 50 inches, only resolving power equivalent to WXGA is obtained, and the focusable range is narrowed to a range equivalent to that from 21 inches to 50 inches.

Further, in the projection optical system according to Comparative example 1, as illustrated in FIGS. 20 to 22, the image distortion of the projection image is greater than that of Example 1. In particular, pincushion image distortion is remarkably observed in the case of 21 inches. Such image distortion is undesirable in terms of quality because some users may be concerned about it. In the projection optical system according to Comparative example 1, since the aspherical surface is not used in the movable group and and the above-described condition (ii) is not satisfied, the angular magnification of the high image height band becomes excessively great. Therefore, aberration and image distortion are deteriorated.

Further, in the projection optical system according to Comparative example 1, since the aspherical surfaces are used in the first group 11 and the third group 13 although the aspherical surface is not used in the movable group, the astigmatic field curves at the intermediate image formation position are designed to be close to that of Example 1 to some extent, as illustrated in FIGS. 23 and 24. Meanwhile, the projection optical system according to Comparative example 1 is characterized in that the distortion at the intermediate image formation position hardly varies in accordance with the focusing. Therefore, in the projection optical system according to Comparative example 1, the above-described condition (vi) is not satisfied, and the distortion remains in the final projection surface. In the projection optical system according to Comparative example 1, a design parameter is used for the correction of the distortion in order to balance the aberration correction. Therefore, other aberration correction cannot be sufficiently performed. This makes a spotting performance tend to deteriorate compared with that in Example 1.

1.3 Example 2

FIG. 25 illustrates a configuration of a projection optical system 2 according to Example 2. Table 8 describes basic lens data of the projection optical system 2 according to Example 2. Further, Table 9 describes data of aspherical surfaces of the projection optical system 2 according to Example 2. Further. Table 10 describes data related to the above-described conditions (ii). (iii), and (iv) of the projection optical system 2 according to Example 2.

TABLE 8

| Example 2 • Lens data | | | | | |
|---|---|---|---|---|---|
| Surface No. | Surface type | Ri | Surface spacing | ndi | vdi |
| 1 | Spherical | Infinity | 0.5 | | Image display surface |
| 2 | Spherical | Infinity | 2.1 | 1.4584 | 67.82 |
| 3 | Spherical | Infinity | 8.6 | 1.8052 | 25.46 |
| 4 | Spherical | Infinity | 0.0 | | |
| 5 | Spherical | Infinity | 3.3 | | |
| 6 | Spherical | 29.16 | 3.6 | 1.5968 | 46.02 First group |
| 7 | Spherical | −43.47 | 0.8 | | |
| 8 | Aspherical | 9.93 | 3 | 1.4875 | 70.24 |
| 9 | Aspherical | 29.69 | 0.30 | | |
| 10 | Spherical | 12.34 | 3.5 | 1.497 | 81.61 |
| 11 | Spherical | −28.82 | 0.295 | | |
| 12 | Spherical | −185.62 | 0.70 | 1.883 | 40.81 |
| 13 | Spherical | 9.06 | 3.68 | 1.497 | 81.61 |
| 14 | Spherical | −7.14 | 0.70 | 1.834 | 37.35 |
| 15 | Spherical | 10.58 | 2.99 | | |
| 16 | Spherical | 81.30 | 1.89 | 1.5728 | 41.17 |
| 17 | Spherical | −7.48 | 0 | | |
| 18 | Spherical | Infinity | 4 | | |
| 19 | Spherical | Infinity | 3.66 | | |
| 20 | Spherical | 66.91 | 2.62 | 1.4977 | 62.90 Movable group (Second group) |
| 21 | Spherical | −18.58 | 1.94 | | |
| 22 | Spherical | 15.09 | 3.13 | 1.4875 | 70.44 |
| 23 | Spherical | −167.15 | 3.16 | | |
| 24 | Aspherical | −9.54 | 0.7 | 1.8083 | 40.92 |
| 25 | Aspherical | 59.37 | 5.58 | | |
| 26 | Spherical | −14.86 | 3.3 | 1.4875 | 70.44 Third group |
| 27 | Spherical | −12.86 | 0.15 | | |
| 28 | Spherical | −20.74 | 3.3 | 1.7013 | 51.23 |
| 29 | Spherical | −17.12 | 0.7 | | |
| 30 | Aspherical | −16.56 | 3 | 1.5094 | 56.42 |
| 31 | Aspherical | −18.92 | 56.4 | | |

TABLE 8-continued

Example 2 • Lens data

| Surface No. | Surface type | Ri | Surface spacing | ndi | vdi | |
|---|---|---|---|---|---|---|
| 32 | Aspherical | −25.49 | −50 | | | Refractive surface |
| 33 | Spherical | Infinity | −107.25 | | | |
| 34 | Spherical | Infinity | 0 | | | Projection surface |

TABLE 9

Example 2 • Aspherical surface data

| Surface No. | 8 | 9 | 24 | 25 | 30 | 31 | 32 |
|---|---|---|---|---|---|---|---|
| Conic constant k | | 0.574 | −3.625 | | −0.087 | 1.195 | −5.557 |
| A2 | | | | | 4.454E−03 | 2.533E−03 | −1.296E−02 |
| A3 | | | | | 5.823E−04 | 1.048E−03 | 1.091E−04 |
| A4 | | 2.458E−04 | −2.707E−04 | −1.294E−04 | 4.292E−05 | −2.991E−05 | −6.111E−06 |
| A5 | | | | | 1.046E−05 | 1.314E−05 | |
| A6 | −7.573E−07 | | 1.699E−06 | 6.530E−07 | 6.656E−07 | 8.872E−07 | 6.308E−09 |
| A7 | | | | | | | |
| A8 | 9.201E−09 | | | | −6.061E−09 | −4.277E−09 | −8.667E−12 |
| A9 | | | | | | | |
| A10 | −4.537E−10 | | | | −4.315E−11 | −2.876E−11 | 6.501E−15 |
| A11 | | | | | | | |
| A12 | | | | | 1.901E−13 | 1.453E−13 | −2.585E−18 |
| A13 | | | | | | | |
| A14 | | | | | 3.339E−15 | 1.644E−15 | 3.193E−22 |
| A15 | | | | | | | |
| A16 | | | | | −2.049E−17 | −9.347E−18 | |
| A17 | | | | | | | |
| A18 | | | | | | | |
| A19 | | | | | | | |
| A20 | | | | | | | |

TABLE 10

Example 2 • Data related to conditional expressions

| | | 21 inches | 30 inches | 100 inches | 200 inches |
|---|---|---|---|---|---|
| Focal length of movable group fmov | | | 109.6 | | |
| Total focal length of system fall | | 1.82 | 1.84 | 1.87 | 1.87 |
| Paraxial angular magnification | | | 1.56 | | |
| Movable group Principal light ray at 90% image height | Entrance angle γ90 [deg] | | 18.3 | | |
| | Exit angle [deg] | 25.4 | 24.8 | 24.1 | 23.8 |
| | Angular magnification | 1.39 | 1.35 | 1.31 | 1.30 |
| (ii) Principal light ray angular magnification at 90% image height/Paraxial angular magnification | | 0.89 | 0.87 | 0.84 | 0.83 |
| (iii) \|fmov/fall\| | | 60.3 | 59.6 | 58.7 | 58.6 |
| (iv) β0 | | | 0.4 | | |
| Focal length of intermediate image forming lens group fmid | | 21.8 | 21.5 | 21.2 | 21.1 |
| fmid/fall | | 12.0 | 11.7 | 11.4 | 11.3 |

FIGS. 26 to 29 illustrate spot diagrams of the projection optical system 2 according to Example 2. FIG. 26 illustrates a spot diagram in a case where the projection size is 21 inches. FIG. 27 illustrates a spot diagram in a case where the projection size is 30 inches. FIG. 28 illustrates a spot diagram in a case where the projection size is 100 inches. FIG. 29 illustrates a spot diagram in a case where the projection size is 200 inches.

FIGS. 30 to 33 illustrate image distortion of the projection optical system 2 according to Example 2. FIG. 30 illustrates image distortion in the case where the projection size is 21 inches. FIG. 31 illustrates image distortion in the case where the projection size is 30 inches. FIG. 32 illustrates image distortion in the case where the projection size is 100 inches. FIG. 33 illustrates image distortion in the case where the projection size is 200 inches.

FIGS. 34 and 35 illustrate astigmatic field curves and distortion at the intermediate image formation position of the projection optical system 2 according to Example 2. FIG. 34 illustrates astigmatic field curves and distortion in cases where the projection sizes are 21 inches and 30 inches. FIG. 35 illustrates astigmatic field curves and distortion in the cases where the projection sizes are 100 inches and 200 inches. In FIGS. 34 and 35, "S" represents an astigmatic field curve in a sagittal image plane, and "T" represents an astigmatic field curve in a tangential image plane.

A basic configuration of the projection optical system 2 according to Example 2 is approximately similar to that of the projection optical system 1 according to Example 1. The basic configuration of the projection optical system 2 according to Example 2 satisfies all of the above-described conditions (i), (ii), (iii), (iv), (v), and (vi), as with the projection optical system 1 according to Example 1. It can be seen that the aberrations and the image distortion are sufficiently reduced in the projection range from 21 inches to 200 inches also in the projection optical system 2 according to Example 2.

1.4 Comparative Example 2

FIG. 36 illustrates a configuration of a projection optical system 2A according to Comparative example 2. Table 11 describes basic lens data of the projection optical system 2A according to Comparative example 2. Further, Table 12 describes data of aspherical surfaces of the projection optical system 2A according to Comparative example 2. Further, Table 13 describes data related to the above-described conditions (ii), (iii), and (iv) of the projection optical system 2A according to Comparative example 2.

TABLE 11

Comparative example 2 • Lens data

| Surface No. | Surface type | Ri | Surface spacing | ndi | vdi | |
|---|---|---|---|---|---|---|
| 1 | Spherical | Infinity | 0.5 | | | Image display surface |
| 2 | Spherical | Infinity | 2.1 | 1.4584 | 67.82 | |
| 3 | Spherical | Infinity | 8.6 | 1.8052 | 25.46 | |
| 4 | Spherical | Infinity | 0.0 | | | |
| 5 | Spherical | Infinity | 3.3 | | | |
| 6 | Spherical | 165.68 | 2.6 | 1.8459 | 36.85 | First group |
| 7 | Spherical | −34.20 | 0.15 | | | |
| 8 | Aspherical | 10.79 | 2 | 1.4875 | 70.24 | |
| 9 | Aspherical | 14.72 | 0.15 | | | |
| 10 | Spherical | 8.93 | 4.5 | 1.497 | 81.61 | |
| 11 | Spherical | −31.21 | 0.150 | | | |
| 12 | Spherical | 81.79 | 0.70 | 1.883 | 40.81 | |
| 13 | Spherical | 9.61 | 4.03 | 1.497 | 81.61 | |
| 14 | Spherical | −8.49 | 0.70 | 1.834 | 37.35 | |
| 15 | Spherical | 11.80 | 4.10 | | | |
| 16 | Spherical | −2343.30 | 1.73 | 1.6247 | 41.15 | |
| 17 | Spherical | −9.29 | 0 | | | |
| 18 | Spherical | Infinity | 4 | | | |
| 19 | Spherical | Infinity | 3.03 | | | |
| 20 | Spherical | 44.61 | 2.36 | 1.4964 | 77.95 | Movable group (Second group) |
| 21 | Spherical | −32.00 | 3.04 | | | |
| 22 | Spherical | 16.52 | 6.27 | 1.4875 | 70.44 | |
| 23 | Spherical | −27.85 | 2.09 | | | |
| 24 | Aspherical | −12.81 | 0.7 | 1.8083 | 40.92 | |
| 25 | Aspherical | 24.84 | 6.21 | | | |
| 26 | Spherical | −27.88 | 4 | 1.4875 | 82.00 | Third group |
| 27 | Spherical | −12.62 | 0.15 | | | |
| 28 | Spherical | −24.32 | 2 | 1.9258 | 22.88 | |
| 29 | Spherical | −18.87 | 2 | | | |
| 30 | Aspherical | −14.07 | 4.71 | 1.5094 | 56.42 | |
| 31 | Aspherical | −19.61 | 56.4 | | | |
| 32 | Aspherical | −36.22 | −50 | | | Refractive surface |
| 33 | Spherical | Infinity | −109.40 | | | |
| 34 | Spherical | Infinity | 0 | | | Projection surface |

TABLE 12

Example 2 • Aspherical surface data

| Surface No. | 8 | 9 | 24 | 25 | 30 | 31 | 32 |
|---|---|---|---|---|---|---|---|
| Conic constant k | | −1.216 | −4.933 | | 0.215 | 0.229 | −7.774 |
| A2 | | | | | −1.709E−02 | −6.021E−04 | −1.374E−02 |
| A3 | | | | | 5.940E−04 | 8.560E−04 | 1.015E−04 |
| A4 | | 3.001E−04 | −1.611E−04 | −8.134E−05 | −3.157E−05 | −6.240E−05 | −5.670E−06 |
| A5 | | | | | 1.152E−05 | 9.612E−06 | |
| A6 | −5.706E−07 | | 8.587E−07 | 3.585E−07 | 1.415E−06 | 6.093E−07 | 6.852E−09 |
| A7 | | | | | | | |
| A8 | −1.098E−08 | | | | −6.378E−09 | −2.447E−09 | −8.835E−12 |
| A9 | | | | | | | |
| A10 | −2.278E−10 | | | | −8.733E−11 | −1.502E−11 | 6.427E−15 |
| A11 | | | | | | | |

TABLE 12-continued

Example 2 • Aspherical surface data

| Surface No. | 8 | 9 | 24 | 25 | 30 | 31 | 32 |
|---|---|---|---|---|---|---|---|
| A12 | | | | | 2.072E−13 | 3.246E−14 | −2.632E−18 |
| A13 | | | | | | | |
| A14 | | | | | 6.144E−15 | 4.017E−16 | 4.336E−22 |
| A15 | | | | | | | |
| A16 | | | | | −3.089E−17 | −1.349E−18 | |
| A17 | | | | | | | |
| A18 | | | | | | | |
| A19 | | | | | | | |
| A20 | | | | | | | |

TABLE 13

Comparative example 2 • Data related to conditional expressions

| | | 21 inches | 30 inches | 100 inches | 200 inches |
|---|---|---|---|---|---|
| Focal length of movable group fmov | | | 75.1 | | |
| Total focal length of system fall | | 1.76 | 1.82 | 1.87 | 1.88 |
| Paraxial angular magnification | | | 1.57 | | |
| Movable group @ Principal light ray at 90% image height | Entrance angle γ90 [deg] | | 18.6 | | |
| | Exit angle [deg] | 28.1 | 26.9 | 25.8 | 25.6 |
| | Angular magnification | 1.51 | 1.45 | 1.39 | 1.37 |
| (ii) Principal light ray angular magnification at 90% image height | | 0.96 | 0.92 | 0.88 | 0.88 |
| Paraxial angular magnification | | | | | |
| (iii) \|fmov/fall\| | | 42.6 | 41.4 | 40.1 | 39.9 |
| (iv) β0 | | | 0.6 | | |
| Focal length of intermediate image forming lens group fmid | | 16.4 | 16.5 | 16.5 | 16.5 |
| fmid/fall | | 9.3 | 9.1 | 8.8 | 8.7 |

FIGS. 37 to 40 illustrate spot diagrams of the projection optical system 2A according to Comparative example 2. FIG. 37 illustrates a spot diagram in a case where the projection size is 21 inches. FIG. 38 illustrates a spot diagram in a case where the projection size is 30 inches. FIG. 39 illustrates a spot diagram in a case where the projection size is 100 inches. FIG. 40 illustrates a spot diagram in a case where the projection size is 200 inches.

FIGS. 41 to 42 illustrate image distortion of the projection optical system 2A according to Comparative example 2. FIG. 40 illustrates image distortion in the case where the projection size is 21 inches. FIG. 42 illustrates image distortion in the case where the projection size is 200 inches.

FIGS. 43 and 44 illustrate astigmatic field curves and distortion at the intermediate image formation position of the projection optical system 2A according to Comparative example 2. FIG. 43 illustrates astigmatic field curves and distortion in cases where the projection sizes are 21 inches and 30 inches. FIG. 44 illustrates astigmatic field curves and distortion in the cases where the projection sizes are 100 inches and 200 inches. In FIGS. 43 and 44, "S" represents an astigmatic field curve in a sagittal image plane, and "T" represents an astigmatic field curve in a tangential image plane.

As illustrated in Table 13, the projection optical system 2A according to Comparative example 2 is an example having a configuration different from that of the projection optical system 2 according to Example 2 in that the above-described condition (ii) is not satisfied. The concave lens (lens L23) in the movable group includes, however, an aspherical lens, as with the projection optical system 2 according to Example 2.

The projection optical system 2A according to Comparative example 2 satisfies conditions other than the above-described condition (ii). For example, as illustrated in FIG. 36, the above-described condition (v) is satisfied. Further, for example, as illustrated in FIGS. 43 and 44, the above-described condition (vi) is satisfied. This makes it possible in particular to favorably correct the distortion. In the projection optical system 2A according to Comparative example 2, as illustrated in FIGS. 37 to 42, the optical design is sufficiently favorable in terms of general performance such as a spot size or image distortion.

The projection optical system 2A according to Comparative example 2 has, however, a configuration that is disadvantageous in terms of a temperature characteristic and mass productivity. Compared with Example 1 and Example 2, the projection optical system 2A according to Comparative example 2 has a larger Rate value of the above-described condition (ii) in the movable group. Therefore, the optical power for that is provided to the rearmost lens L33 in the third group 13. Accordingly, the shape of the lens L33 is closer to the shape of the rearmost lens L23 (concave lens) in the movable group in the projection optical system 2 of Example 2 in that the entrance surface is closer to a parabolic surface and the exit surface has a less sag amount. Generally, a lens having a large diameter and a complicated curvature, such as the lens L33, is difficult to mold unless it is a plastic lens. The plastic lens, however, having an uneven surface thickness is disadvantageous in terms of the temperature characteristic.

FIG. 45 illustrates a spot diagram of the projection optical system 2A according to Comparative example 2 in which temperature variation is taken into consideration. Further, FIG. 46 illustrates a spot diagram of the projection optical system 2 according to Example 2 in which temperature variation is taken into consideration. FIGS. 45 and 46 illustrate spot diagrams in a case where the projection size is 30 inches and the lens L33 has a characteristic corresponding to a temperature of 50° C.

It is to be noted that, in FIGS. 45 and 46, only the lens L33 is set to 50° C. for calculation. One reason for this is that only the lens L33 is a plastic lens and is easily influenced by temperature variation compared with other lenses. Since the concave mirror M1 is reflective, the influence of the temperature variation is small thereon. Further, it is more difficult for a glass lens to be influenced by the temperature variation compared with a plastic lens. Therefore, in calculation, it is possible to examine the influence of the temperature variation on the optical system as a whole only by varying the temperature of the plastic lens L33 to a high temperature. As illustrated in FIG. 45, in the projection optical system 2A according to Comparative example 2, it can be seen that the spot enlarges from the middle region image height, and the spot is blurred due to the temperature variation. In contrast, as illustrated in FIG. 46, in the projection optical system 2 according to Example 2, the enlargement of the spots is suppressed only to the vicinity of the maximum image height. One reason for this is that the thickness of the lens L33 is approximately uniform in Example 2. Since the image plane in the vicinity of the maximum image height can be adjusted by focusing, the spots can be sized to be equal to that of 20° C. In contrast, in Comparative example 2, even if focusing is performed, the enlargement of the spot is not resolved because of the influence of the blurring from the middle region.

In addition, when the thickness of the plastic lens is great in its periphery, there is also a problem in mass production that the filling of the plastic material is insufficient or a sink mark is easily generated at the time of molding. Therefore, it is more desirable to provide the projection optical system 2A according to Comparative example 2 with a design that satisfies the above-described condition (ii) as with Example 2, taking into consideration the mass productivity.

1.5 Example 3

FIG. 47 illustrates a configuration of a projection optical system 3 according to Example 3. Table 14 describes basic lens data of the projection optical system 3 according to Example 3. Further, Table 15 describes data of aspherical surfaces of the projection optical system 3 according to Example 3. Further, Table 16 describes data related to the above-described conditions (ii), (iii), and (iv) of the projection optical system 3 according to Example 3.

TABLE 14

Example 3 • Lens data

| Surface No. | Surface type | $R_i$ | Surface spacing | $nd_i$ | $vd_i$ | |
|---|---|---|---|---|---|---|
| 1 | Spherical | Infinity | 0.5 | | | Image display surface |
| 2 | Spherical | Infinity | 2.1 | 1.4584 | 67.82 | |
| 3 | Spherical | Infinity | 8.6 | 1.8052 | 25.46 | |
| 4 | Spherical | Infinity | 0.0 | | | |
| 5 | Spherical | Infinity | 3.3 | | | |
| 6 | Spherical | 27.98 | 3.6 | 1.6485 | 47.72 | First group |
| 7 | Spherical | −44.00 | 0.15 | | | |
| 8 | Aspherical | 10.40 | 3 | 1.4875 | 70.24 | |
| 9 | Aspherical | 28.76 | 0.15 | | | |
| 10 | Spherical | 15.00 | 3.5 | 1.497 | 81.61 | |
| 11 | Spherical | −29.32 | 0.736 | | | |
| 12 | Spherical | −97.57 | 0.70 | 1.883 | 40.81 | |
| 13 | Spherical | 7.14 | 3.97 | 1.497 | 81.61 | |
| 14 | Spherical | −6.53 | 0.70 | 1.834 | 37.35 | |
| 15 | Spherical | 12.90 | 3.06 | | | |
| 16 | Spherical | 76.21 | 1.92 | 1.5567 | 41.83 | |
| 17 | Spherical | −7.58 | 0 | | | |
| 18 | Spherical | Infinity | 4 | | | |
| 19 | Spherical | Infinity | 3.94 | | | |
| 20 | Spherical | 60.68 | 2.73 | 1.4876 | 81.90 | Movable group (Second group) |
| 21 | Spherical | −19.28 | 5.42 | | | |
| 22 | Spherical | 14.48 | 3.84 | 1.4875 | 70.44 | |
| 23 | Spherical | −118.17 | 3.48 | | | |
| 24 | Aspherical | −10.86 | 0.7 | 1.8083 | 40.92 | |
| 75 | Aspherical | 59.84 | 5.30 | | | |
| 26 | Spherical | −15.01 | 3.3 | 1.4875 | 82.00 | Third group |
| 27 | Spherical | −13.37 | 0.15 | | | |
| 28 | Spherical | −19.57 | 3.3 | 1.6216 | 31.96 | |
| 29 | Spherical | −18.35 | 0.7 | | | |
| 30 | Aspherical | −16.13 | 3.06 | 1.5094 | 56.42 | |
| 31 | Aspherical | −18.96 | 56.4 | | | |
| 32 | Aspherical | −28.89 | −50 | | | Refractive surface |
| 33 | Spherical | Infinity | −110.18 | | | |
| 34 | Spherical | Infinity | 0 | | | Projection surface |

TABLE 15

Example 3 • Aspherical surface data

| Surface No. | 8 | 9 | 24 | 25 | 30 | 31 | 32 |
|---|---|---|---|---|---|---|---|
| Conic constant k | | −0.641 | −3.704 | | −0.070 | 1.178 | −5.980 |
| A2 | | | | | 2.122E−03 | 3.028E−03 | −1.297E−02 |
| A3 | | | | | 5.143E−04 | 1.017E−03 | 1.035E−04 |
| A4 | | | 2.302E−04 | −2.524E−04 | −1.561E−04 | 4.143E−05 | −3.603E−05 | −6.184E−06 |
| A5 | | | | | 1.049E−05 | 1.260E−05 | |
| A6 | −3.845E−07 | | 1.231E−06 | 4.936E−07 | 6.620E−07 | 8.639E−07 | 6.493E−09 |
| A7 | | | | | | | |
| A8 | 1.798E−09 | | | | −6.139E−09 | −4.115E−09 | −8.609E−12 |
| A9 | | | | | | | |

TABLE 15-continued

Example 3 • Aspherical surface data

| Surface No. | 8 | 9 | 24 | 25 | 30 | 31 | 32 |
|---|---|---|---|---|---|---|---|
| A10 | −2.825E−10 | | | | −4.261E−11 | −2.703E−11 | 6.408E−15 |
| A11 | | | | | | | |
| A12 | | | | | 2.029E−13 | 1.539E−13 | −2.685E−18 |
| A13 | | | | | | | |
| A14 | | | | | 3.408E−15 | 1.663E−15 | 4.192E−22 |
| A15 | | | | | | | |
| A16 | | | | | −2.155E−17 | −9.494E−18 | |
| A17 | | | | | | | |
| A18 | | | | | | | |
| A19 | | | | | | | |
| A20 | | | | | | | |

TABLE 16

Example 3 • Data related to conditional expressions

| | | 21 inches | 30 inches | 100 inches | 200 inches |
|---|---|---|---|---|---|
| Focal length of movable group fmov | | | 39.9 | | |
| Total focal length of system fall | | 1.78 | 1.85 | 1.92 | 1.93 |
| Paraxial angular magnification | | | 1.52 | | |
| Movable group @ Principal light ray at 90% image height | Entrance angle γ90 [deg] | | 17.0 | | |
| | Exit angle [deg] | 22.2 | 21.2 | 20.3 | 20.1 |
| | Angular magnification | 1.31 | 1.25 | 1.20 | 1.18 |
| (ii) Principal light ray angular magnification at 90% image height/Paraxial angular magnification | | 0.86 | 0.82 | 0.79 | 0.78 |
| (iii) \|fmov/fall\| | | 22.4 | 21.6 | 20.8 | 20.6 |
| (iv) β0 | | | | 1.5 | |
| Focal length of intermediate image forming lens group fmid | | 18.1 | 18.4 | 18.7 | 18.8 |
| fmid/fall | | 10.1 | 9.9 | 9.7 | 9.7 |

FIGS. 48 and 49 illustrate spot diagrams of the projection optical system 3 according to Example 3. FIG. 48 illustrates a spot diagram in a case where the projection size is 21 inches. FIG. 49 illustrates a spot diagram in a case where the projection size is 100 inches.

FIGS. 50 and 51 illustrate image distortion of the projection optical system 3 according to Example 3. FIG. 50 illustrates image distortion in the case where the projection size is 21 inches. FIG. 51 illustrates image distortion in the case where the projection size is 100 inches.

FIG. 52 illustrates astigmatic field curves and distortion at the intermediate image formation position of the projection optical system 3 according to Example 3. FIG. 52 illustrates astigmatic field curves and distortion in cases where the projection sizes are 21 inches and 200 inches. In FIG. 52, "S" represents an astigmatic field curve in a sagittal image plane, and "T" represents an astigmatic field curve in a tangential image plane.

The projection optical system 3 according to Example 3 satisfies all of the above-described conditions (i), (ii), (iii), (iv), (v), and (vi), as with Examples 1 and 2.

The projection optical system 3 according to Example 3 is a configuration example in which the optical power of the movable group is relatively greater than that in Examples 1 and 2. As described in Table 16, the optical power of the movable group is made relatively great so that the value of |fmov/fall| is about 20. In the projection optical system 3 according to Example 3, although aberration correction is achieved to some extent, the spot size in the case of 21 inches tends to be enlarged due to the relatively-large optical power of the movable group. Therefore, the projection optical system 3 according to Example 3 is slightly disadvantageous in performance compared with Examples 1 and 2. This indicates that providing optical power to the movable group causes unbalance of aberration at the time of focusing. Therefore, as with Examples 1 and 2, the larger the numerical value of |fmov/fall| is, the wider the focusable range can be.

Further, in the projection optical system 3 according to Example 3, an angle β0 of an upper light ray from the 0% image height with respect to the optical axis is about 1.5 degrees (divergence). The aberrations of the system as a whole are balanced by balancing the angle β0 with the optical power of the movable group. The greater the angle β0 is, the more difficult the aberration correction becomes. In this case, the aberrations can be corrected by increasing the total length of the movable group. In that case, however, the total length is increased. Therefore, it is desirable that 00 be 1.5 deg or smaller.

1.6 Example 41

FIG. 53 illustrates a configuration of a projection optical system 4 according to Example 4. Table 17 describes basic lens data of the projection optical system 4 according to Example 4. Further, Table 18 describes data of aspherical surfaces of the projection optical system 4 according to Example 4. Further, Table 19 describes data related to the above-described conditions (ii), (iii), and (iv) of the projection optical system 4 according to Example 4.

TABLE 17

Example 4 • Lens data

| Surface No. | Surface type | Ri | Surface spacing | ndi | vdi | |
|---|---|---|---|---|---|---|
| 1 | Spherical | Infinity | 0.5 | | | Image display surface |
| 2 | Spherical | Infinity | 2.1 | 1.4584 | 67.82 | |
| 3 | Spherical | Infinity | 8.6 | 1.8052 | 25.46 | |
| 4 | Spherical | Infinity | 0.0 | | | |
| 5 | Spherical | Infinity | 3.3 | | | |
| 6 | Spherical | 60.65 | 3.6 | 1.7182 | 42.51 | First group |
| 7 | Spherical | −34.42 | 3.61 | | | |
| 8 | Spherical | 23.85 | 4.72 | 1.4875 | 70.24 | |
| 9 | Spherical | −77.98 | 0.15 | | | |
| 10 | Spherical | 9.86 | 4.4 | 1.497 | 81.61 | |
| 11 | Spherical | 50.31 | 0.72 | | | |
| 12 | Spherical | −36.49 | 0.70 | 1.883 | 40.81 | |
| 13 | Spherical | 6.69 | 4.22 | 1.497 | 81.61 | |
| 14 | Spherical | 5.74 | 0.70 | 1.834 | 37.35 | |
| 15 | Spherical | 82.23 | 2.10 | | | |
| 16 | Spherical | −115.82 | 1.91 | 1.715 | 34.53 | |
| 17 | Spherical | −8.60 | 0 | | | |
| 18 | Spherical | Infinity | 4 | | | |
| 19 | Spherical | Infinity | 3.29 | | | |
| 20 | Spherical | 451.86 | 6.50 | 1.4875 | 82.00 | Movable group (Second group) |
| 21 | Spherical | −33.49 | 16.52 | | | |
| 22 | Spherical | 17.55 | 7.30 | 1.4875 | 70.44 | |
| 23 | Spherical | −24.11 | 3.03 | | | |
| 24 | Aspherical | −9.57 | 0.7 | 1.8083 | 40.92 | |
| 25 | Spherical | −1239.88 | 5.95 | | | |
| 26 | Spherical | −41.60 | 3.6 | 1.6195 | 50.73 | Third group |
| 27 | Spherical | −19.89 | 0.15 | | | |
| 28 | Spherical | −59.40 | 3.3 | 1.8046 | 38.32 | |
| 29 | Spherical | −22.06 | 1.09 | | | |
| 30 | Spherical | −18.85 | 1.50 | 1.5208 | 68.28 | |
| 31 | Spherical | 33.26 | 4.17 | | | |

TABLE 17-continued

Example 4 • Lens data

| Surface No. | Surface type | Ri | Surface spacing | ndi | vdi | |
|---|---|---|---|---|---|---|
| 32 | Aspherical | 1179.80 | 2.6 | 1.5094 | 56.42 | |
| 33 | Aspherical | −108.22 | 56.4 | | | |
| 34 | Aspherical | −39.26 | −50 | | | Refractive surface |
| 35 | Spherical | Infinity | −109.5 | | | |
| 36 | Spherical | Infinity | 0 | | | Projection surface |

TABLE 18

Example 4 • Aspherical surface data

| Surface No. | 24 | 32 | 33 | 34 |
|---|---|---|---|---|
| Conic constant k | −2.199 | −1.464E+35 | 9.828 | −9.039 |
| A2 | | 2.448E−03 | −1.009E−03 | −1.331E−02 |
| A3 | | −5.692E−04 | −2.543E−04 | 9.682E−05 |
| A4 | −3.846E−05 | 3.823E−06 | −9.942E−06 | −5.772E−06 |
| A5 | | 5.668E−07 | 1.500E−06 | |
| A6 | 9.127E−08 | 8.864E−08 | 1.115E−07 | 7.047E−09 |
| A7 | | | | |
| A8 | | 2.071E−10 | 7.414E−11 | −8.858E−12 |
| A9 | | | | |
| A10 | | −2.011E−12 | −8.156E−13 | 6.330E−15 |
| A11 | | | | |
| A12 | | −9.756E−15 | −7.4520−15 | −2.535E−18 |
| A13 | | | | |
| A14 | | −2.759E−18 | −2.643E−17 | 4.119E−22 |
| A15 | | | | |
| A16 | | −2.853E−20 | 1.301E−19 | |
| A17 | | | | |
| A18 | | | | |
| A19 | | | | |
| A20 | | | | |

TABLE 19

Example 4 • Data related to conditional expressions

| | | 21 indies | 30 inches | 100 inches | 200 inches |
|---|---|---|---|---|---|
| Focal length of movable group fmov | | | 80.3 | | |
| Total focal length of system fall | | 1.76 | 1.82 | 1.88 | 1.89 |
| Paraxial angular magnification | | | 1.70 | | |
| Movable group @ Principal light ray at 90% image height | Entrance angle γ90 [deg] | | 16.2 | | |
| | Exit angle [deg] | 19.3 | 18.2 | 17.1 | 17.0 |
| | Angular magnification | 1.19 | 1.12 | 1.06 | 1.05 |
| (ii) Principal light ray angular magnification at 90% image height/Paraxial angular magnification | | 0.70 | 0.66 | 0.62 | 0.62 |
| (iii) \|fmov/fall\| | | 45.6 | 44.2 | 42.8 | 42.5 |
| (iv) β0 | | | 0.6 | | |
| Focal length of intermediate image forming lens group fmid | | 16.5 | 16.5 | 16.6 | 16.6 |
| fmid/fall | | 9.3 | 9.1 | 8.8 | 8.8 |

FIGS. 54 and 55 illustrate spot diagrams of the projection optical system 4 according to Example 4. FIG. 54 illustrates a spot diagram in a case where the projection size is 21 inches. FIG. 55 illustrates a spot diagram in a case where the projection size is 200 inches.

FIGS. 56 and 57 illustrate image distortion of the projection optical system 4 according to Example 4. FIG. 56 illustrates image distortion in the case where the projection size is 21 inches. FIG. 57 illustrates image distortion in the case where the projection size is 200 inches.

FIG. 58 illustrates astigmatic field curves and distortion at the intermediate image formation position of the projection optical system 4 according to Example 4. FIG. 58 illustrates astigmatic field curves and distortion in cases where the projection sizes are 21 inches and 200 inches. In FIG. 58, "S" represents an astigmatic field curve in a sagittal image plane, and "T" represents an astigmatic field curve in a tangential image plane.

The projection optical system 4 according to Example 4 satisfies all of the above-described conditions (i), (ii), (iii), (iv), (v), and (vi), as with Examples 1, 2, and 3.

The projection optical system 4 according to Example 4 is a configuration example in which the light entrance surface of the rearmost lens L23 (concave lens) in the movable group is the only aspherical surface in the movable group. Sufficient optical performance is obtained as illustrated in FIGS. 54 to 57 also in a case where the entrance surface of the concave lens in the movable group is the only aspherical surface in the movable group. From this, it is understood that, in the movable group, at least the entrance surface of the concave lens in the movable group needs to be aspherical in terms of performance.

1.7 Modification Examples

In the projection optical system according to each Example described above, the distance from the intermediate image forming lens group 10 to the concave mirror M1 is relatively long. Further, the angles of the light rays therebetween are not so great. Therefore, a plane mirror may be disposed therebetween to fold back the optical path. As a result, it is possible to improve designability in a case where it is configured as a projector.

FIG. 59 illustrates a first configuration example of a housing 110 that contains the projection optical system. FIG. 60 illustrates a second configuration example of the housing 110 that contains the projection optical system.

In each of the configuration examples in FIGS. 59 and 60, the intermediate image forming lens group 10 and the concave mirror M1 are contained in the housing 110. The light outputted from the concave mirror M1 is outputted through a housing window 111 provided in the housing 110, and a projection image is projected onto an external projection surface 30.

Here, the second configuration example in FIG. 60 has a configuration in which a plane mirror M2 is disposed between the intermediate image forming lens group 10 and the concave mirror M1 to fold back the optical path. In contrast, in the first configuration example in FIG. 59, the plane mirror M2 is not disposed.

In the first configuration example in FIG. 59, it is necessary to provide a notch 112 near the housing window 111 in the housing 110, for example, in view of design. In contrast, in the second configuration example in FIG. 60, it is not necessary to provide the notch 112 in terms of design, and the designability of the housing 110 is thereby improved.

Generally, increasing the distance from the intermediate image forming lens group 10 to the concave mirror M relatively decreases the maximum image height passing through the intermediate image forming lens group 10 relatively, thereby decreasing capability to correct the astigmatic field curves and the distortion. Therefore, it tends to be difficult to improve the aberration correction capability without providing an aspherical surface in the movable group of the intermediate image forming lens group 10. The use of the technique of the present disclosure also helps to improve designability in this sense.

1.8 Effects

According to the projection optical system or the projector according to one embodiment of the present disclosure, the intermediate image forming lens group 10 and the concave mirror M1 are provided, and the movable group that performs the focus adjustment is disposed in the intermediate image forming lens group 10 to mainly optimize the configuration of the movable group. It is therefore possible to perform focusing with a wide focusable range while the size is reduced.

In particular, according to the present embodiment, in a small-sized ultra-short focus projector, focusing from a smaller size to a larger size is possible by enlarging the focusable range. In addition, since the aberration performance is improved, it is possible to achieve a high-resolution (e.g., full HD) ultra-short focus lens with its size kept small. Further, the use of a stepping motor is enabled by making the movable group include a single group and reducing its weight. As a result, the focusing operation can be performed swiftly, and the focusing operation can be performed without causing the user to feel stress. Further, application in a case where a high-speed focusing operation such as auto focus is required is also possible. In addition, it is useful for improving designability.

It is to be noted that the effects described in the present specification are merely illustrative and non-limiting, and any other effect may be also provided.

2. Other Embodiments

The technique according to the present disclosure is not limited to the description of the embodiments and Examples described above, and various modifications can be made.

For example, the shapes and numerical values of the respective parts described in the above numerical Examples are mere examples of the implementation of the present technology, and the technical scope of the present technology should not be construed as being limited by these examples.

Further, the above embodiments and Examples have been described referring to an example case where the intermediate image forming lens group 10 substantially has a three-group configuration: however, a configuration may be provided in which the intermediate image forming lens group 10 further includes a lens having substantially no refractive power.

In addition, the surface forming the aspherical surface is not limited to the lens surface described in each Example, and a configuration may be provided in which a surface other than the lens surface described in each Example is also aspherical.

Further, a configuration may be provided in which the polarization splitting device 101 between the display device 100 and the projection optical system 1 is omitted. Further, a configuration may be provided in which a telecentric characteristic of the light rays outputted from the side of the image of the projection target is insufficient. In addition, each Example has been described referring to an example in which the second group 12 includes the three lenses L21, L22, and L23; however, the second group 12 may have a lens configuration including two lenses, e.g., a convex lens and a concave lens, for example. Each Example has been described referring to an example in which the third group 13 includes three or four lenses; however, any lens configuration may be provided other than the three-lens configuration and the four-lens configuration. In addition, each Example has been described referring to an example in which the aspherical surface of the lens in the third group 13 and the aspherical surface of the concave mirror M1 each have a rotationally-symmetric surface with the optical axis as a rotation axis; however, it is also possible to make each of the aspherical surface of the lens in the third group 13 and the aspherical surface of the concave mirror M1 have a freely-curved surface that is not rotationally-symmetric with respect to the optical axis instead of the above-described aspherical surface.

Further, for example, it is possible for the present technology to have the following configurations.

[1]

A projection optical system including:

an intermediate image forming lens group that forms an intermediate image of an image of a projection target; and a concave mirror disposed on an optical path after the intermediate image is formed, the concave mirror forming a projection image on a projection surface, the intermediate image forming lens group and the concave mirror being disposed in order from side of the image of the projection target toward side of the projection surface, in which the intermediate image forming lens group includes a movable group that travels on an optical axis to perform focus adjustment, and the movable group includes a concave lens having an aspherical surface.

[2]

The projection optical system according to [1] described above, in which the intermediate image forming lens group includes a first group, a second group serving as the movable group, and a third group in order from the side of the image of the projection target toward the side of the projection surface.

[3]

The projection optical system according to [1] or [2] described above, in which the movable group is configured to have an angular magnification that decreases as an image height increases with respect to a paraxial axis.

[4]

The projection optical system according to [3] described above, in which Rate≤0.9 is satisfied in the movable group, where Rate=(a principal light ray angular magnification at an image height of 90% with respect to a maximum image height)/(a paraxial angular magnification).

[5]

The projection optical system according to any one of [1] to [4] described above, in which the concave lens includes an entrance surface of light and an exit surface of light, and an absolute value of a sag amount of the entrance surface of the concave lens is greater than an absolute value of a sag amount of the exit surface.

[6]

The projection optical system according to [5] described above, in which the movable group includes a plurality of lenses, and the concave lens includes a lens, in the plurality of lenses, disposed on most light exit side in the movable group, and at least the entrance surface is aspherical.

[7]

The projection optical system according to any one of [1] to [6] described above, in which the intermediate image forming lens group is configured such that distortion of the intermediate image at a maximum image height increases by +5 percent or more in a case where the movable group is caused to travel and a projection distance is thereby varied from farthest field side to nearest field side.

[8]

The projection optical system according to any one of [1] to [7] described above, in which 20≤|fmov/fall| is satisfied where "fmov" is a focal length of the movable group and "fall" is a total focal length of the projection optical system.

[9]

The projection optical system according to any one of [1] to [8] described above, in which an angle γ0, with respect to an optical axis, of an upper light ray from an image height of 0 percent toward the movable group satisfies |β0|≤1.5 deg.

[10]

The projection optical system according to any one of [1] to [9] described above, in which the movable group includes a single group.

[11]

The projection optical system according to any one of [1] to [10] described above, in which a paraxial angular magnification of the movable group is 1.5 times or more.

[12]

A projector including a display device that displays an image of a projection target and a projection optical system that projects the image of the projection target onto a projection surface, the projection optical system including:

an intermediate image forming lens group that forms an intermediate image of the image of the projection target; and a concave mirror disposed on an optical path after the intermediate image is formed, the concave mirror forming a projection image on the projection surface, the intermediate image forming lens group and the concave mirror being disposed in order from side of the image of the projection target toward side of the projection surface, in which the intermediate image forming lens group includes a movable group that travels on an optical axis to perform focus adjustment, and the movable group includes a concave lens having an aspherical surface.

The present application is based on and claims priority from Japanese Patent Application No. 2017-149986 filed with the Japan Patent Office on Aug. 2, 2017, the entire contents of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. A projection optical system, comprising:

an intermediate image forming lens group that forms an intermediate image of an image of a projection target; and a concave mirror disposed on an optical path after the intermediate image is formed, the concave mirror forming a projection image on a projection surface, wherein the intermediate image forming lens group and the concave mirror are disposed in order from a side of the image of the projection target toward a side of the projection surface, wherein the intermediate image forming lens group includes a movable group that travels on an optical axis to perform focus adjustment, wherein the movable group includes a concave lens having an aspherical surface, and wherein the movable group is configured to have an angular magnification that decreases as an image height increases with respect to a paraxial axis.

2. The projection optical system according to claim 1, wherein the intermediate image forming lens group includes a first group, a second group serving as the movable group, and a third group in order from the side of the image of the projection target toward the side of the projection surface.

3. The projection optical system according to claim 1, wherein Rate≤0.9 is satisfied in the movable group, where Rate=(a principal light ray angular magnification at an image height of 90% with respect to a maximum image height)/(a paraxial angular magnification).

4. The projection optical system according to claim 1, wherein the movable group includes a single group.

5. The projection optical system according to claim 1, wherein the concave lens includes an entrance surface of light and an exit surface of light, and wherein an absolute value of a sag amount of the entrance surface of the concave lens is greater than an absolute value of a sag amount of the exit surface of the concave lens.

6. The projection optical system according to claim 5, wherein the movable group includes a plurality of lenses, wherein the concave lens includes a lens, in the plurality of lenses, disposed closest to a light exit side in the movable group, and wherein at least the entrance surface of the concave lens is aspherical.

7. The projection optical system according to claim 1, wherein the intermediate image forming lens group is configured such that distortion of the intermediate image at a maximum image height increases by +5 percent or more in a case where the movable group is caused to travel and a projection distance is thereby varied from a farthest field side to a nearest field side.

8. The projection optical system according to claim 1, wherein 20≤|fmov/fall| is satisfied where "fmov" is a focal length of the movable group and "fall" is a total focal length of the projection optical system.

9. The projection optical system according to claim 1, wherein an angle β0, with respect to an optical axis, of an upper light ray from an image height of 0 percent toward the movable group satisfies |β0|≤1.5 deg.

10. The projection optical system according to claim 1, wherein a paraxial angular magnification of the movable group is 1.5 times or more.

11. A projection optical system, comprising:
an intermediate image forming lens group that forms an intermediate image of an image of a projection target; and
a concave mirror disposed on an optical path after the intermediate image is formed, the concave mirror forming a projection image on a projection surface, wherein the intermediate image forming lens group and the concave mirror are disposed in order from a side of the image of the projection target toward a side of the projection surface, wherein the intermediate image forming lens group includes a movable group that travels on an optical axis to perform focus adjustment, wherein the movable group includes a concave lens having an aspherical surface, wherein the concave lens includes an entrance surface of light and an exit surface of light, and wherein an absolute value of a sag amount of the entrance surface of the concave lens is greater than an absolute value of a sag amount of the exit surface of the concave lens.

12. The projection optical system according to claim 11, wherein the movable group includes a plurality of lenses, wherein the concave lens includes a lens, in the plurality of lenses, disposed closest to a light exit side in the movable group, and wherein at least the entrance surface of the concave lens is aspherical.

13. The projection optical system according to claim 11, wherein the intermediate image forming lens group includes a first group, a second group serving as the movable group, and a third group in order from the side of the image of the projection target toward the side of the projection surface.

14. The projection optical system according to claim 11, wherein Rate≤0.9 is satisfied in the movable group, where Rate=(a principal light ray angular magnification at an image height of 90% with respect to a maximum image height)/(a paraxial angular magnification).

15. The projection optical system according to claim 11, wherein the intermediate image forming lens group is configured such that distortion of the intermediate image at a maximum image height increases by +5 percent or more in a case where the movable group is caused to travel and a projection distance is thereby varied from a farthest field side to a nearest field side.

16. The projection optical system according to claim 11, wherein 20≤|fmov/fall| is satisfied where "fmov" is a focal length of the movable group and "fall" is a total focal length of the projection optical system.

17. A projection optical system, comprising:
an intermediate image forming lens group that forms an intermediate image of an image of a projection target; and
a concave mirror disposed on an optical path after the intermediate image is formed, the concave mirror forming a projection image on a projection surface, wherein the intermediate image forming lens group and the concave mirror are disposed in order from a side of the image of the projection target toward a side of the projection surface, wherein the intermediate image forming lens group includes a movable group that travels on an optical axis to perform focus adjustment, wherein the movable group includes a concave lens having an aspherical surface, and wherein the intermediate image forming lens group is configured such that distortion of the intermediate image at a maximum image height increases by +5 percent or more in a case where the movable group is caused to travel and a projection distance is thereby varied from a farthest field side to a nearest field side.

18. A projection optical system, comprising:
an intermediate image forming lens group that forms an intermediate image of an image of a projection target; and
a concave mirror disposed on an optical path after the intermediate image is formed, the concave mirror forming a projection image on a projection surface,
wherein the intermediate image forming lens group and the concave mirror are disposed in order from a side of the image of the projection target toward a side of the projection surface,
wherein the intermediate image forming lens group includes a movable group that travels on an optical axis to perform focus adjustment,
wherein the movable group includes a concave lens having an aspherical surface, and
wherein 20≤|fmov/fall| is satisfied where "fmov" is a focal length of the movable group and "fall" is a total focal length of the projection optical system.

19. A projection optical system, comprising
an intermediate image forming lens group that forms an intermediate image of an image of a projection target; and
a concave mirror disposed on an optical path after the intermediate image is formed, the concave mirror forming a projection image on a projection surface,
wherein the intermediate image forming lens group and the concave mirror are disposed in order from a side of die image of the projection target toward a side of the projection surface,
wherein the intermediate image forming lens group includes a movable group that travels on an optical axis to perform focus adjustment,
wherein the movable group includes a concave lens having an aspherical surface, and
wherein an angle β0, with respect to an optical axis, of an upper light ray from an image height of 0 percent toward the movable group satisfies |β0|≤1.5 deg.

20. A projection optical system, comprising:
an intermediate image forming lens group that forms an intermediate image of an image of a projection target; and
a concave mirror disposed on an optical path after the intermediate image is formed, the concave mirror forming a projection image on a projection surface,
wherein the intermediate image forming lens group and the concave mirror are disposed in order from a side of die image of the projection target toward a side of the projection surface,
wherein the intermediate image forming lens group includes a movable group that travels on an optical axis to perform focus adjustment,
wherein the movable group includes a concave lens having an aspherical surface, and
wherein a paraxial angular magnification of the movable group is 1.5 times or more.

* * * * *